US012558834B2

(12) United States Patent
Li et al.

(10) Patent No.: US 12,558,834 B2
(45) Date of Patent: Feb. 24, 2026

(54) PEX EXPANDER

(71) Applicant: Black & Decker Inc., New Britain, CT (US)

(72) Inventors: Qingyang Li, Suzhou (CN); Bingxin Luo, Suzhou (CN); Chenyang Xu, Suzhou (CN); Kailang Peng, Suzhou (CN); Guotao Wang, Suzhou (CN); Justin Burke, Bellevue, PA (US)

(73) Assignee: Black & Decker Inc., New Britain, CT (US)

( * ) Notice: Subject to any disclaimer, the term of this patent is extended or adjusted under 35 U.S.C. 154(b) by 107 days.

(21) Appl. No.: 18/409,669

(22) Filed: Jan. 10, 2024

(65) Prior Publication Data

US 2024/0239036 A1 Jul. 18, 2024

Related U.S. Application Data

(60) Provisional application No. 63/438,740, filed on Jan. 12, 2023.

(51) Int. Cl.
*B29C 57/04* (2006.01)
*B29L 31/24* (2006.01)

(52) U.S. Cl.
CPC ......... *B29C 57/045* (2013.01); *B29L 2031/24* (2013.01)

(58) Field of Classification Search
CPC ..... B29L 2031/24; B23B 31/12; B23B 31/14; B23B 31/16; B21D 39/20
See application file for complete search history.

(56) References Cited

U.S. PATENT DOCUMENTS

| | | | |
|---|---|---|---|
| 1,403,120 A | 1/1922 | Kruse | |
| 2,161,963 A | 6/1939 | Khatunzeff | |
| 2,211,741 A | 8/1940 | Elwell | |
| 2,542,305 A | 2/1951 | Brinen et al. | |
| 3,449,967 A | 6/1969 | Dancsik | |
| 3,857,666 A | 12/1974 | Barnett | |
| 3,888,102 A | 6/1975 | Nigido | |
| 4,107,249 A | 8/1978 | Murai et al. | |
| 4,494,398 A | 1/1985 | Svoboda | |
| 4,541,266 A | 9/1985 | Totsu | |

(Continued)

FOREIGN PATENT DOCUMENTS

| | | |
|---|---|---|
| CA | 2230124 A1 | 1/1996 |
| CA | 2283664 A1 | 3/1998 |

(Continued)

OTHER PUBLICATIONS

European Search Report, Application No. 17182163, EPO (Sep. 13, 2017).

(Continued)

*Primary Examiner* — JaMel M Nelson
(74) *Attorney, Agent, or Firm* — Wright IP & International Law; Eric G. Wright

(57) ABSTRACT

An expanding tool for widening pipe ends having an ergonomic design. The expanding tool uses a transmission which drives a cam offset at a distance from a motor axis to drive a number of jaws which move from a closed position to an open position to widen a pipe end. The expanding tool has a balanced positioning of components across the expanding tool's length achieving ergonomic benefits for a user.

15 Claims, 36 Drawing Sheets

(56)                References Cited

U.S. PATENT DOCUMENTS

| | | | |
|---|---|---|---|
| 5,090,226 A * | 2/1992 | Takeoka | B21D 41/023 |
| | | | 72/125 |
| 5,511,912 A | 4/1996 | Ellerbrock | |
| 5,744,085 A | 4/1998 | Sorberg | |
| 6,415,641 B1 | 7/2002 | Wagner | |
| 6,672,128 B2 | 1/2004 | Wagner et al. | |
| 7,018,195 B2 | 3/2006 | Stone | |
| 7,128,560 B2 | 10/2006 | Tandart | |
| 7,922,475 B2 | 4/2011 | Gueit | |
| 8,517,715 B2 | 8/2013 | Thorson et al. | |
| 8,763,439 B2 | 7/2014 | Thorson et al. | |
| 8,938,886 B2 | 1/2015 | Ross et al. | |
| 9,248,617 B2 | 2/2016 | Lundequist et al. | |
| 9,555,577 B2 | 1/2017 | Greding | |
| 9,975,289 B2 | 5/2018 | Li et al. | |
| 2006/0201228 A1 | 9/2006 | Rothenberger | |
| 2010/0308503 A1 | 12/2010 | Schramm et al. | |
| 2012/0181727 A1 | 7/2012 | Lindner et al. | |
| 2012/0217674 A1 | 8/2012 | Greding | |
| 2013/0156496 A1 | 6/2013 | Greding et al. | |
| 2013/0192331 A1 | 8/2013 | Ross et al. | |
| 2015/0114068 A1 | 4/2015 | Hasenberg et al. | |
| 2015/0258598 A1 | 9/2015 | Frenken | |
| 2015/0367556 A1 | 12/2015 | Ellice | |
| 2018/0029286 A1 * | 2/2018 | Li | B21D 41/028 |

FOREIGN PATENT DOCUMENTS

| | | |
|---|---|---|
| CN | 108995195 A | 12/2018 |
| CN | 108995195 B | 7/2020 |
| DE | 202012104763 U1 | 3/2014 |
| DE | 102012109255 A1 | 4/2014 |
| DE | 102013107294 A1 | 1/2015 |
| EP | 0252868 A2 | 1/1988 |
| EP | 1407838 A2 | 4/2004 |
| EP | 2374554 A1 | 10/2011 |
| EP | 3275626 A1 | 1/2018 |
| WO | 2009000966 A1 | 12/2008 |
| WO | 2012022665 A1 | 2/2012 |
| WO | 2013122732 A1 | 8/2013 |
| WO | 2014125025 A1 | 8/2014 |

OTHER PUBLICATIONS

Extended European Search Report, Application No. 24151413.2-1014, EPO (Sep. 12, 2024).

* cited by examiner

PEX EXPANDER

CROSS-REFERENCE TO RELATED APPLICATIONS

This patent application is a US nonprovisional application of and claims benefit of the filing date of copending U.S. Provisional Patent Application No. 63/438,740 titled "PEX Expander" filed Jan. 12, 2023.

INCORPORATION BY REFERENCE

This patent application incorporates by reference in its entirety U.S. Provisional Patent Application No. 63/438,740 titled "PEX Expander" filed Jan. 12, 2023.

This patent application incorporates by reference in its entirety U.S. Pat. No. 9,975,289 B2 titled "PEX Expanding Tool" issued May 22, 2018.

This patent application incorporates by reference in its entirety U.S. Pat. No. 8,763,439 B2 titled "PEX Expanding Tool" issued Jul. 1, 2014.

This patent application incorporates by reference in its entirety U.S. Pat. No. 8,517,715 B2 titled "PEX Expanding Tool" issued Aug. 27, 2013.

This patent application incorporates by reference in its entirety U.S. Pat. No. 7,661,486 B2 titled "Power Tool With Battery Pack" issued Feb. 16, 2010.

This patent application incorporates by reference in its entirety U.S. Pat. No. 6,996,909 B1 titled "Battery Powered Circular Saw" issued Feb. 14, 2006.

FIELD

This disclosure regards ergonomic tools for the expansion of pipe and tubing, as well as methods of design, use and operation relating thereto.

BACKGROUND

Polymer pipe is popular for use as pipes in plumbing in residential home and commercial building construction due to the rising cost of copper pipe. One of the more common types of polymer pipe is made from cross-linked polyethylene, which is commonly known as "PEX". Polymer pipe is connected to form a joint by expanding the mouth at the end of a pipe, thus allowing the expanded end of the pipe to slip over the outer diameter of an end of an adjacent pipe forming the joint. The pipe can be secured at the joint by crimping or otherwise securing the expanded end of the pipe against the outer surface of the end of the adjacent pipe which is overlapped by the inner surface of the expanded pipe mouth. A typical building will require many joints. Thus, installation of the plumbing involves expanding the mouths of numerous pipes and tubes. There is a strong and long-felt need for an efficient and ergonomic tool for expanding the ends of pipes.

SUMMARY

The PEX expander is a significant advance in ergonomic technology. The PEX expander disclosed herein is an expanding tool 10 (e.g. FIG. 1) for widening the diameter of pipe ends. The expanding tool 10 achieves an expansion force of a plurality of jaws 31 for expanding pipes having nominal pipe diameters in a range from ⅜ in in to 3.0 in, or 0.5 in to 2 in, or ⅜ in to 6.0 in, e.g. nominal pipe diameters (aka "pipe sizes") of 0.5 in, 0.75 in, 1.0 in, 1.25 in, 1.5 in, 2.0 in, 2.5 in, 3.0 in, 4.0 in, 4.5 in and 5.0 in.

In its many and varied embodiments, the present disclosure relates to expansion tools to expand the end portions of pipe, e.g. cross-linked polyethylene (commonly known as "PEX") pipe. Herein, embodiments of such tools are referred to in nonlimiting example as expanding tools, for expanding the end portions of pipe, e.g. an expanding tool 10. In embodiments, the expanding tool 10 can utilize an expansion head 1330, which can have a number of segments such as a plurality of jaws 31 (herein also as "jaws" and jaws 31"), as well as an auto-rotation feature (FIG. 9C). In an embodiment, the expansion head 1330 can be a multi-segmented expansion head and can have a plurality of jaws 31.

As disclosed herein in its several and varied embodiments and shown in FIGS. 1-16, the expanding tool 10, achieves a strong expansive force, ergonomic weight distribution, comfortable gripping for a user, as well as a tool center of gravity containment which significantly advances tools and methods for expanding pipe and tubing.

Summary of the Tool

In an embodiment, the expanding tool 10 achieves an expansion force through a motor 15 which drives a five-stage transmission. In an embodiment, the five-stage transmission has a fifth ($5^{th}$) stage in which a fifth ($5^{th}$) stage drive gear 3500G (FIG. 8) which can be configured along a motor centerline 2000 drives a cam spindle drive gear 3550G which can be offset at a distance from the motor centerline 2000 toward a back end of a head assembly 100.

Ergonomically, in an embodiment, the offset of the cam spindle drive gear 3550G can drive the cam spindle 150 and a cam 21. The cam 21 which can be selectively driven by the cam spindle 150, at a cam spindle centerline distance of 2100 from the motor centerline 2000 (FIG. 9A).

As can be seen in nonlimiting example in FIGS. 7A, 9A, 9C and 12A, in embodiments, the cam 21 can be configured at a cam spindle centerline distance of 2100 from the motor centerline 2000 which distributes the weight of the cam 21, a wedge 24 and the expansion head 1330 having a plurality of jaws 31 across the tool length 1500. This configuration achieves a balanced and ergonomic positioning of the cam 21, the wedge 24 and the expansion head 1330 above an upper grip 200 such that when a user grips the expanding tool 10 by the upper grip 200 (FIG. 12) the cam 21 and the wedge 24 are comfortably configured above the back of the user's hand 5000, e.g. above the dorsal interossei muscles 6500 and/or first ($1^{st}$) dorsal interosseous muscle 6600 of the user's hand, and the expansion head 1330 can be configured above the user's fingers 5003 (FIG. 13A) as they grip the upper finger grip 207 of the upper grip 200. In an embodiment, wedge 24 can have a cone 124.

The expanding tool 10 achieves an exceptional ergonomic distribution of weight across the tool length 1500. The expanding tool 10 shown in FIGS. 1-10A and 12-16, distributes weight comfortably across the user's hand 5000, and across the back of the user's hand 6000, when the user grips the upper grip 200. Further, an ergonomic and comfortable weight distribution is also achieved across the back of the user's hand 6000, when the user grips the lower grip 400.

In an embodiment, a cam 21 configuration which is offset by a cam spindle centerline distance of 2100 from the motor centerline 2000 achieves a tool center of gravity 900 (herein also as "CG 900") which is bounded within the handle interior volume 345, e.g. within the upper grip interior volume 1204 (FIG. 7D) and/or within the upper palm grip interior volume 1205 (FIG. 7C) and/or within upper finger grip interior volume 1209.

The expanding tool 10 can have a power cord 9121 (not shown), or can be a cordless tool. In cordless tool embodiments, the cam 21 configuration which can be offset by a cam spindle centerline distance of 2100 from the motor centerline 2000 can achieve a tool center of gravity 900 which is bounded within the handle interior volume 345 proximate to at least one of the driveshaft 3450, the transmission 3000 and the motor 15. The location of the tool center of gravity 900 can depend upon the size of the battery pack 600 attached, e.g. in a range of from 2 Ah to 50 Ah. In embodiments, depending upon the size of the battery pack 600, the tool center of gravity 900 can be within the handle interior volume 345 proximate to at least one of the transmission 3000's fifth (5) stage 3500, fourth (4$^{th}$) stage 3400, third (3$^{rd}$) stage, second (2$^{nd}$) stage 3200 and first (1$^{st}$) stage 3100.

As shown in FIG. 7C, in embodiments, the tool center of gravity 900 can be bounded between a cam spindle centerline plane 1900 and a motor centerline plane 2900 within a CG containment space 9900. As shown in nonlimiting example in FIG. 7C, CG 900 can be configured and contained within the CG containment space 9900, within the handle interior volume 345, within the upper grip volume 204, and also within upper palm grip volume 205.

In an embodiment, the weight of the tool 10 can be balanced on either side of the motor centerline plane 2900 which can place the center of gravity on the motor centerline plane 2900.

In other embodiments, as shown in FIG. 7D, CG 900 is configured within an extended CG containment space 9999 which can be bounded between a cam spindle centerline plane 1900 and a housing front side 1111. As shown in nonlimiting example in FIG. 7D, CG 900 is configured within the extended CG containment space 9999, within the handle interior volume 345, within upper grip interior volume 1204, and within the upper finger grip interior volume 1209.

In an embodiment, the expanding tool 10 for expanding the end of a pipe, can have a head assembly 100 which can have an expansion head 1330 having a plurality of jaws 31 having a closed position and an open position; a motor 15 having a motor centerline 2000 within a grip volume 400; a cam spindle 150 having a cam spindle centerline 1000 configured at a cam spindle centerline distance 2100 from the motor centerline 2000; and a transmission 3000 driven by the motor 15 which selectively drives the cam spindle 150.

In an embodiment, the expanding tool 10 can have an upper palm grip volume 205 configured between a portion of a cam spindle 150 and a portion of the motor 15.

In an embodiment, the expanding tool 10 can have an upper grip 200. In an embodiment, the expanding tool 10 can have a lower grip 400. In an embodiment, the expanding tool 10 can have both an upper grip 200 and a lower grip 400.

In an embodiment, the expanding tool 10 can have an upper grip 200 having an upper palm grip volume 205 configured between a portion of a cam spindle 150 and a portion of the motor 15. In an embodiment, the expanding tool 10 can have a lower grip 400 having a lower palm grip volume 405 configured between a portion of a cam spindle 150 and a portion of the motor 15. In an embodiment, the cam 221 can be drive by the cam spindle 150 and a wedge 24 can be configured to drive the plurality of jaws 31.

In an embodiment, the expanding tool 10 can have an upper palm grip 205 volume configured between a portion of a cam spindle 150 and a portion of the transmission 3000. In an embodiment, the expanding tool 10 can have an upper grip 200 having an upper palm grip volume 205 configured between a portion of a cam spindle 150 and a portion of the transmission 3000. In an embodiment, the expanding tool 10 can have a grip configured such that the cam spindle centerline 1000 passes through a portion of a back of hand of a user's hand 6000 when a user grips the grip.

In an embodiment, the expanding tool 10 can have an upper grip 200 and/or a lower grip 400 configured such that the cam spindle centerline 1000 passes through a portion of an operator's hand 5000, e.g. a back of hand 6000 of an operator's hand 5000, when the user grips either the upper grip 200, or the lower grip 400.

In an embodiment, the expanding tool 10 can have a grip having a maximum length in a range of 40 mm to 60 mm and a grip width maximum diameter in a range of 35 mm to 50 mm.

In an embodiment, the expanding tool 10 can have: a handle 300 portion surrounding the motor 15 at least in part and a cam back end 225 of the cam 221. In an embodiment, the cam spindle centerline 1000 can be configured between the cam back end 225 and the handle 15 can have a portion which surrounds at least a portion of the motor 15. In an embodiment, the expanding tool 10 can have a wedge 24 configured to drive the plurality of jaws 31 in which the cam 221 is configured adjacent to the wedge 24, and in which the motor centerline 2000 passes through at least a portion of the wedge 24.

In an embodiment, the expanding tool 10 can have a battery 12 which powers at least the motor 15. In an embodiment, the expanding tool 10 can be a cordless tool. In an embodiment, the expanding tool 10 for expanding the end of a pipe can have a bare tool weight measured without a battery 12 attached and without an expansion head 1330 attached to the expanding tool 10 in a range of 3 lbs to 20 lbs, e.g. 4 lbs, 5 lbs, 10 lbs, 12 lbs, 15 lbs, 16 lbs and 18 lbs.

In an embodiment, the expanding tool 10 for expanding the end of a pipe can have a tool weight measured with a battery 12 attached and with an expansion head 1330 attached to the expanding tool 10 in a range of 3 lbs to 25 lbs, e.g. 5 lbs, 10 lbs, 12 lbs, 15 lbs, 16 lbs and 20 lbs.

In an embodiment, the expanding tool 10 for expanding the end of a pipe, can have a cam 221 which drives a wedge 24 configured to selectively drive a plurality of jaws 31 from a closed position to an open position; a motor 15 having a motor centerline 2000 configured within a grip volume 4000; a cam spindle 150 can have a cam spindle centerline 1000 configured at a cam spindle centerline distance 2100 from the motor centerline 2000; and a transmission driven by the motor 15 can selectively drive the cam spindle; and the expanding tool 10 can have a tool center of gravity 900 configured between at least a portion of the cam 221 and at least a portion of the motor 15.

The expanding tool 10 can have a cam spindle centerline plane 1900 parallel to a motor centerline 2000 plane, in which the tool center of gravity 900 can be configured between the spindle centerline plane and the motor centerline 2000 plane.

The expanding tool 10 can have a handle having 311 a handle interior volume 345, in which the tool center of gravity 900 can be configured within the handle interior volume 345.

In an embodiment, the transmission 3000 can drive a drive gear 3490 (FIGS. 7A, 9A and 9B). The drive gear 3490 can be a gear of any stage of the transmission 3000. There can be more than one drive gear 3490 in or associated with the transmission 3000. There can be more than one type of drive gear 3490 in or associated with the transmission 3000, some can be drive gears driving other gears and/or elements and others can serve a specific purpose. In embodiments, the drive gear 3490 can be a fifth (5$^{th}$) stage drive gear 3500G and/or a cam spindle drive gear 3550G and/or other of a drive gear 3490 configured as part of the transmission 3000 or otherwise receiving and/or transmitting force associated with the operation of the transmission 3000.

In an embodiment, the expanding tool 10 for expanding the end of a pipe, can have: a plurality of jaws 31 having a closed position and an open position; a motor 15 having a motor centerline 2000; a transmission selectively driven by the motor 15; a transmission centerline 3010 aligned with the motor centerline 2000; a drive gear driven by the transmission; a cam 221 configured to drive a wedge 24 which is configured to drive the jaws 31 from the closed position to the open position; and a cam spindle drive gear 3550G having a cam spindle drive gear centerline 9550, in which the drive gear, e.g. fifth (5$^{th}$) stage drive gear 3500G drives the cam spindle drive gear 3550G, and in which the cam spindle drive gear 3550G is located adjacent to the drive gear and the cam spindle centerline 1000 is at a distance from the motor centerline 2000.

In an embodiment, the expanding tool 10 can have the cam 221 at least in part configured above the cam spindle drive gear 3550G. In an embodiment, the expanding tool 10 the cam 221 can be driven by the cam spindle drive gear 3550G. In an embodiment, the expanding tool 10 can have an upper grip 200 at least in part configured between a portion of a cam spindle 150 and a portion of the motor 15. In an embodiment, the expanding tool 10 can have an upper grip 200 at least in part configured between a portion of the cam spindle 150 and a portion of the transmission 3000. In an embodiment, the expanding tool 10 can have a wedge 24 having a portion through which the motor centerline 2000 passes.

In an embodiment, the expanding tool 10 can have a cam 221 having a cam opening 921; a cam spindle drive gear 3550G having a cam spindle drive gear opening 3577; and a cam spindle 150, in which the cam spindle 150 is configured to be at least in part surrounded by at least a portion of the cam opening 921 and at least a portion of the cam spindle drive gear opening 3577.

In an embodiment, the expanding tool 10 can have a cam 221 having a cam opening 921; a cam spindle drive gear 3550G having a cam spindle drive gear opening 3577; and a cam spindle 150, in which the cam spindle 150 is inserted at least in part into the cam opening 921 and at least in part into the cam spindle drive gear opening 3577.

In an embodiment, an expanding tool 10 can have: a head assembly 100 which can have an expansion head 1330 having a plurality of jaws 31 having a closed position and an open position; a motor 15 having a motor centerline 2000; a cam spindle 150 having a cam spindle centerline 1000, the cam spindle centerline 1000 at distance from the motor centerline 2000; and a transmission 3000 driven by the motor 15 selectively driving the cam spindle 150 which selectively drives the plurality of jaws 31 from a closed position to an open position; and a tool center of gravity 900 configured between the cam spindle 150 and the motor 15.

In an embodiment, the expanding tool 10 can have: a head assembly 100 which can have an expansion head 1330 having a plurality of jaws 31 having a closed position and an open position; a motor 15 having a motor centerline 2000;

a cam having a cam opening centerline at distance from the motor centerline 2000; and a transmission 3000 driven by the motor 15 selectively driving the cam spindle 150 which selectively drives the plurality of jaws 31 from a closed position to an open position; and a tool center of gravity 900 configured between the cam and the motor 15.

In embodiments, the head assembly 100 can have a plurality of jaws 31 which function to expand the end of a pipe, but which are not configured as part of an expansion head 1330.

In an embodiment, the expanding tool 10 can have a trigger 13T configured adjacent to the tool center of gravity 900.

In an embodiment, the expanding tool 10 can have a tool center of gravity 900 which can be adjacent to a portion of the transmission 3000. In an embodiment, the expanding tool 10 can have a transmission 3000 which can be a five-stage transmission 3005 and the tool center of gravity 900 can be adjacent to a portion of the five-stage transmission 3005. In an embodiment, the expanding tool 10 can have a transmission 3000 which has a third stage 3300 and the tool center of gravity 900 can be adjacent to a portion of the third stage of the transmission 3000. In an embodiment, the expanding tool 10 can have a transmission 3000 which has a fourth stage 3400 and the tool center of gravity 900 can be adjacent to a portion of the fourth stage of the transmission 3000.

In an embodiment, an expanding tool 10 can have: a head assembly 100 having a plurality of jaws 31 having a closed position and an open position also referred to herein as an "expanded position"; a motor 15 having a motor centerline 2000; a cam spindle 150 having a cam spindle centerline 1000, the cam spindle centerline 1000 at distance from the motor centerline 2000; and a transmission 3000 having a cam spindle drive stage 3500D having a cam spindle drive gear configured to selectively drive a rotation of the cam spindle 150.

In an embodiment, the expanding tool 10 can have a gear adjacent to, e.g. at least in part horizontally adjacent to and/or or horizontally next to, and making external contact with the cam spindle drive gear 3550G to drive a rotation of the cam spindle drive gear 3550G when driven by the motor 15.

In an embodiment, the expanding tool 10 can have a radial cam 21 having a radial cam spindle opening centerline 9921, the radial cam spindle opening centerline 9921 a distance from the motor centerline 2000. In an embodiment, the expanding tool 10 can have a radial cam 21 having a radial cam spindle opening centerline 9921, the radial cam spindle opening centerline 9921 configured coaxially with the cam spindle centerline 1000.

In an embodiment, the expanding tool 10 can have a radial cam 21 having a radial cam spindle opening centerline 9921, the radial cam spindle opening centerline 9921 can be configured to vertically extend at a distance from and/or adjacent to the back side of the handle housing 311 and/or the tool foot assembly 500 and/or battery pack 12. In an embodiment, the radial cam spindle opening centerline 9921 can be configured to vertically extend though at least a portion of the upper grip volume 204 and/or upper grip 200.

In an embodiment, the expanding tool 10 can have: a head assembly 100 having a plurality of jaws 31 having a closed position and an open position (aka "expanded position"); a motor 15 having a motor centerline 2000; a cam spindle 150 having a cam spindle centerline 1000, the cam spindle centerline 1000 at distance from the motor centerline 2000; and a transmission 3000 having a cam spindle drive stage having a cam spindle drive gear configured to selectively drive a rotation of the cam spindle 150; and the cam spindle drive gear surrounding at least a portion of the cam spindle 150.

In an embodiment, the expanding tool 10 can have a motor centerline 2000 configured perpendicular to the cam spindle centerline 1000. In an embodiment, the expanding tool 10 can have a motor centerline 2000 configured parallel to the cam spindle centerline 1000. In an embodiment, the expanding tool 10 can have a motor centerline 2000 which is not perpendicular to the cam spindle centerline 1000.

In an embodiment, the expanding tool 10 can have: a head assembly 100 having a plurality of jaws 31 having a closed position and an open position; a motor 15 having a motor centerline 2000; a cam having a cam opening centerline at distance from the motor centerline 2000; and a transmission 3000 driven by the motor 15 selectively driving the cam spindle 150 which selectively drives the plurality of jaws 31 from a closed position to an open position; and a tool center of gravity 900 configured between the cam and the motor 15.

In an embodiment, the expanding tool 10 can have the cam front end 223 configured between the cam spindle centerline plane 1900 and the motor centerline plane 2900. In an embodiment, the expanding tool 10 can have the cam front end 223 configured between the cam spindle centerline plane 1900 and the upper palm grip trough 203.

In an embodiment, the expanding tool 10 can have a cam axis centerline 229 which can be coaxial to a cam spindle centerline 1000 and configured at a distance from a motor centerline 2000.

In an embodiment, the expanding tool 10 can have: a head assembly 100 having a plurality of jaws 31 having a closed position and an expanded position, the jaws having a jaws back end 1240 and a jaws front end 1250; a motor 15 having a motor centerline 2000; a cam spindle 150 having a cam spindle centerline 1000, the cam spindle centerline 1000 at distance from the motor centerline 2000; and a transmission 3000 having a cam spindle drive stage having a cam spindle drive gear configured to selectively drive a rotation of the cam spindle 150 to selectively drive the plurality of jaws 31 from a closed position and an expanded position; and an upper grip configured between the motor 15 and the head assembly 100.

In an embodiment, the expanding tool 10 can have a wedge 24 configured to contact a portion of the plurality of jaws 31 proximate to a jaws back end 1240 contact point when the wedge 24 is moved into contact with the plurality of jaws 31, and in which the motor centerline 2000 can be configured between the cam spindle centerline 1000 and the initial wedge contact point.

Summary of Methods

In an embodiment, a method of expanding a pipe end can have the steps of: providing a head assembly 100 having a plurality of jaws 31 selectively having a closed position and an open position (expanded position); a motor centerline 2000 configured within a grip volume 4000 a motor 15 having a motor centerline 2000 and a motor centerline plane 2900 parallel to a cam spindle centerline 1000; the cam spindle 150 having a cam spindle centerline 1000, the cam spindle centerline 1000 at distance from the motor centerline 2000 and a cam spindle centerline plane 1900 parallel to the motor centerline 2000; a transmission 3000 having a cam spindle drive stage 3500D having a cam spindle drive gear 3550G configured to selectively drive a rotation of the cam spindle 150; and bounding a center of gravity of the tool between the motor centerline plane 2900 and the cam spindle centerline plane 1900.

In an embodiment, a method of expanding a pipe end can have the steps of: providing a wedge 24 having a wedge centerline 9924, and bounding a tool center of gravity 900 between the cam spindle centerline 1000 and the motor 15. In an embodiment, a method of expanding a pipe end can have the steps of: providing a wedge 24 having a wedge centerline 9924 which has a wedge centerline plane 9910 coaxial with the wedge centerline and perpendicular to motor centerline 2000; and bounding a center of gravity of the tool between the cam spindle centerline plane 1900 and the motor 15.

In an embodiment, a method of expanding a pipe end can have the steps of: providing a wedge having a wedge centerline which has a wedge centerline plane coaxial with the wedge centerline and perpendicular to motor centerline 2000; and providing a transmission plane configured perpendicular to motor centerline 2000 between the motor 15 and a portion of the transmission 3000, and bounding a tool center of gravity 900 between the wedge centerline plane 9910 and the transmission plane 9310.

BRIEF DESCRIPTION OF THE DRAWINGS

The present technology in its several aspects and embodiments solves the problems discussed above and significantly advances the technology of expanding tools for widening pipe ends with ergonomic solutions which benefit operators of the tool. The present technology can become more fully understood from the detailed description and the accompanying drawings, wherein.

Herein, like reference numbers in one figure refer to like reference numbers in another figure.

DETAILED DESCRIPTION

Overview

Figure 1:
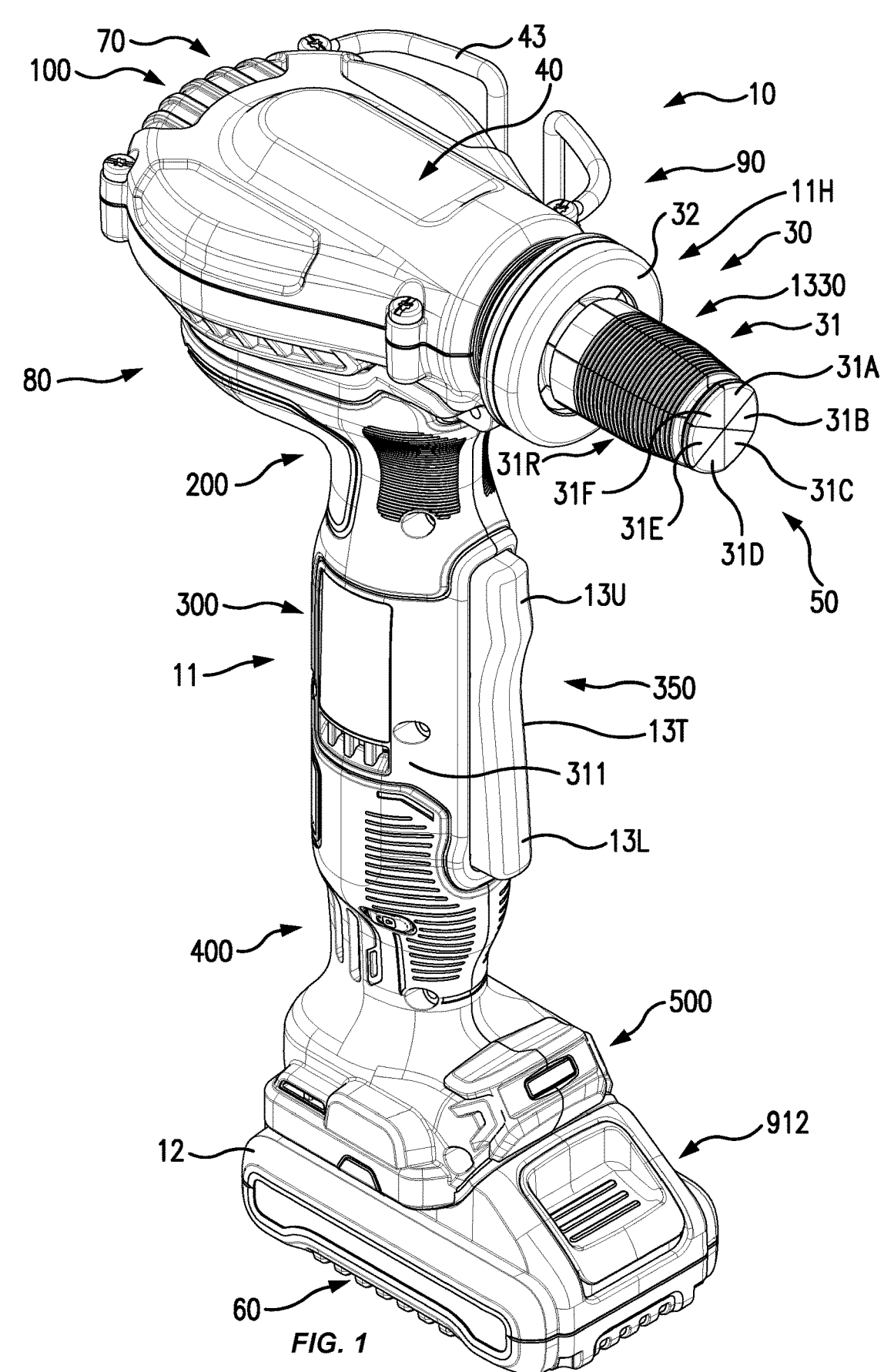
FIG. 1 is a first perspective view of the expanding tool.

The expanding tool 10 in its many and varied embodiments configures and/or bounds the tool center of gravity 900 within X, Y, Z dimensional boundaries and achieves significant ergonomic advantages. The tool center of gravity 900 can be positioned at locations along the X dimension, horizontally (−X, +X), within, or proximate to, the tool handle 300 when utilized with selected battery 12 and expansion heads. The battery 12 and expansion heads can be chosen from a variety of options for battery type 12 and expansion head 1330 types. The tool center of gravity 900 can be configured along the Y dimension, vertically (−Y, +Y), to locations between the head assembly 100 and the foot assembly 500 when utilized with a selected battery 12 and expansion head 1330. The tool center of gravity 900 can be configured to locations along the Z dimension, horizontally (−Z, +Z), within, or proximate to, the tool handle 300 when utilized with a selected battery 12 and expansion head 1330, each chosen from a variety of options of battery and expansion head types.

Figure 10A:
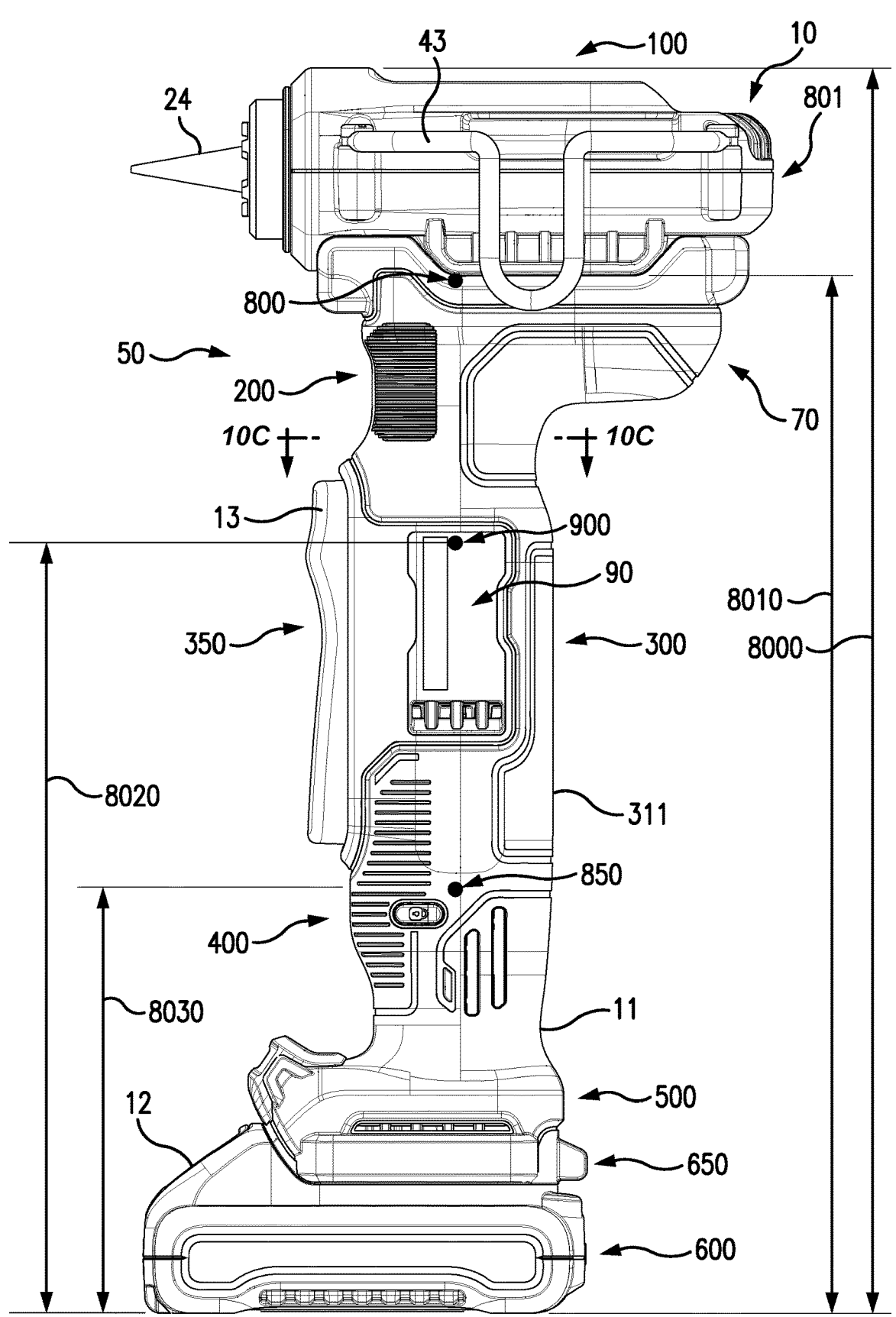
FIG. 10A is left-side view of the expanding tool showing a variety of tool center of gravity locations.

FIG. 1 is a first perspective view of the expanding tool 10 in a vertical orientation having a head assembly 100, a handle 300 having an upper grip 200, a lower grip 400 and a power tool battery pack 12. In nonlimiting example, battery pack 12 can be a battery pack 600 (FIG. 10A).

FIG. 1 shows the expanding tool 10 having a housing 11, preferably including a handle 300, a handle housing 311, a jaw assembly 30 disposed on housing 11, a jaws rotating/ expanding mechanism 20 (FIG. 7A) disposed within housing 11, and a motor 15 (FIG. 4) for driving the jaws rotating/expanding mechanism 20.

Figure 4:
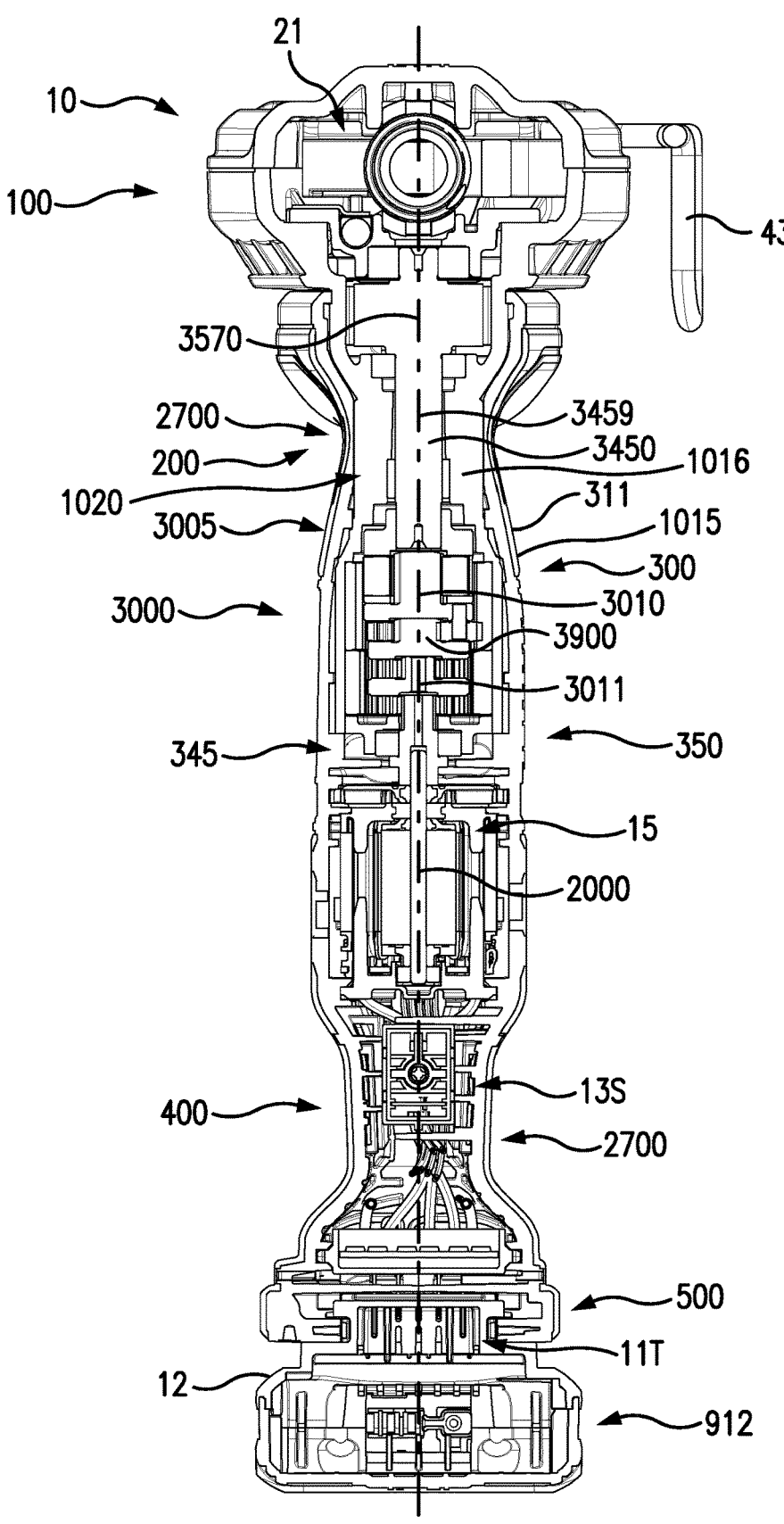
FIG. 4 is a front view cross section of the expanding tool taken at the motor centerline.

A power tool battery pack 12 can be attached to housing 11 and electrically connected to the expanding tool 10 in order to power motor 15. In embodiments, the battery pack 12 can also power tool electronics. The power tool battery pack 12 as shown in FIG. 1 can be electrically connected to tool terminals 11T (FIG. 4), and in turn connected to switch 13S (FIG. 4).

In an embodiment, housing 11 can be made of a polymer, plastic or high-impact plastic, such as in nonlimiting example polybutylene terephthalate (PBT). In an embodiment, housing 11 can be made in part or in whole from a metal, e.g. such as aluminum, or magnesium, or an alloy, plastic, polymer, or can be 3D-printed. Housing 11 can be overmolded with a rubber-like material 110 (FIG. 9A) for a better grip experience for an operator of the tool 10.

Housing 11 can also include a housing portion 11H for at least partially encasing jaws rotating/expanding mechanism 20. In an embodiment, housing portion 11H can be made in part or in whole from a metal, e.g. such as aluminum, or magnesium, or an alloy, or a plastic, or a polymer, or a high-impact plastic. Housing portion 11H can be the same material as housing 11, or a different material from housing 11.

Figure 7A:
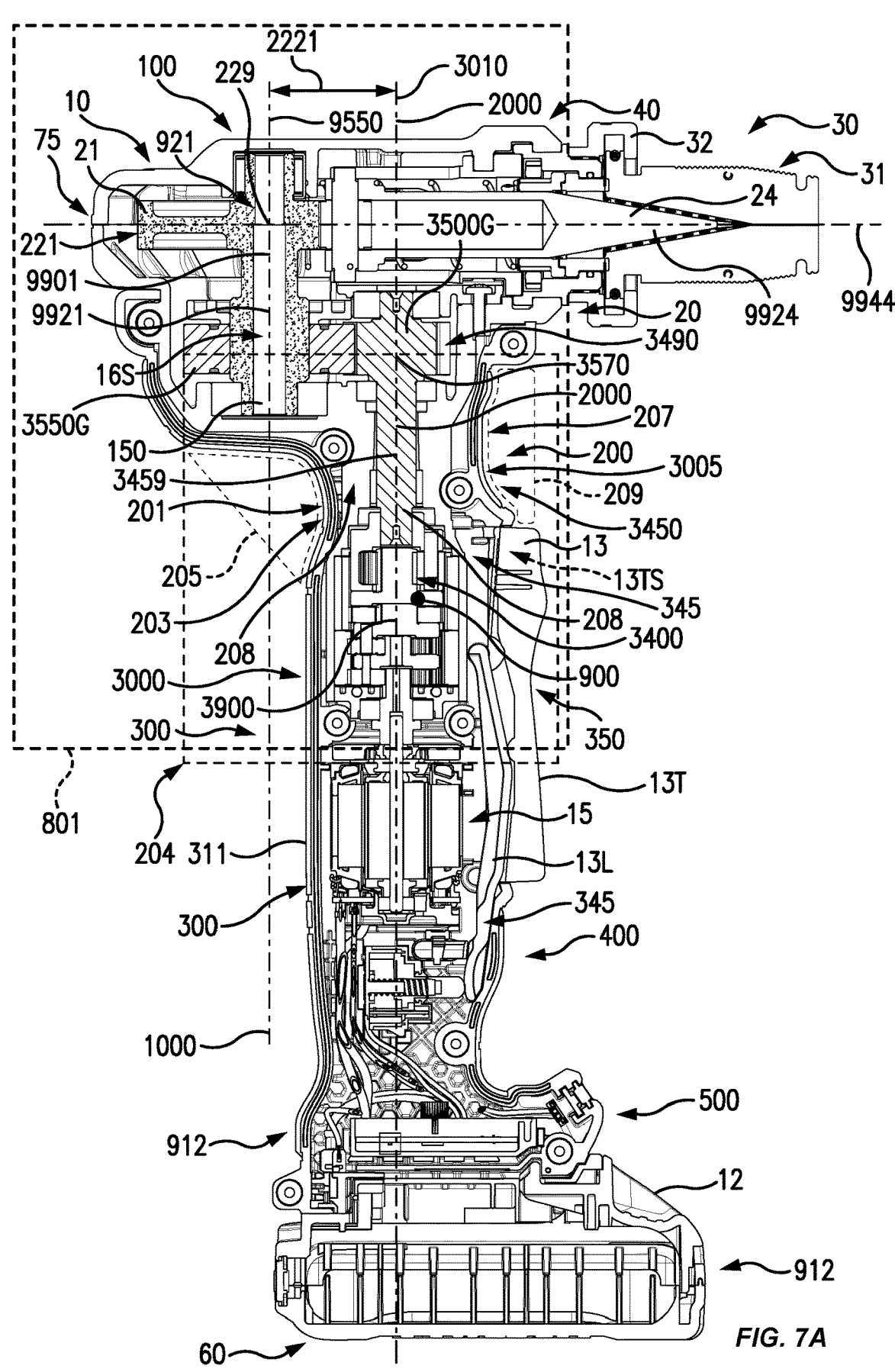
FIG. 7A is a right-side cross section of the expanding tool taken at the motor centerline of FIG. 3A.

Switch 13S (FIG. 4) can be activated by a trigger assembly 350 which can have a trigger 13T, which is movable relative to housing 11. The motion of trigger 13T is transferred to activate switch 13S (FIG. 7A) via a link 13L (FIG. 7A). A spring 13TS (FIG. 7A) preferably biases trigger 13T away from motor centerline 2000 and outwardly from housing 11.

Upon activation of switch 13S, power from power tool battery pack 12 is transferred to a motor 15. The motor 15 can drive a transmission 3000 (FIG. 4), which has an output spindle 16S (FIG. 8), which in an embodiment can be a cam spindle 150 (FIG. 7A). In an embodiment, the trigger 13T can have a portion which can be an upper trigger 13U (FIG. 6A) and a portion which can be a lower trigger 13L.

Definitions

Pipe, Tube & Hose

In addition to its ordinary and customary meaning, the term "pipe" herein means a tube or conduit for conducting products and/or physical materials which expressly includes in nonlimiting example a liquid, a gas, a plurality of pellets, a finely divided solid, a powder and/or other products. The term "pipe" also encompasses a meaning of a hollow tube with a cross section for conveyance of products. Herein, the material of construction of a "pipe" is to be broadly construed and expressly includes in non-limiting example polymers, plastics, metals, alloys and other materials. The term "pipe" expressly includes cross-linked polyethylene ("PEX") pipe. PEX pipe is a common term for cross-linked polyethylene pipe, which is also known as cross-linked polyethylene tube, PEX tube, or PEX tubing.

Herein the terms "pipe", "piping", "tube", "tubing" and "hose" are used synonymously.

In addition to its ordinary and customary meaning, the term "mouth" as regards a pipe refers to an open end portion of a pipe. Further, the open end portion includes a length of pipe sufficient to overlap an inserted portion of an expansion head 1330 and/or jaw assembly 30. In addition to its ordinary and customary meaning, the term "end" used in the context of a pipe end refers to an open end portion of a pipe. Further, the open end portion includes a length of pipe sufficient to overlap an inserted portion of an expansion head 1330 and/or jaw assembly 30. Herein, the terms "mouth" and "end" are used synonymously in the context of a pipe end which can be expanded by use of the expanding tool 10

A "pipe" as the term is used herein can have an inner diameter, a nominal diameter and an outer diameter. In operation of the expanding tool 10, at least a portion of the expansion head 1330 and/or jaw assembly 30 is inserted into the inner diameter of the pipe at the mouth and/or end of the pipe which is to be expanded. The expanding tool 10 can be activated and/or trigger to operate to expand the mouth and/or end of the pipe from having a first inner diameter to achieve a second greater inner diameter. Likewise, the mouth and/or end of the pipe can be expanded from a first nominal diameter to a second greater nominal diameter. Further the expanding tool 10 can operate to expand the mouth and/or end of the pipe from a first outer diameter to a second greater outer diameter.

Tool

Herein, the term "tool" refers to the expanding tool 10 having a battery attached and having an expansion head 1330 accessory also attached.

Bare Tool

Figure 11:
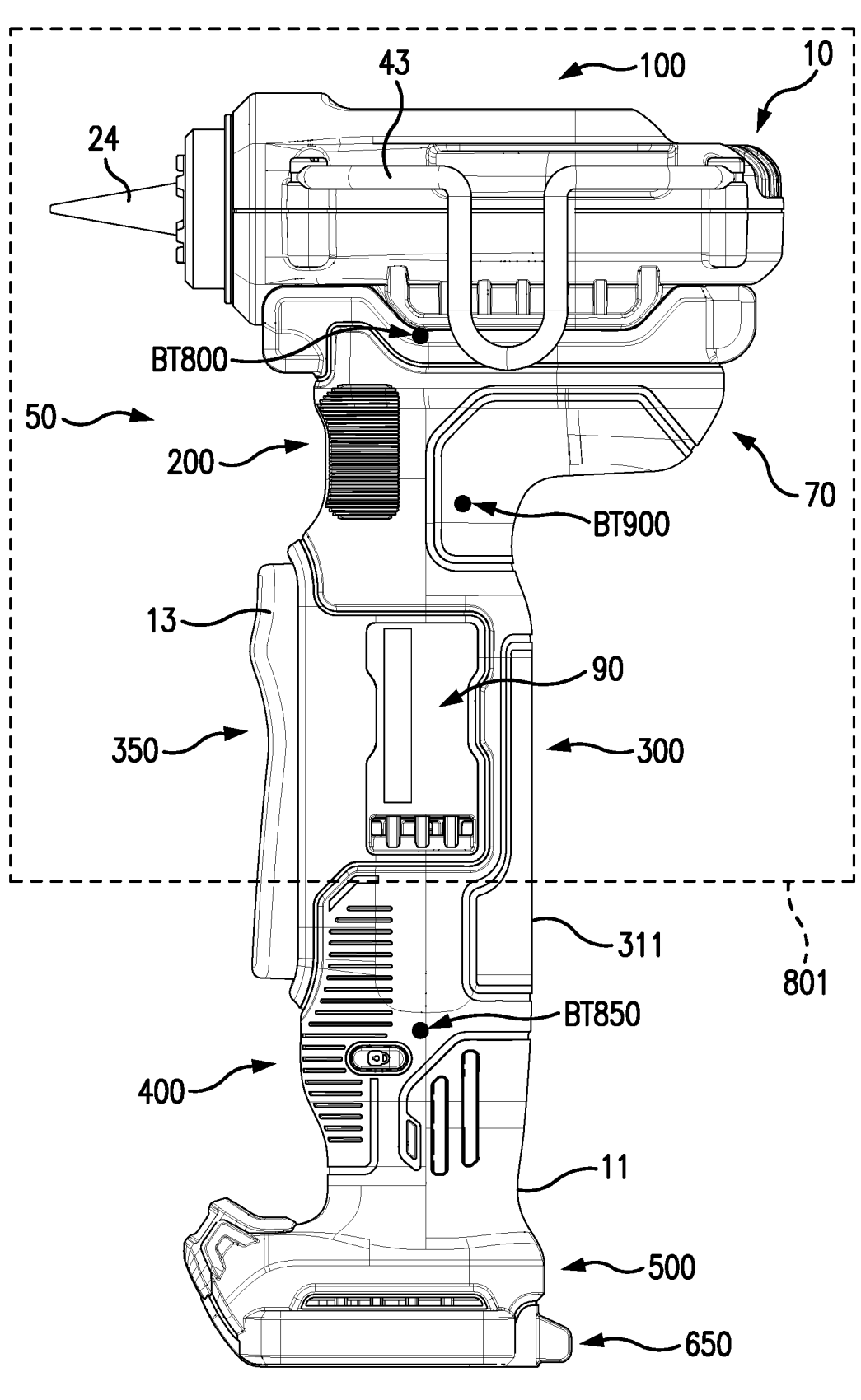
FIG. 11 expanding tool center of gravity locations for the bare tool without an expansion head and without a battery.

Herein, the term "bare tool" refers to the expanding tool 10 in the state in which a battery is not attached and an expansion head 1330 accessory is also not attached (FIG. 11).

Handle

Herein, in addition to its ordinary and customary meaning the term "handle" encompasses at least a portion of a grip 4000 configured to be grasped, gripped and/or held by an operator during operation of the expanding tool 10. In an embodiment, the term "handle", e.g. handle 300, encompasses the portion of the expanding tool 10 having at least a portion of a grip 2700, e.g. at least one of an upper grip 200 and a lower grip 400. Herein, the term "handle" expressly encompasses a handle housing 311 (FIG. 1) configured to be grasped by an operator during operation of the expanding tool 10 and which has at least a portion of a grip 4000. As shown in nonlimiting example in FIG. 10D, herein the term "handle" expressly encompasses a handle outer surface 1015 which includes at least a portion of a grip surface 1017 (FIG. 10D), as well as a handle inner surface 1016 (FIG. 4), A "handle" as used herein also has a handle inner volume 1020 which is at least in part surrounded by the handle housing 311.

Center Of Gravity

Herein, the term "tool center of gravity" 900, identified by the reference numbers "900" and "CG 900" in this specification and drawings refers to the center of gravity of the tool in the state of having a battery 12 and/or battery pack 12 attached and having an expansion head 1330 accessory also attached. Herein, center of gravity is abbreviated as "CG".

Herein, the term "bare tool center of gravity", identified by the reference number "BCG 900" refers to the center of gravity of the bare tool, not having a battery 12 attached and not having an expansion head 1330 accessory attached.

Determination Of Center Of Gravity

The determination of the center of gravity of an object is well-known to those skilled in the art to which the subject matter pertains.

As regards the disclosure of this application the method for determination of center of gravity is a suspension method using photo (photographic) superimposition for identifying the center of gravity of an irregularly shaped and/or complex object.

Photo superimposition (also as "photo imposition", or "photoimposition") overlays a number of images of the subject object suspended as respectively hung from various hinging points and having at least one laser plumb beam captured in each overlayed image. The intersection of the laser plumb beams in the composite image identifies the center of gravity.

This suspension and photo superimposition procedure for determining the center of gravity of the expanding tool 10, the bare tool and the tool having various configurations of battery 12 and nosepiece assembly 1330 attachment(s) can be practiced as follows:

Step 1: Provide a hanging frame from which, or in which, the subject object will be suspended which acts as a solid structure for conducting the center of gravity analysis;

Step 2: Provide a camera upon a flat surface at a distance from the suspended tool which can take an image of the suspended tool transected by the laser beam and where the camera image is taken perpendicularly to the path of the laser beam;

Step 3: Project a laser light vertically plumb across the object in line with the vertical dimension of the hanging frame such that the laser light will transect a suspended tool when suspended in the path of the laser beam (herein also as "laser plumb beam");

Step 4: Suspend the object in the hanging frame from a point of suspension, also called a hinging position, such that the laser plumb beam transects the suspended tool;

Step 5: Take an image of the suspended tool and transecting laser plumb beam as it hangs from a first point of suspension (hinging position);

Step 6: Repeat the procedure of steps 3-5 from different points of suspension (hinging positions) of the tool having the suspended subject of each trial transected by the same vertical laser beam and taking images from the same camera in the same position as for the first suspended image. Thus, multiple photographic images capture the subject suspended tool in different orientations and positions; and Step 7: Superimpose the images with each image oriented such that the tool's physical portions overlap and the laser beams of the images cross at a point in the overlapped image. Physical features and characteristics of the subject tool and/or reference points can be used to align the multiple images superimposed as a basis for analyzing the crossing and/or intersection(s) of the laser plumb beams. Thus, the resulting images from each trial can be superimposed such that the suspended tool in its chosen configuration are aligned so that its features overlap in the composite image and the respective laser plumb beams cross at a common point and/or location; and Step 8: Identify the common location and/or point at which the laser beams cross which identifies the center of gravity as represented in that composite view. The composite intersection, i.e. intersection of the laser plumb beams in the composite image, at which the laser plumb beams cross indicates the location of the center of gravity of the suspended object from the perspective of that composite view.

As regards this disclosure, at least two (2) hinging positions can be photographed and superimposed for each center of gravity determination.

This procedure applies to various configurations of the expanding tool, including but not limited to: a bare tool; a bare tool having an attached battery 12 and without a nosepiece assembly 1330; a bare tool having a nosepiece assembly 1330 and without a battery 12; and an expanding tool 10 having a battery 12 and a nosepiece assembly 1330.

The accuracy and confidence of the determination of the center of gravity location are increased by increasing the number of points of suspension tested and increasing the number of photographs having the laser plumb beam shown that are overlapped in the superimposed image.

Additionally, the accuracy of the determination of the center of gravity in X, Y, Z coordinate space is increased by conducting this suspension and photo superimposition method from a number of sides of the subject tool configuration. Thus, multiple composite views can be utilized, combined, modeled, or otherwise analytically and/or mathematically processed, to determine accurate locations of center of gravity in X, Y, Z coordinate space.

Thus, the dimensions of the location of the center of gravity can be determined by analysis of the composite photo superimposed images to a location in one or more dimension of X, Y, Z coordinate space. Additionally, upon determination of the location of the center of gravity by this suspension and photo superimposition method, the relative position of the center of gravity as it relates to one or more feature, aspect and/or part of the tool can also be determined.

Composite image and real tool configuration measurements, as well as scale relationship information between the real tool and the composite image(s) can be used to determine final numeric center of gravity values in relation to tool features and characteristics, or in one or more dimensions in X, Y, Z coordinate space.

The same procedure applies to determination of the center of gravity of the gearcase and motor by using suspension points respectively relevant to the gearcase and motor. This method for determining center of gravity can be used for identifying the center of gravity of individual parts, portions, stack-ups, assemblies, bare tools, tools with and without attachments, and expanding tools having batteries and nosepiece assemblies, as well as other applications.

Volume

Herein, in addition to its ordinary and customary meaning the term "grip volume" means the amount of space in three dimensions provided to accommodate at least a portion of an operator's hand when grasping a portion of the expanding tool designed for gripping by an operator's hand. As shown in FIG. 13C the term "grip volume" expressly includes a volume of a cylinder, e.g. an ovoid cylinder as shown in FIG. 13C, which has a major axis a minor axis and a height. The examples of each the grip volume 4000 as shown in FIG. 13C is large enough to accommodate and/or contain at least a part of the operator's hand including at lease a portion of the operator's palm and fingers, and can be of greater or smaller volume than shown. As used herein, the term "grip volume" expressly includes the volume encompassing at least a portion of a grip.

Herein, in addition to its ordinary and customary meaning the term "upper grip volume" means the "grip volume" associated with the amount of space in three dimensions provided to accommodate at least a portion of an operator's hand associated with an upper grip, e.g. upper grip 200 shown in FIG. 13C. As used herein, the term "upper grip volume" expressly includes the volume encompassing at least a portion of an upper grip.

Herein, in an embodiment, the term "upper grip volume" expressly includes the volumetric space encompassed by gripping area defined by the upper grip girth, e.g. a circumference in the range of 115 mm to 210 mm, e.g. 125 mm, 145 mm, 160 mm or 180 mm upper grip length and/or height in the range of 25 mm to 120 mm, e.g. 25 mm, 50 mm, 80 mm, 100 mm, and upper grip width in the range of 30 mm to 80 mm, e.g. 35 mm, 50 mm, 65 mm, 70 mm.

Herein, in addition to its ordinary and customary meaning the term "lower grip volume" means the "grip volume" associated with the amount of space in three dimensions provided to accommodate at least a portion of an operator's hand associated with a lower grip, e.g. lower grip 400 shown in FIG. 13C. As used herein, the term "lower grip volume" expressly includes the volume encompassing at least a portion of a lower grip.

Herein, in an embodiment, the term "lower grip volume" expressly includes the volumetric space encompassed by gripping area defined by the lower grip girth having a circumference in a range of 115 mm to 210 mm, e.g. 125 mm, 145 mm, 160 mm, or 180 mm, lower grip length and/or height in a range of 25 mm to 80 mm, e.g. 25 mm, 50 mm, or 80 mm, and lower grip width in a range of 30 mm to 80 mm, e.g. 35 mm, 50 mm, 65 mm, or 70 mm.

Battery & Power Source

In addition to its ordinary and customary meaning "battery" expressly includes a source of electric power consisting of one or more electrochemical cells with external connections for powering electrical devices. Additionally, the "battery" as used herein expressly includes a variety of batteries having different Ah ratings, battery packs, rechargeable batteries and other batteries sufficient to power the expanding tool 10.

Herein, the terms "battery" and "battery pack" are used synonymously.

In addition to its ordinary and customary meaning, the term "power source" means any source of electrical current to power and/or operate the expanding tool 10. The term "power source" expressly includes but is not limited to a power cord, a battery, a battery back, or other source providing current to the expanding tool 10 and/or to motor 15.

In an embodiment, the expanding tool 10 can have a power cord 9121 which powers at least the motor 15. In an embodiment, the weight distribution of AC version can be roughly taken as same as the DC version DCE410. In an alternate embodiment, which can be an AC powered version, the tool's weight distribution can be similar to DC embodiments. The AC powered version can use a power cord 9121 (not shown) and DC/AC PCBA (inside of housing) instead of a power tool battery pack 12. In an embodiment, the expanding tool 10 can have a power cord 9121 which provides power to the expanding tool 10.

Ampere-Hour

In addition to its ordinary and customary meaning, ampere-hour abbreviated as "Ah" is the amount of energy charge in a battery and/or battery pack that enables 1 ampere of current to flow for one hour. Additionally, as use herein a value of Ah means the length of time the tool 10 can operate when powered by a given battery 12 and/or battery pack 12. For example, 5 Ah, means that the battery and/or battery pack can provide 1 ampere of current for 5 hours. The tool with 5 Ah battery can run 5 hours under 1 ampere current load, or can run 1 hour with 5 amperes current load. For example, X Ah, means that the battery and/or battery pack can provide 1 ampere of current for X time in hours.

In embodiments, the power tool battery pack 12 used can be selected from a variety of Ah values, e.g. a 3 Ah, or 4 Ah, or 5 Ah, 10 Ah, 15 Ah, 20 Ah, or 30 Ah power tool battery pack 12 (also herein as "battery pack 12" and "battery 12") can be used.

The Term "Within"

In addition to the ordinary and customary meaning of the term "within", to be "within" means to be at least in part surrounded by and/or at least in part encompassed by. Further, as used herein the term "within" means to be at least in part contained, surrounded by and/or encompassed by a bounding feature or characteristic. In nonlimiting example, a tool center of gravity can be "within" housing 11 meaning at least a portion of housing 11 surrounds, contains and/or encompasses the tool center of gravity. Likewise, a tool center of gravity can be "within" handle 300 which means that at least a portion of handle 300 surrounds, contains and/or encompasses the tool center of gravity. In another example, a tool center of gravity can be "within" handle housing 311 meaning at least a portion of handle housing 311 surrounds, contains and/or encompasses the tool center of gravity. Herein, in addition to the ordinary and customary meaning of the term "within", to be within a volume means to be present and or located in at least a part of the space of that volume.

As used herein, in addition to its ordinary and customary meaning, the term "within" in the context of a centerline being "within" a grip volume 4000, an upper grip volume 204, a lower grip volume 404, a grip 2700 (FIGS. 4A and 13C), an upper grip 200, a lower grip 400 means that the centerline has at least a portion along its extended length which passes through, transects and/or is within the geometric volume being referred to. In nonlimiting example see FIGS. 10B and 13C. For a two-dimensional cross section, cross-sectional area, shape, boundary, curve, circumference or other two-dimensional boundary, in addition to its ordinary and customary meaning the term "within" in the context of a centerline being "within" means that the centerline has at least a point along its extended length which is inside at least a portion of a boundary of the two-dimensional shape. In nonlimiting example see FIG. 10E

In another example, the meaning of "within" an operator's grip means that when an operator grips a portion of the expanding tool 10, e.g. a grip 2700 and/or a tool center of gravity 900 and/or a motor centerline 2000 and/or a transmission centerline 3000 and/or a motor axis 1515 and/or a transmission axis 3011 (FIG. 4) and/or other feature is at least in part surrounded, contained and/or encompassed by a portion of an operator's hand 5000, e.g. fingers 5003, palm 5002, gripping cavity 901

Bounding

In addition to its ordinary and customary meaning, as used herein the terms "bound", "bounds", "bounding" and "bounded" with reference e.g. to "bounding" a center of gravity, or a center of gravity being "bounded", means that the center of gravity is confined within a finite space regardless of the geometric orientation of the expanding tool

10 in X, Y, Z coordinates. For example, in embodiments the methods disclosed herein achieves "bounding the center of gravity" with a variety of defined limits. In embodiments of the expanding tool 10 as an article, the center of gravity can be "bounded" within limits, or a design can "bound" the center of gravity within limits.

An ergonomic advantage of the expanding tool 10 is that the tool center of gravity 900 (or as "CG 900") is bound within geometric and physical limits such that when an operator holding the expanding tool 10 orients the expanding tool 10 in a variety of postures and/or positions within X, Y, Z coordinate space that the center of gravity is contained, herein "bounded" within a defined and/or limited space.

In nonlimiting example, a of gravity 900 can be bounded between a cam spindle centerline plane and a portion of said motor. In another example, a center of gravity 900 can be bound between said wedge centerline plane and a transmission plane. In yet another example, the tool design can result in "bounding" a center of gravity 900 within a volume, e.g. a tool center of gravity 900 can be bound within a grip volume 4000 and/or a center of gravity containment space 9900, and/or an extended center of gravity containment space 9999, and/or center of gravity containment volume 9899. In non-limiting example a center of gravity 900 could be bounded in one or more of a CG containment space 9900 (FIGS. 7C and 7D), an extended CG containment space 9999 and/or a CG containment volume 9899. Herein, the abbreviation "CG" is used to mean "center of gravity", e.g. "CG containment volume 9899" means "center of gravity containment volume 9899". The abbreviation "CG" standing alone in a phrase or drawing means "center of gravity".

Numeric Values

Numeric values and ranges herein, unless otherwise stated, also are intended to have associated with them a tolerance and to account for variances of design and manufacturing. Thus, a number can include values "about" that number. For example, a value X is also intended to be understood as "about X". Likewise, a range of Y-Z, is also intended to be understood as within a range of from "about Y-about Z". Unless otherwise stated, significant digits disclosed for a number are not intended to make the number an exact limiting value. Variance and tolerance are inherent in mechanical design and the numbers disclosed herein are intended to be construed to allow for such factors (in non-limiting e.g., ±10 percent of a given value). Likewise, the claims are to be broadly construed in their recitations of numbers and ranges.

The Expanding Tool

Figure 16:
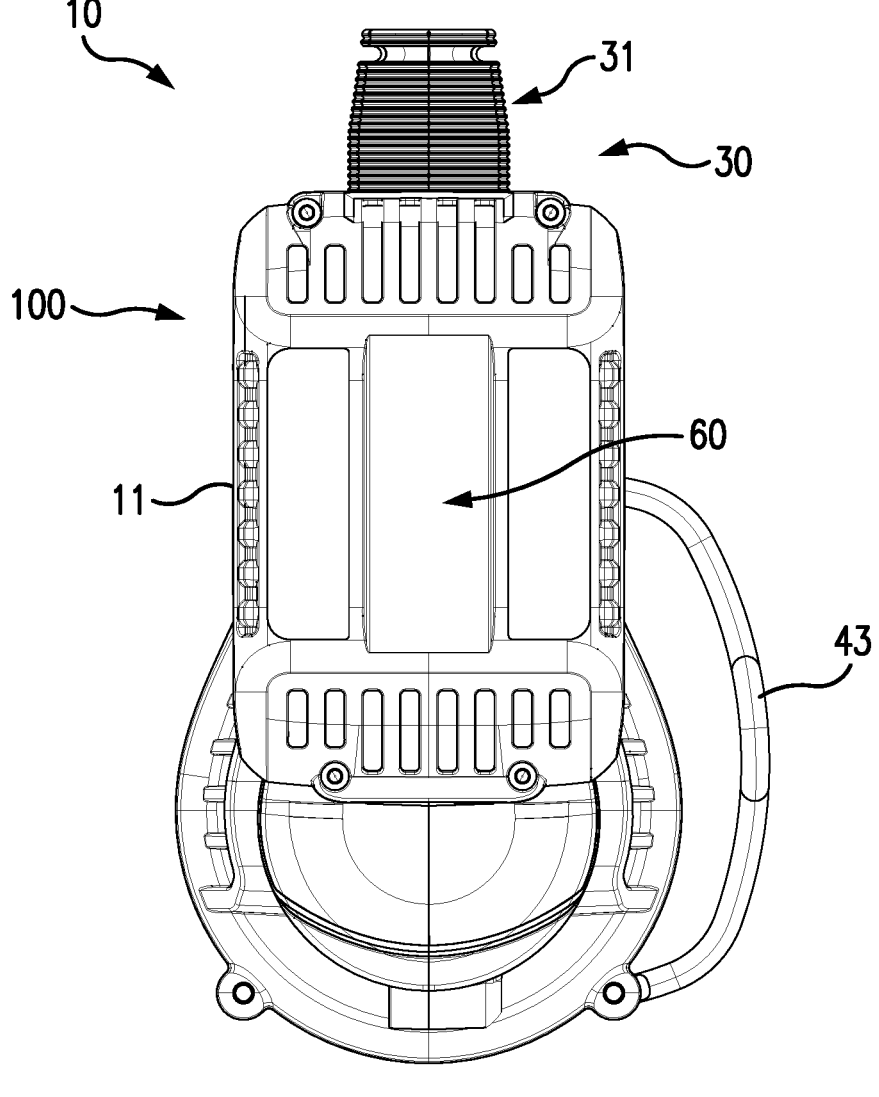
FIG. 16 is a bottom side view of the expanding tool.

FIG. 1 shows a perspective view of the expanding tool 10 and a variety of its features. FIG. 1 shows perspective views of a right side 80, a front side 50, and a top side 40 of the expanding tool 10. FIG. 1 also identifies a left side 90 a bottom side 60 and a back side 70. A left side 90 is also shown e.g. in FIGS. 2 and 10A. The bottom side 60 is shown in FIG. 16. These references to sides are also used herein to refer to orientations of the mechanical features of the tool, e.g. the back side 60 of battery 12. FIG. 1 shows a power source 912 which is a battery 12.

In an embodiment, the expanding tool 10 can have a foot assembly 500 to which a battery 12, or battery pack 600 (FIG. 10) can physically and electrically connected to the expanding tool 10 to operably provide power and/or electric current to drive the motor 15 (FIG. 4) and other electrical components of the expanding tool 10.

The expanding tool 10 can have a head assembly 100 and an expansion head 1330 sized for expanding pipes having a range of pipe diameters and pipe sizes. In embodiments, the expanding tool 10 can be used with a variety of types of the expansion head 1330. The expansion head 1330 chosen for use can be selected from various sizes and types, and which can be driven by a wedge 24 (FIG. 7A). These various types and sizes of the expansion head 1330 can be reversibly attached to the expanding tool 10 and used interchangeably as selected by the operator for compatibility with the pipe size of the pipe to be expanded. An expansion head 1330 can be selected to be compatible for use to expand pipes having nominal pipe diameters in a range from ⅜ in to 6.0 in, or ⅜ in in to 3.0 in, or 0.5 in to 2 in, with nominal pipe sizes e.g.: 0.5 in, 0.75 in, 1.0 in, 1.25 in, 1.5 in, 2.0 in, 2.5 in, 3.0 in, 4.0 in, 4.5 in, 5.0 in.

In the embodiment of FIG. 1, the expanding tool 10 is shown in a vertical orientation having an expansion head 1330 which has a jaw assembly 30 having a plurality of jaws 31. In nonlimiting example, the expansion head 1330 has six (6) jaws 31, although 1 . . . n jaws can be used, where n can be a small or large number, e.g. 1-6, or 8, or 10, or greater. FIG. 1 shows the expansion head 1330 having a first jaw 31A, a second jaw 31B, a third jaw 31C, a fourth jaw 31D, a fifth jaw 31E, and a sixth jaw 31F. FIG. 1 also shows optional ribs 31R of the plurality of jaws 31. In an embodiment, a cap 32 can be used to cover a portion of the jaw assembly 30. In an embodiment, two (2) jaws 31 can be used.

FIG. 1 shows a housing 11 having and handle housing 311 of handle 300. The handle 300 can have an upper grip 200 and a lower grip 400. FIG. 1 shows a trigger 13T configured in the handle 300. In an embodiment, the trigger 13T can have an upper trigger 13U and a lower trigger 13L.

In an embodiment, the expanding tool 10 can have a belt hook 43, or other means of reversibly securing the expanding tool 10 to a user's clothing, or other item, or equipment.

Figure 1A:
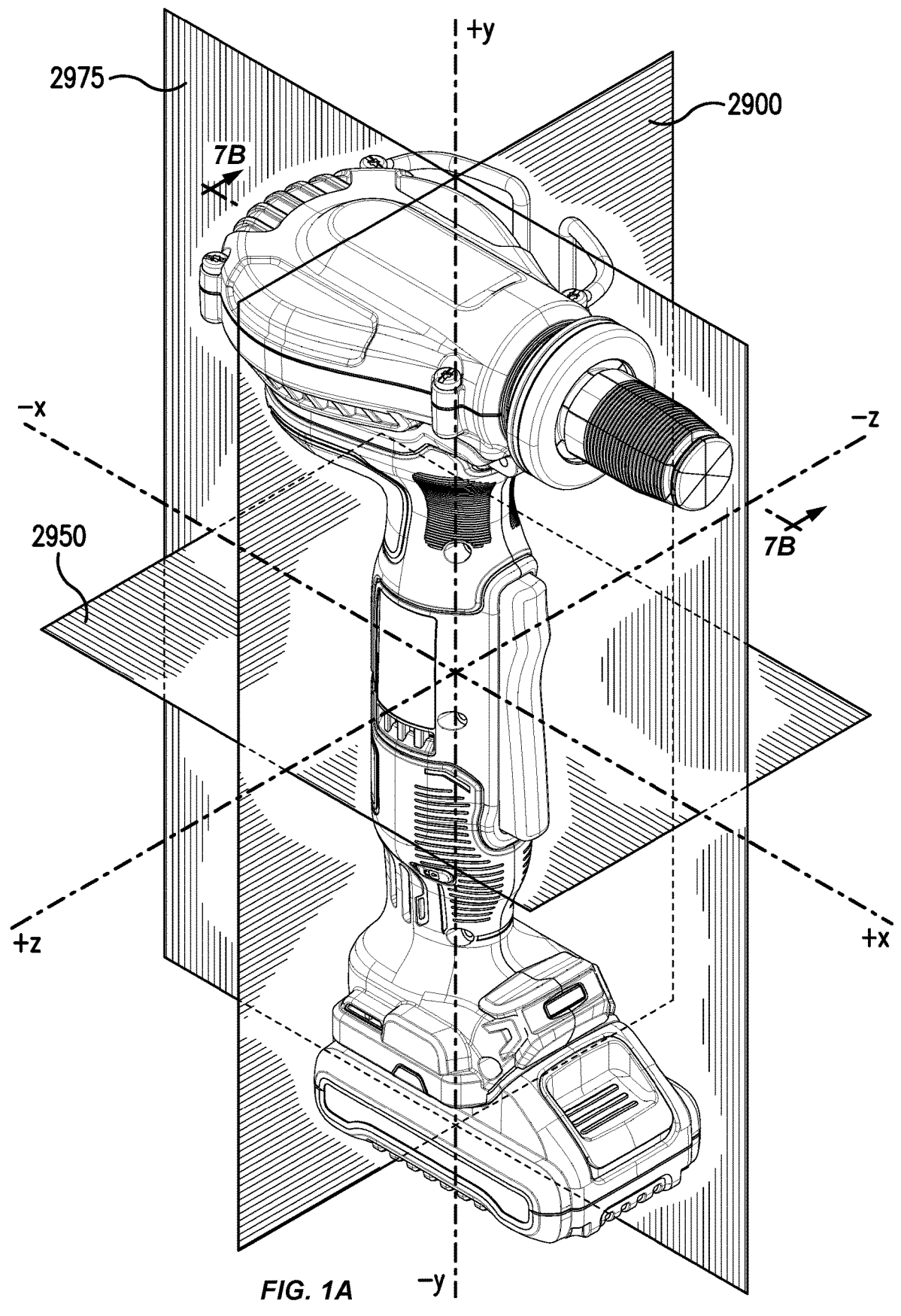
FIG. 1A is a perspective view of the expanding tool showing axis planes.

FIG. 1A is a perspective view of the expanding tool showing centerline planes oriented on a X, Y, Z coordinate system showing X, Y and Z axes.

FIG. 1A shows a motor centerline plane 2900, a tool centerpoint plane 2950, and a length centerline plane 2975. In embodiments, the weight of the expanding tool 10 can be balanced on either side of the motor centerline plane 2900 which can place the center of gravity on the motor centerline plane 2900. In embodiments, the weight of the expanding tool 10 can be balanced on either side of the centerline plane 2975 which can place the center of gravity on the centerline plane 2975. In embodiments, the weight of the expanding tool 10 can balanced on either side of the tool centerpoint plane 2950 which can place the center of gravity on the centerline plane 2975.

Figure 2:
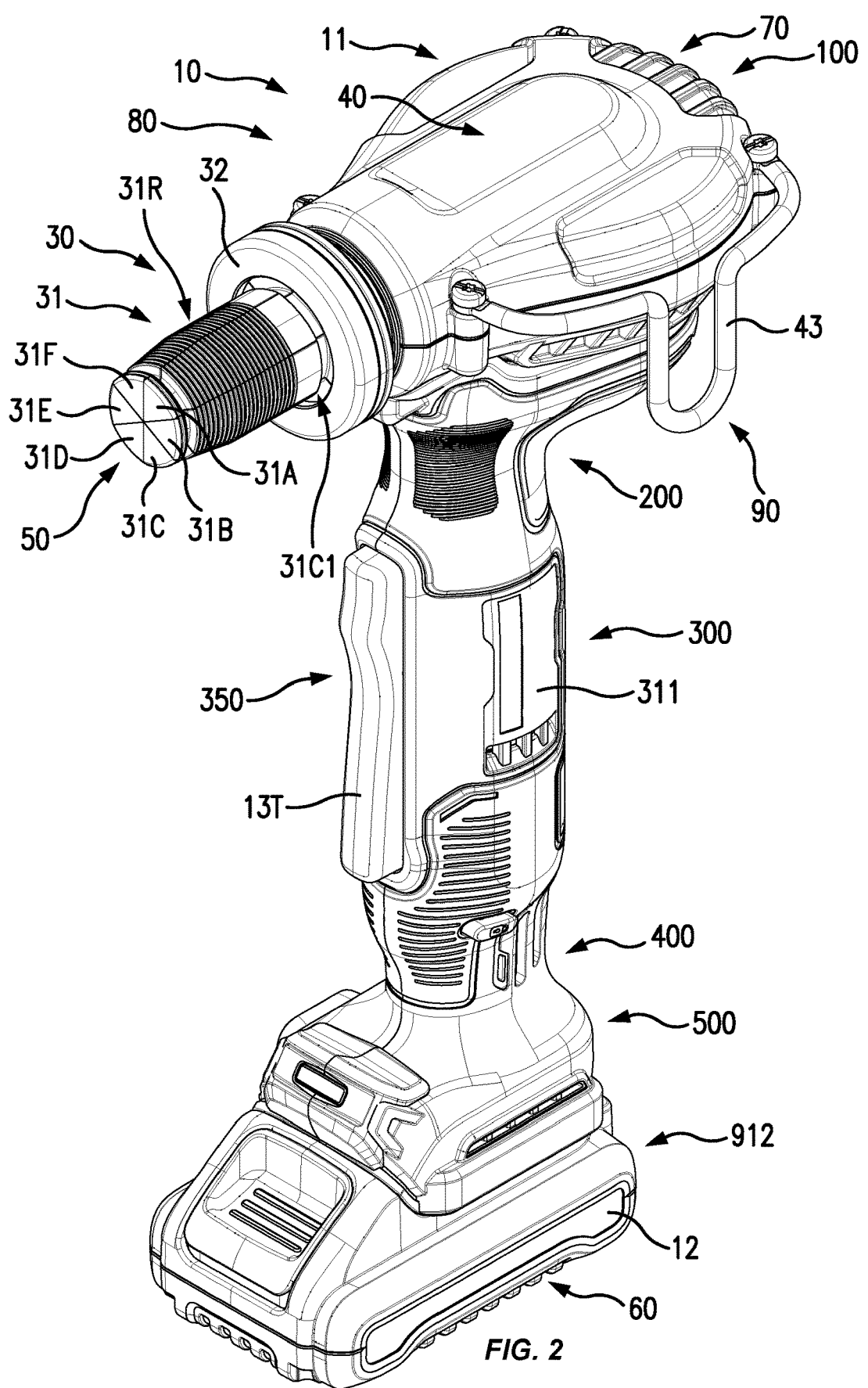
FIG. 2 is a second perspective view of the expanding tool.

FIG. 2 is a second perspective view of the expanding tool 10.

Figure 3A:
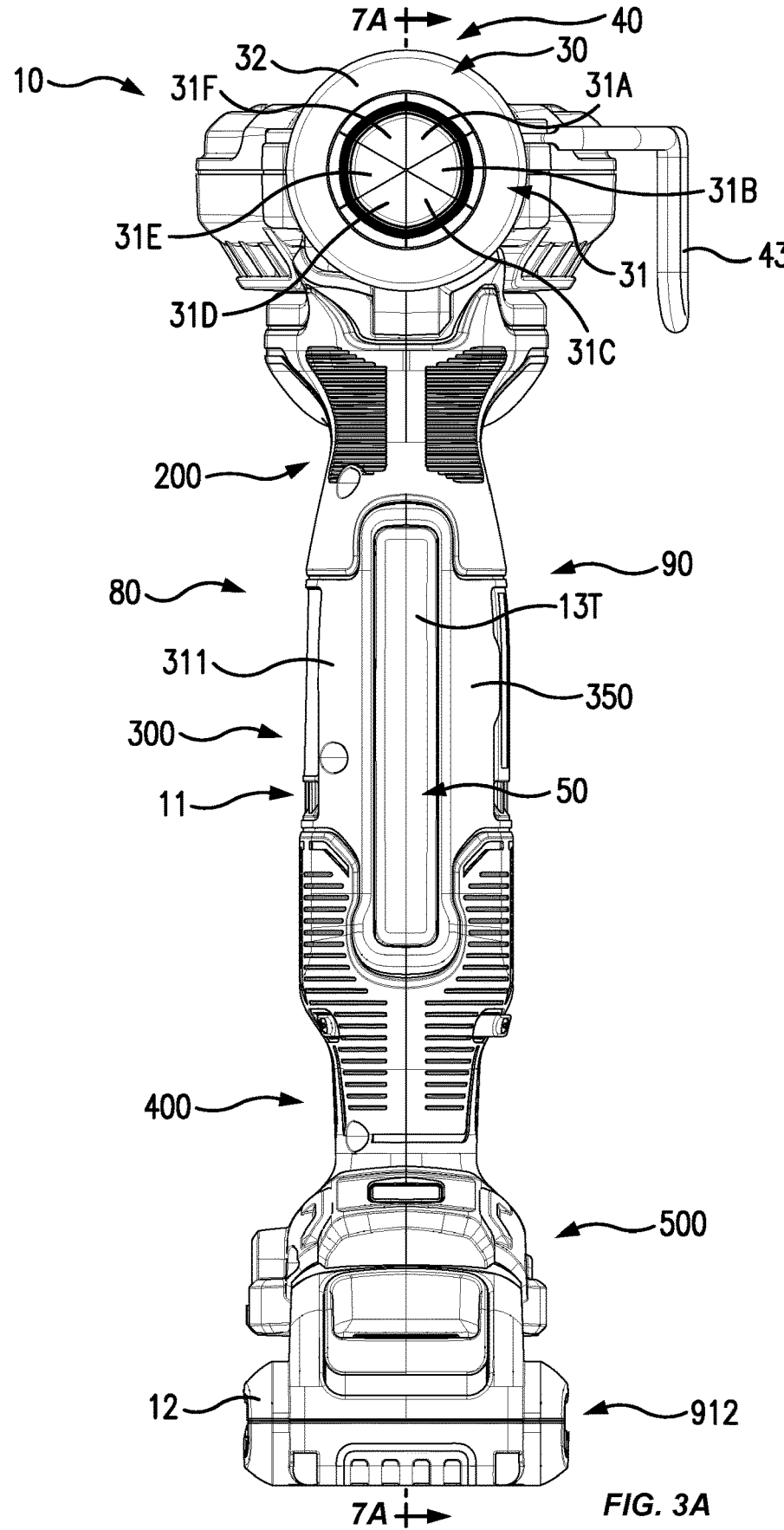
FIG. 3A is a front-side view of the expanding tool.

FIG. 3A is a front-side view of the expanding tool 10.

Tool Center Of Gravity

Figure 3B:
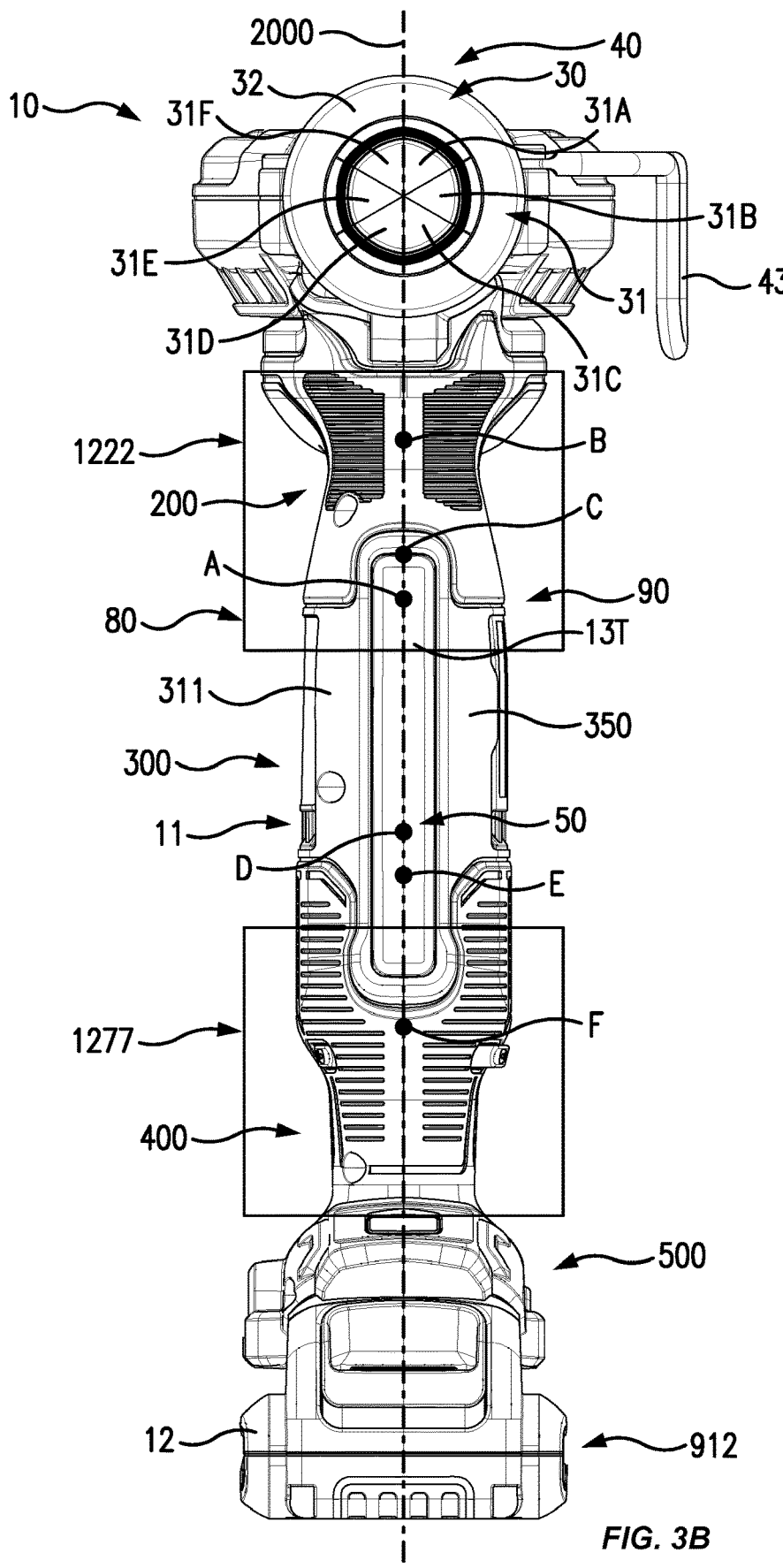
FIG. 3B is a front-side view of the expanding tool showing a variety of tool center of gravity locations.

FIG. 3B is a front side 50 view of the expanding tool showing a variety of tool center of gravity CG 900 locations, respectively marked A, B, C, D and E, as well as motor center of gravity MCG 850 marked F.

In an embodiment, the design of the expanding tool 10 provides an ergonomic configuration of the cam spindle 150 (FIG. 7A) and upper grip 200, as well as the upper grip area 1222 and lower grip area 1277. In an embodiment, the tool center of gravity CG 900 position can be located within (or inside of) the upper grip 200. In an embodiment tool center of gravity CG 900 position can be located within (or inside of) the lower grip 400.

In an embodiment, the CG 900 positions of the tool having a battery pack selected from a number of battery packs, i.e. 2 Ah, 4 Ah, 5 Ah, 10 Ah and 20 Ah, attached and an expansion head 1330 attached can have a tool center of gravity 900 located respectively within and/or proximate to the upper grip 200 and/or an upper gripping area 1222, or within and/or proximate to the lower grip 400 and/or lower gripping area 1277, or within and/or proximate to the handle 300 and/or the handle interior volume 345.

In embodiments, a tool center of gravity 900 with a 10 Ah power tool battery pack 12 can be lower and off to the right as compared to when a 4 Ah battery pack 12 is attached. Center of Gravity Examples of FIG. 3B

In the embodiments shown in FIG. 3B, the tool center of gravity 900 can be located within the upper grip 200 and/or upper grip volume 204 (FIG. 13C), or within the lower grip 400 and/or lower grip volume 404, depending upon which respective battery 12 and which respective expansion head 1330 are attached.

FIG. 3B shows a tool center of gravity A which is an example of a tool center of gravity CG 900 location with 5 Ah power tool battery pack 12.

Tool center of gravity B is an example of a tool center of gravity CG 900 location with 2 Ah power tool battery pack 12 and an expansion head 1330 having 1.5" jaws.

Herein, a recitation of "having X" jaws" where "X" is a dimension, e.g. "having 1.5" jaws", means that the expansion head 1330 has a plurality of jaws 31 having closed jaws outer diameter 9330 of "X" dimension, e.g. 1.5".

Tool center of gravity C is an example of a tool center of gravity CG 900 location with 2 Ah power tool battery pack 12 and an expansion head 1330 having 1" jaws.

Tool center of gravity D is an example of a tool center of gravity CG 900 location with 15 Ah power tool battery pack 12 and an expansion head 1330 having 1.5" jaws.

Tool center of gravity E is an example of a tool center of gravity CG 900 location with 15 Ah power tool battery pack 12 and an expansion head 1330 having 1" jaws.

Motor center of gravity F is an example of a motor center of gravity MCG 850.

In this example perspective of FIG. 3B, the tool center of gravity CG 900 positions when using any of the batteries and expansion heads disclosed herein can be located along the motor centerline 2000 from a front view.

In this example perspective of FIG. 3B, the tool center of gravity CG 900 positions when using any of the batteries and expansion heads disclosed herein can be located within and/or proximate to either of the upper grip 200 and/or upper grip area 1222, or lower grip 400 and/or lower grip area 1277. The CG 900 can be within and/or proximate to handle housing 311.

As shown in the figure, if the weight of the power tool battery pack 12 is kept equal, then the tool center of gravity 900 will shift upward in location as the weight of the plurality of jaws 31 increases.

FIG. 4 is a front side 50 view cross section of the expanding tool 10 taken at the motor centerline 2000. The embodiment of FIG. 4 shows the motor 15 configured in the handle 300 such that the motor centerline is colinear with the fifth (5$^{th}$) stage drive gear centerline 3570. FIG. 4 shows an embodiment of a configuration of transmission 3000 aligned with the motor centerline 2000. In an embodiment, a transmission stages 1-4 centerline 3900 can be aligned collinearly with driveshaft 3450, aligned collinearly with driveshaft centerline 3459, and is aligned collinearly with 5th stage drive gear centerline 3570.

FIG. 4 shows an embodiment of a configuration of transmission 3000 configured such that the transmission centerline 3010 is colinear with transmission stages 1-4 centerline 3900 which is colinear with the 5$^{th}$ stage drive gear centerline 3570. Thus, in an embodiment, the transmission centerline 3010 can be colinear with the respective centerlines of each of stages 1-4 and the 5$^{th}$ stage drive gear centerline 3570 as shown in FIGS. 4, 7A, 8, 9A, 9B, 10C, 13A, and 13C.

Figure 5:
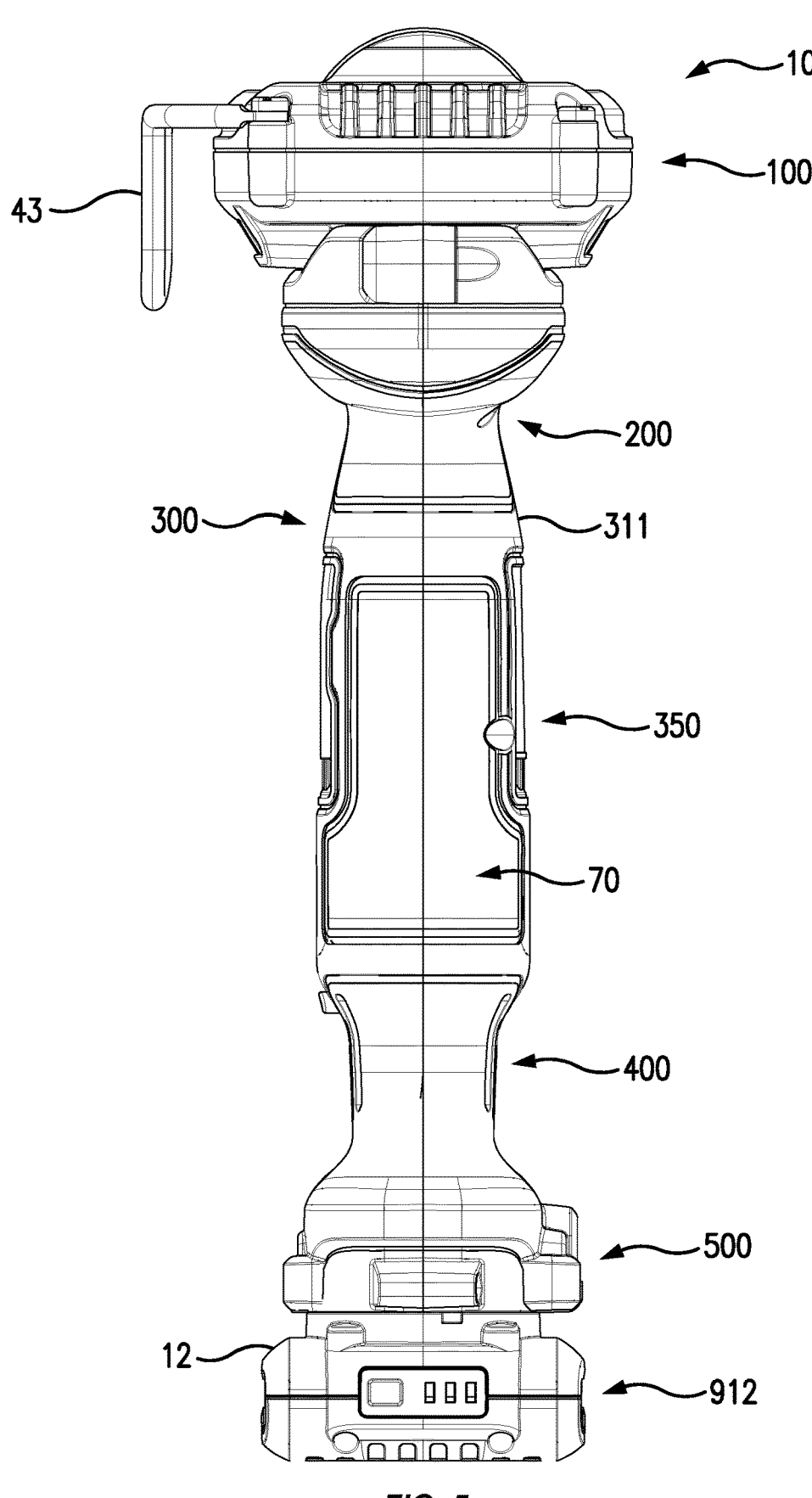
FIG. 5 is a back-side view of the expanding tool.

FIG. 5 is a back side 70 view of the expanding tool 10.

Figure 6A:
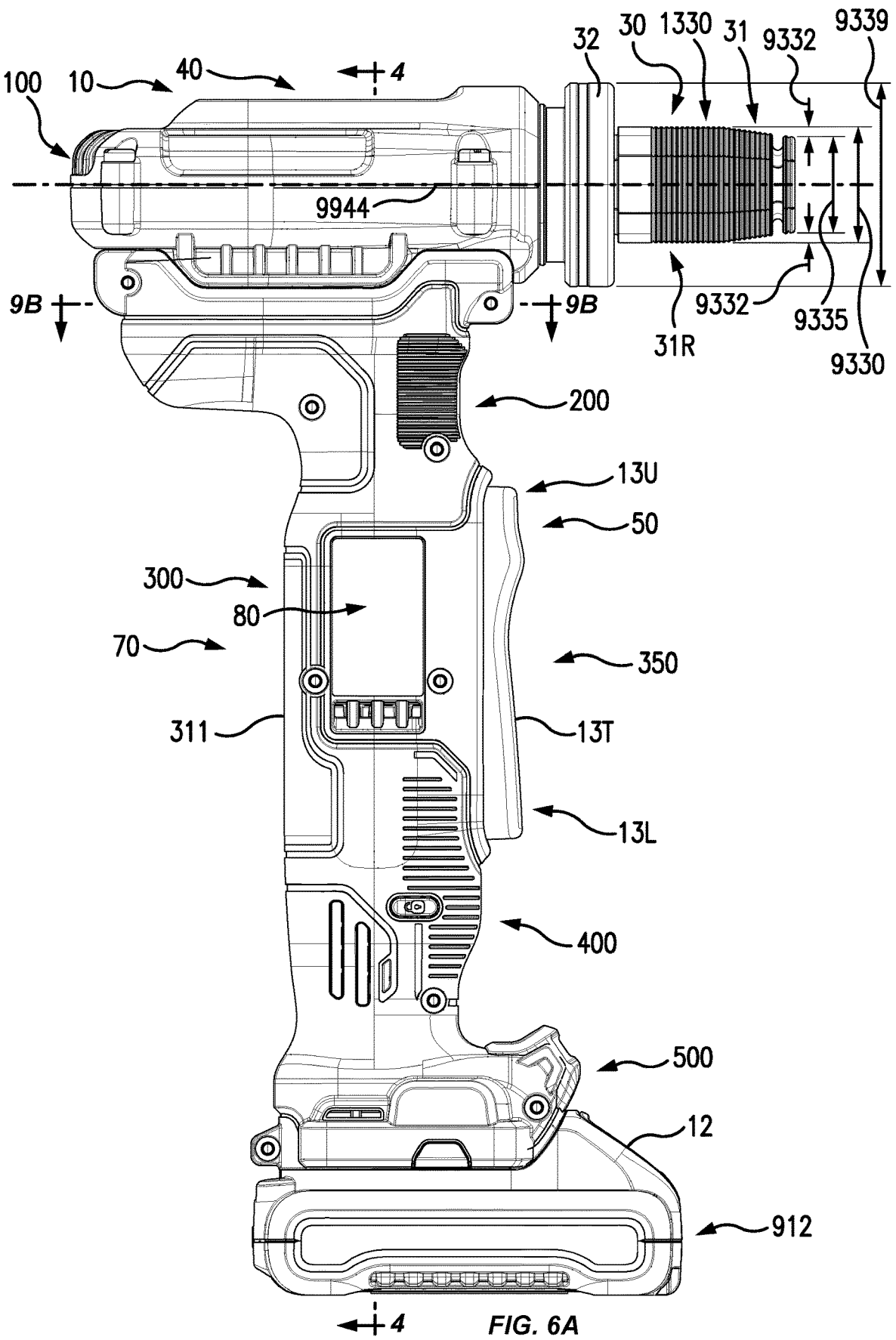
FIG. 6A is a right-side view of the expanding tool.

FIG. 6A is a right side 80 view of the expanding tool 10 showing the expansion head 1330 having a plurality of jaws 31 in a closed configuration having a closed jaws outer diameter 9330, and a closed jaws end outer diameter 9335. A jaws diameter reduction 9332 and a cap outer diameter 9339 are also shown.

Figure 6B:
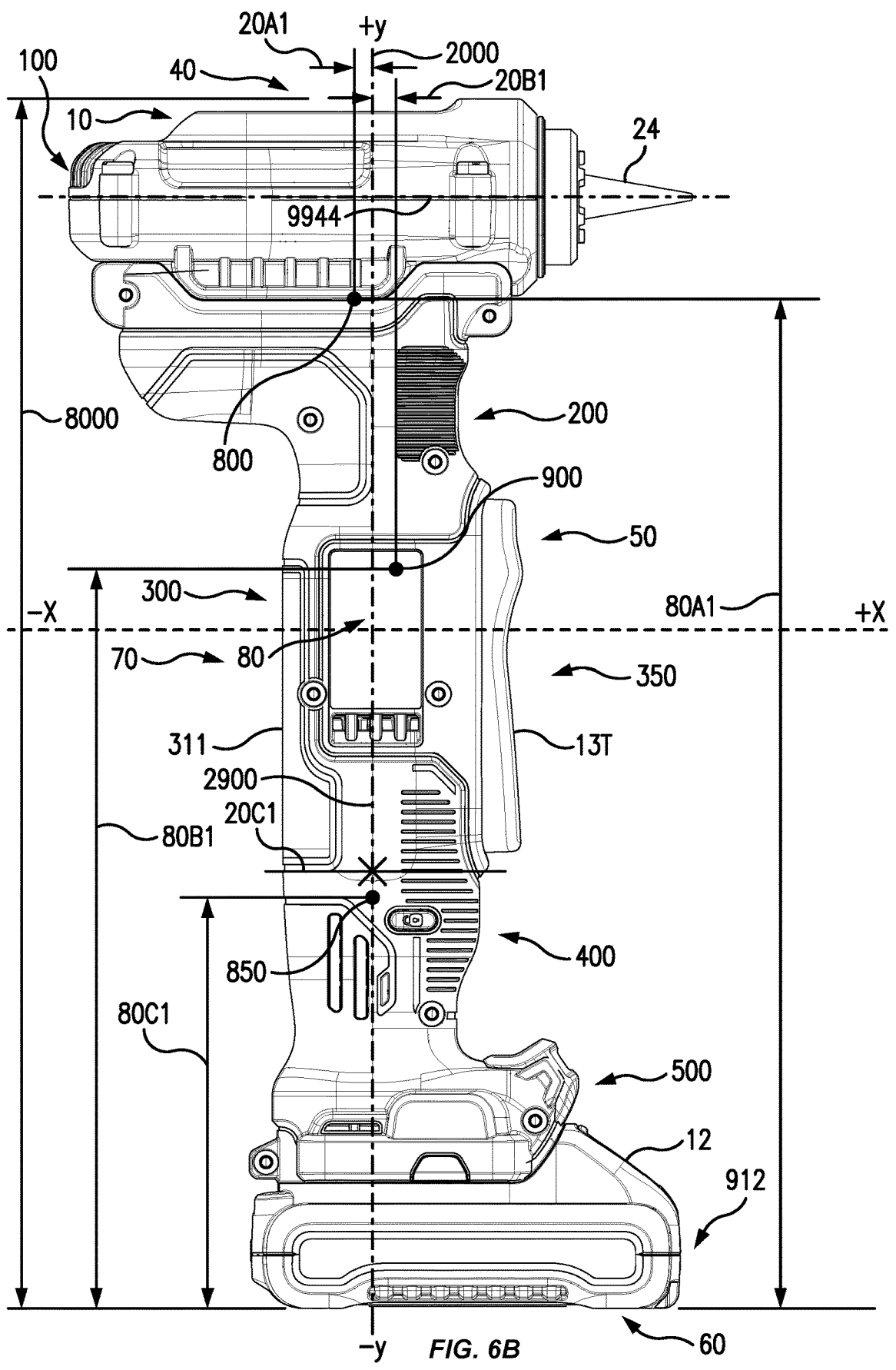
FIG. 6B is a right-side view of the expanding tool showing a variety of tool center of gravity locations.

FIG. 6B is a right-side view of the expanding tool 10 showing a gearbox assembly (aka a "gearcase assembly") center of gravity 800, motor center of gravity 850, and the tool center of gravity CG 900 as configured when the expanding tool 10 is used with a 5 Ah power tool battery pack 12 attached and no expansion head 1330. Herein the terms "gearbox" and "gearcase" are used synonymously, as are "gearbox assembly" and "gearcase assembly".

As shown in FIG. 6B, the tool center of gravity CG 900 can be configured at a position along the tool height 8000 between the gearbox assembly center of gravity 800 and the motor center of gravity 850. The gearbox assembly center of gravity 800 and the motor center of gravity 850 positions are independent of the type of battery pack 12 and/or nosepiece assembly attached to the expanding tool 10. The gearbox assembly center of gravity 800 location is fixed and remains constant based upon a given construction of a gearbox assembly 801. The motor center of gravity 850 location is fixed and remains constant based upon a given construction of a motor 15.

Differently, in embodiments the position of the tool center of gravity CG 900 (also herein as "900") is in-part dependent upon the type of battery 12 and/or expansion head 1330 and/or the type of the plurality of jaws 31 attached to the expanding tool 10. In embodiments, the position of the tool center of gravity CG 900 can be located in various respective positions along the tool height 8000 between the gearbox assembly center of gravity 800 and the motor center of gravity 850 depending upon which type of battery pack 12 and/or expansion head 1330 and/or the type of the plurality of jaws 31 are attached. For example, see FIGS. 10B and 15B which show nonlimiting examples of the tool center of gravity CG 900 locations when various combinations of battery pack 12 and/or expansion head 1330 and/or the type of the plurality of jaws 31 are attached, e.g. 900A, 900B, 900C, 900D and 900E.

In embodiments, the location of the tool center of gravity CG 900 can have different locations based upon different combinations of battery pack 12 and/or expansion head 1330 and/or the type of the plurality of jaws 31 attached, but can also be bounded along the tool height 8000 between the gearbox assembly center of gravity 800 and the motor center of gravity 850 and/or bounded within a CG containment space 9900 and/or an extended CG containment space 9999 and/or located with the handle 300 and/or between the cam spindle centerline plane 1900 and the motor centerline plane 2900 and/or other boundaries or tool features disclosed herein.

In the nonlimiting example embodiment shown in FIG. 6B, each of the centers of gravity are shown at an example location in the X, Y coordinate plane for the expansion tool 10 having a 5 Ah power tool battery pack 12 attached and no expansion head 1330 attached, i.e.:

the gearbox assembly center of gravity 800 is shown at a −X distance 20A1 of 4.5 mm from the motor centerline 2000 and a Y distance 80A1 of 316 mm from the bottom side 60 of the expanding tool having the 5 Ah power tool battery pack 12 attached and no expansion head 1330;

the expansion tool center of gravity 900 is shown at a +X distance 20B1 of 8.5 mm from the motor centerline 2000 and a Y distance 80B1 of 238 mm from the bottom side 60 of the expanding tool having the 5 Ah power tool battery pack 12 attached and no expansion head 1330; and the motor center of gravity 850 is shown at a position on the motor centerline plane 2900 coplanar with motor centerline 2000, which is 0 mm X distance 20C1 from motor centerline 2000, and at and a Y distance 80C1 of 140 mm from the bottom side 60 of the expanding tool having the 5 Ah power tool battery pack 12 attached and no expansion head 1330.

FIG. 7A is a right side 80 cross section of the expanding tool 10 taken at the motor centerline 2000. FIG. 7A shows a vertical configuration in which a stack up of selected components in the direction from the bottom side 60 to the top side 40 and configures the motor 15 proximate to the lower grip 400 and below the transmission 3000. The embodiment of FIG. 7A shows the motor centerline 2000 colinear with the transmission stages 1-4 centerline 3900, colinear with a driveshaft centerline 3459 and also collinear with a fifth (5$^{th}$) stage drive gear centerline 3570.

Additionally, as shown in FIG. 7A, the motor centerline 2000 can extend through at least a portion of wedge 24. Thus, from an ergonomic standpoint, the motor 15 is housed in the handle 300 and is configured below at least a portion of each of the transmission 3000, stages 1-4 of the transmission 3000, the driveshaft 3450, and head assembly 100. FIG. 7A shows the motor 15 configured below at least a portion of wedge 24. The motor 15 can be optionally configured below at least a portion of cam 221, which can be a radial cam 21. In an embodiment, at least a part of the cam 221 can be configured vertically above, or vertically overlapping, at least a part of the motor 15. The motor 15 can be optionally configured below at least a portion of cam 221 and at least a portion of wedge 24.

FIG. 7A shows an example of an upper grip volume 204 which accommodates a portion of a hand 5000 of an operator when the hand 5000 grips the upper grip 200. In the embodiment of FIG. 7A, the cam 21 is offset from the motor centerline 2000 by a cam spindle centerline distance 2100 (FIG. 9A) in a direction toward the head back end 75. FIG. 7A also shows an upper palm grip volume 205 and an upper finger grip volume 209. An upper grip handle inner volume 208 is also shown. The upper grip volume 205 and the lower grip volume 404 are also shown in FIG. 13C.

FIG. 7A shows a cam offset 2221 which is configures at least a portion of cam 221, e.g. the radial cam 21, at a distance from the motor centerline 2000. In an embodiment, cam offset 2221 of cam 221, or as the offset of the radial cam 21 as shown in FIG. 7A, ergonomically positions a portion of the cam spindle 150 such that when a user grips the upper grip 200 a portion of the hand 5000 of an operator hand is configured between the cam spindle 150 and at least one of a portion of the motor 15, a portion of the transmission 3000, a portion of the driveshaft 3450 and the motor centerline 2000. In an embodiment, the cam offset 2221 can be in a range of 5 mm to 100 mm, e.g. 10 mm, 11 mm, 15 mm, 25 mm, 40 mm, 55 mm, 80 mm, or 90 mm.

The cam offset 2221 of cam 221, which in nonlimiting example is shown in FIGS. 7A, 12B, 13A and 13B as the offset of the radial cam 21, ergonomically positions at least a portion of the upper palm grip volume 205 between a portion of the cam spindle 150 and at least one of a portion of the motor 15, a portion of the transmission 3000, a portion of the driveshaft 3450 and the motor centerline 2000.

The cam offset 2221 of cam 221, e.g. as shown in nonlimiting embodiment the offset of the radial cam 21 as shown in FIG. 7A, ergonomically positions at least a portion of the upper palm grip volume 205 is configured between a portion of the cam spindle drive gear 3550G and at least one of a portion of the motor 15 and/or a portion of the transmission 3000 and/or a portion of the driveshaft 3450 and/or the motor centerline 2000.

In an embodiment, the entirety of cam 21 can be at a distance from motor centerline 2000 toward a head back end 75. In an embodiment, the motor centerline 2000 does not intersect any part of cam 21.

In the embodiment of FIG. 7A, a cam axis centerline 229 can be colinear with a cam spindle centerline 1000, each of which can have a portion configured vertically between the head back end 75 and at least a portion of the handle 300 and/or handle housing 311.

Figure 9A:
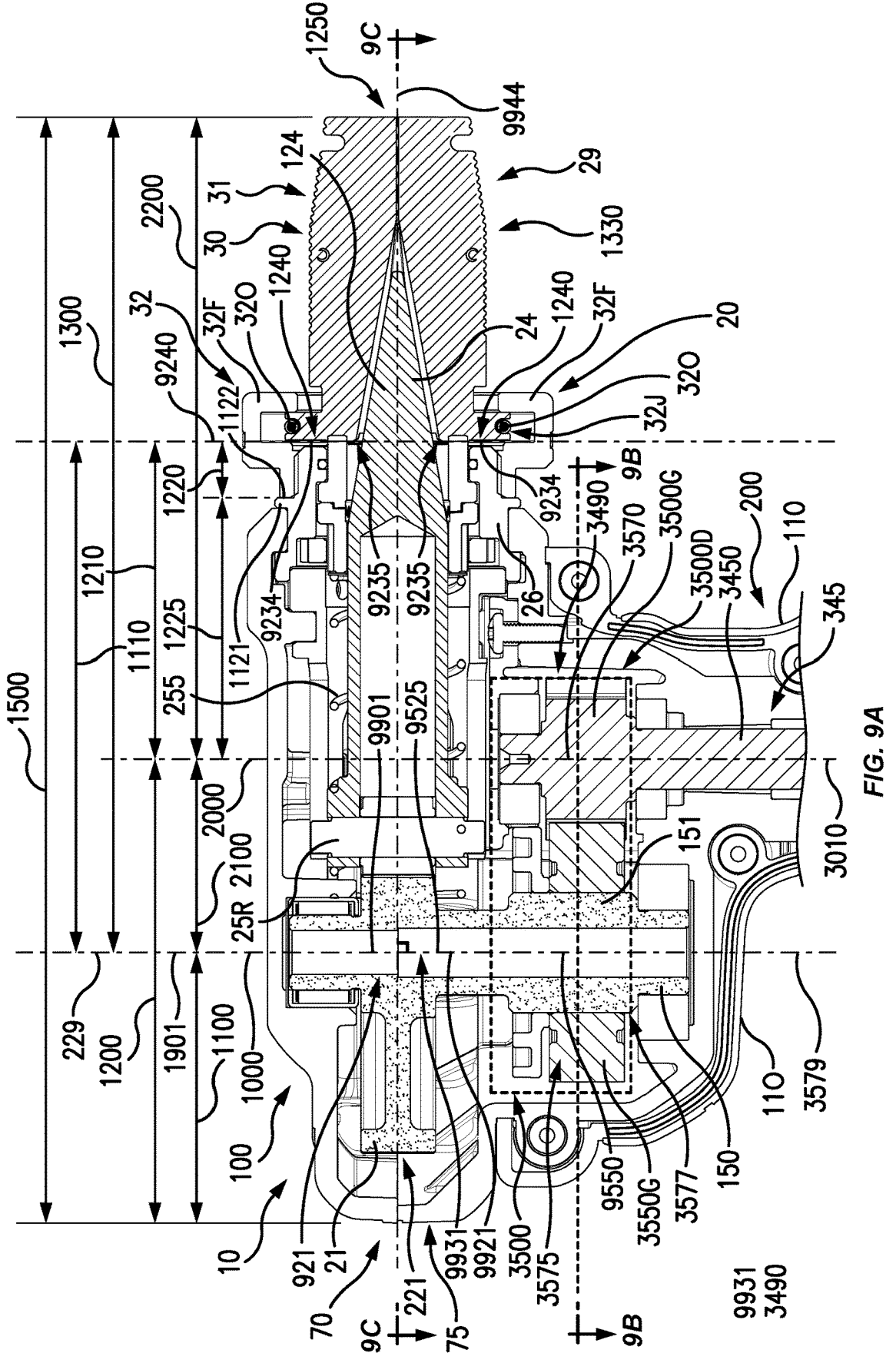
FIG. 9A is a detail cross sectional view from the right-side of the head assembly.

In an embodiment, the cam offset 2221 can be the same as the cam spindle centerline distance 2100 as shown in FIG. 9A.

In an embodiment, as shown in FIG. 7A, the motor axis 1515 and motor centerline 2000 (FIG. 7A) can be located within the handle interior volume 345 of the upper grip 200 of the handle housing 311. The motor axis 1515 and motor centerline 2000 (FIG. 7A) can also be located within the handle interior volume 345 of the lower grip 400 of the handle housing 311. In the embodiment of FIG. 7A, the motor axis 1515 and motor centerline 2000 (FIG. 7A) can also be located within the handle interior volume 345 of the upper grip 200 and within the handle interior volume 345 of the lower grip 400.

FIG. 7A shows, the expanding tool 10 can have a power source 912, which can be at least one of a battery pack 12 and a power cord 9121 (not shown).

The expanding tool 10 can be held comfortably by a wide variety of users having various hand sizes ranging respectively from extra-small to extra-large, and sizes in between. In embodiments, the tool center of gravity 900 fits ergonomically in a user's hand when gripping the upper grip 200. In nonlimiting example as shown in FIG. 7A when a 5 Ah battery 12 and an expansion head 1330 having 1" jaws are attached, the tool center of gravity 900 is shown in a location within upper grip volume 204.

In the embodiment shown in FIG. 7A, the tool center of gravity 900 is configured between the trigger 13T and motor centerline 2000 adjacent to the fourth (4$^{th}$) stage 3400 (FIG. 7A).

In the embodiment of FIG. 7A, shows a cam axis centerline 229 can be colinear with a cam spindle centerline 1000, each of which can have a portion configured vertically above a portion of the back of a hand 6000 of an operator when the operator grips the upper palm grip 201. In an embodiment, a cam axis centerline 229 can be colinear with the cam spindle centerline 1000, each of which can have a portion configured vertically above an upper mars 5502

(FIG. 12) portion of a hand 5000 of an operator when the operator grips the upper palm grip 201.

In an embodiment, a cam axis centerline 229 can be colinear with a cam spindle centerline 1000, each of which can have a portion configured vertically above an upper mars 5502 portion of one or more of the dorsal interossei muscles 6500 (FIG. 12) of the hand 5000 when the operator grips the upper palm grip 201.

Figure 7B:
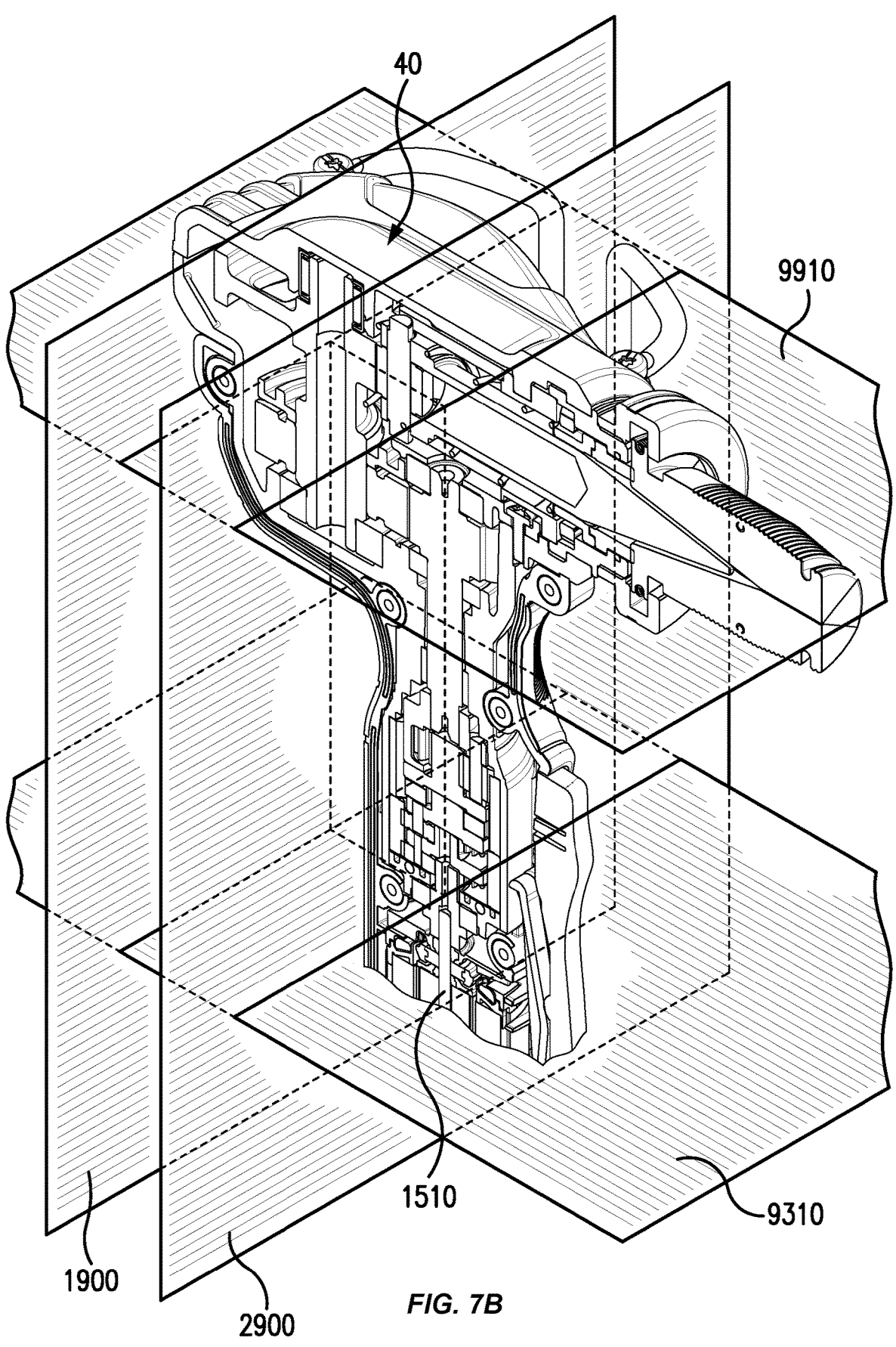
FIG. 7B is the right-side cross section of 7A showing a number of planes.

FIG. 7B shows a section of FIG. 7A taken from a portion of the motor 15 and a portion of the motor shaft 1510 vertically along the height to the top side 40 of the expanding tool 10. FIG. 7B is the right-side cross section of 7A of the expanding tool 10 showing a number of planes.

FIG. 7B shows a motor centerline plane 2900 and a cam spindle centerline plane 1900. In the embodiment of FIG. 7B, the motor centerline plane 2900 and the cam spindle centerline plane 1900 can be parallel. In an embodiment, the tool center of gravity 900 can be located between the motor centerline plane 2900 and the cam spindle centerline plane 1900.

FIG. 7B also shows a wedge centerline plane 9910 and a transmission plane 9310. In the embodiment of FIG. 7B, the wedge centerline plane 9910 and the transmission plane 9310 can be parallel. In the embodiment of FIG. 7B, the wedge centerline plane 9910 and the transmission plane 9310 can be perpendicular to each of the motor centerline plane 2900 and the cam spindle centerline plane 1900. In an embodiment, the tool center of gravity 900 can be located between the wedge centerline plane 9910 and the transmission plane 9310.

In embodiments, the tool center of gravity 900 can be located between the motor centerline plane 2900 and the cam spindle centerline plane 1900 and also be located between the wedge centerline plane 9910 and the transmission plane 9310.

Figure 7C:
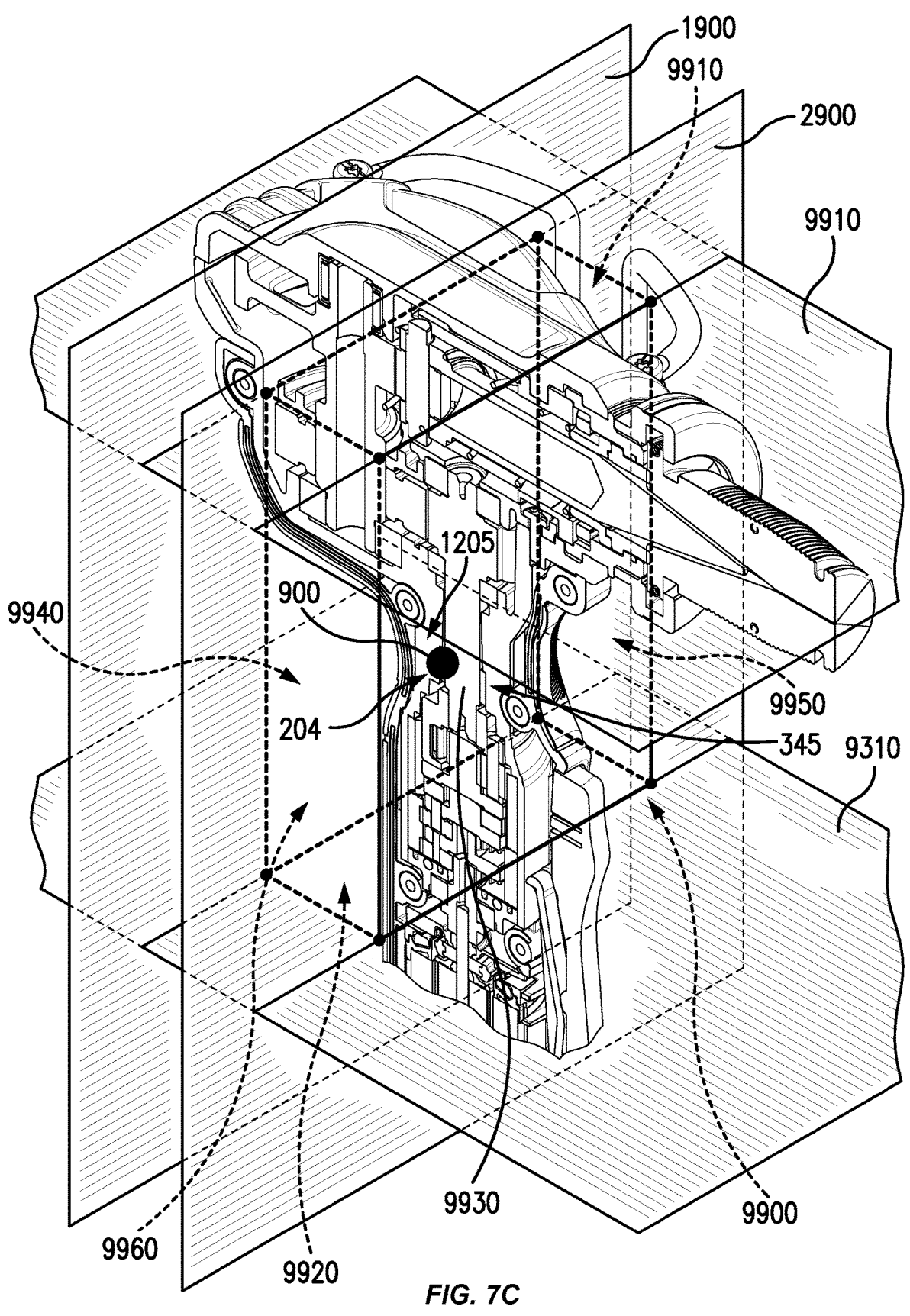
FIG. 7C is the right-side cross section of 7B showing a tool center of gravity containment space having a CG front boundary coplanar to the motor centerline plane.

FIG. 7C is the right-side cross section of 7A showing a center of gravity containment space 9900 (also as "CG containment space 9900"). Herein, center of gravity is abbreviated as "CG".

Figure 14:
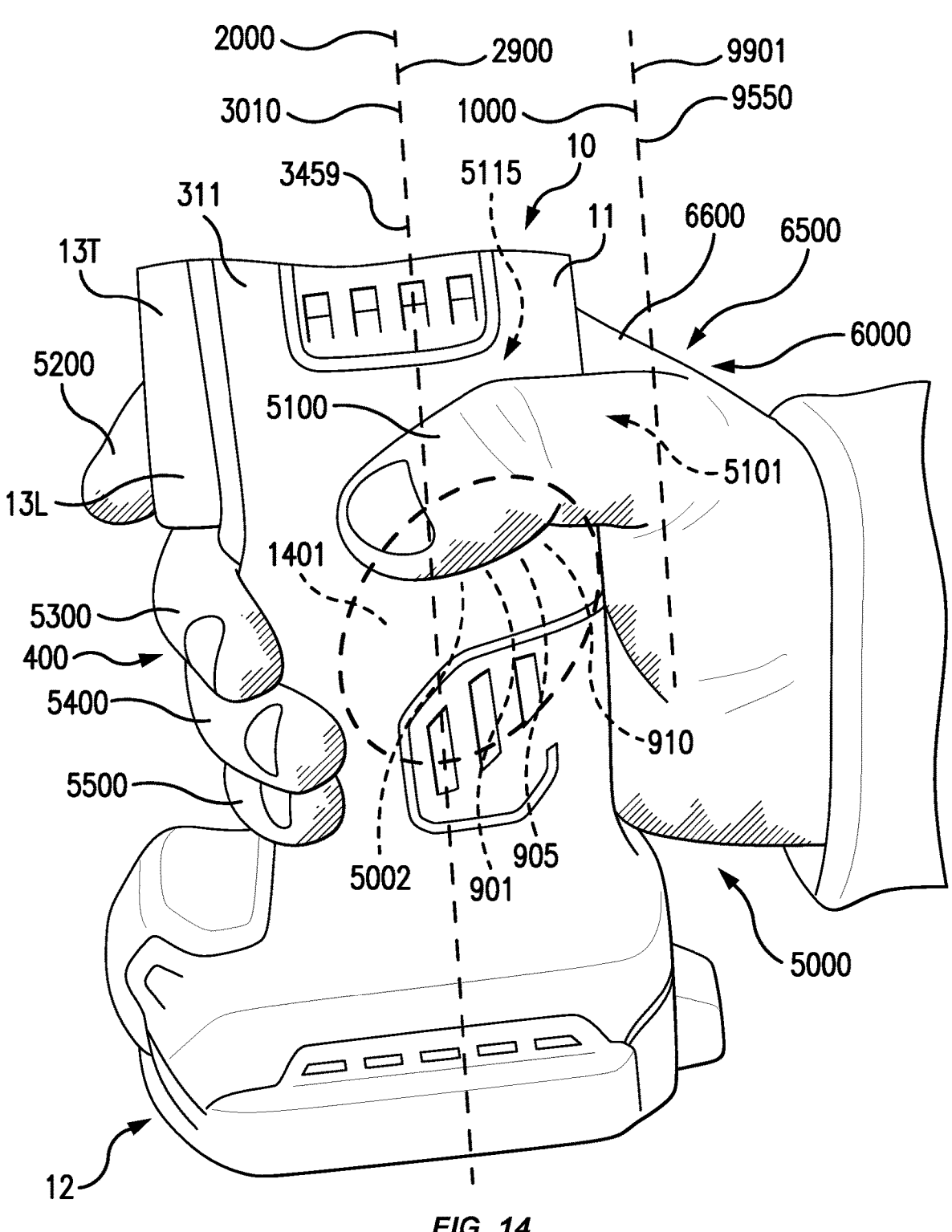
FIG. 14 shows a left-side view of a user's right hand gripping the expanding tool's lower grip and lower trigger.

In nonlimiting example, the CG containment space 9900 is shown as the space bounded by the wedge centerline plane 9910 forming the CG upper boundary 9910 and the transmission plane 9310 forming the CG lower boundary 9920. In the embodiment of FIG. 7C, the motor centerline plane 2900 forms the CG front boundary 9930 and the cam spindle centerline plane 1900 forms the CG back boundary 9940. The CG right side boundary 9960 is coplanar with the head right side 181 (FIG. 14) and the CG left side 191 (FIG. 14).

In an embodiment, the expanding tool 10 having a cam opening centerline at a distance between the head back end 75 and the motor centerline 2000 which contains the tool center of gravity 900 within the CG containment space 9900 under normal use conditions when held generally vertically by a user.

In the embodiment of FIG. 7C, the upper palm grip interior volume can contain the tool center of gravity 900.

In nonlimiting example as shown in FIG. 7C when a 2 Ah battery 12 and an expansion head 1330 having 1" jaws are attached, the tool center of gravity 900 is shown in a location within upper grip volume 204.

Figure 7D:
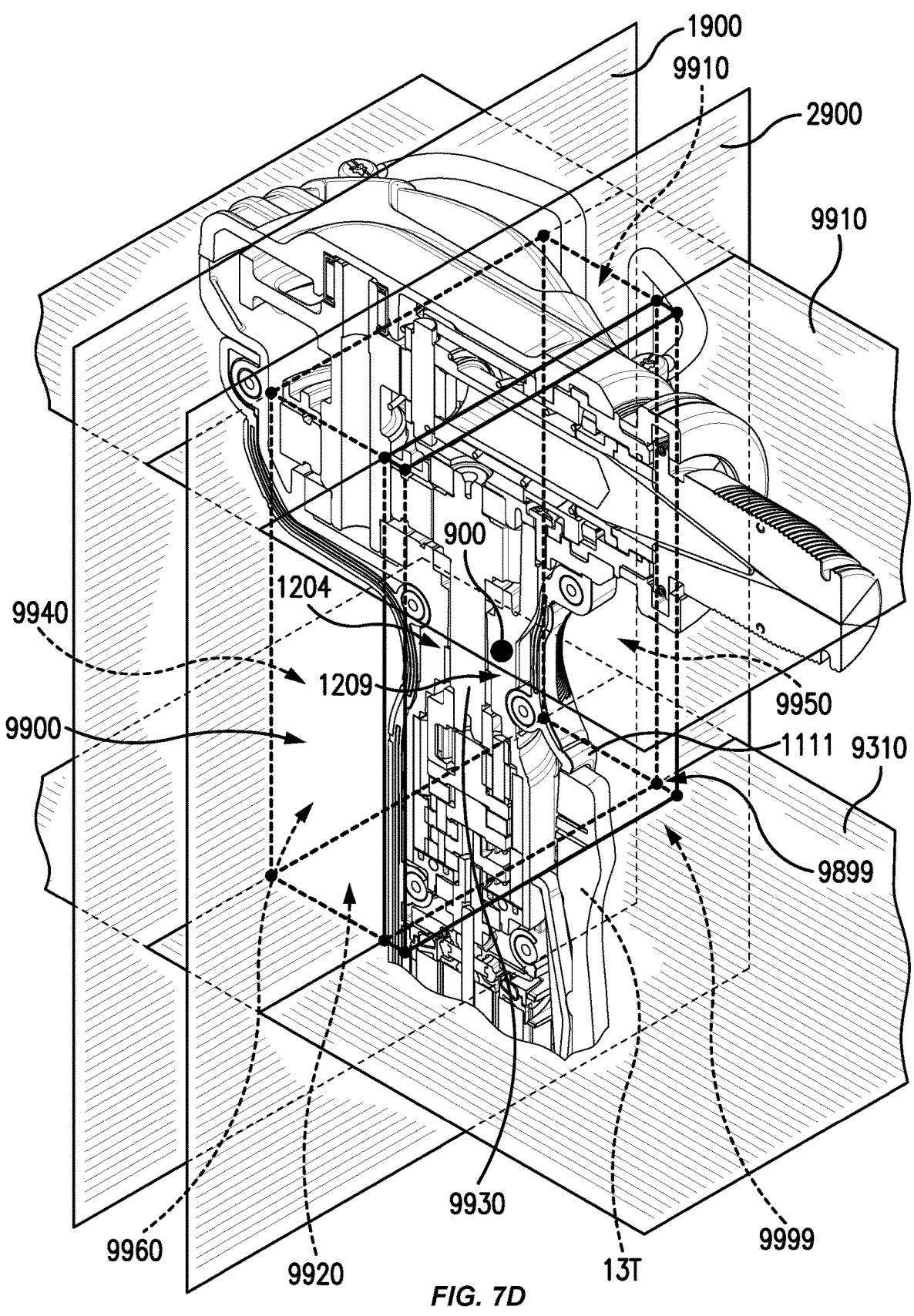
FIG. 7D is the right-side cross section of 7B showing a tool center of gravity containment space having a CG front boundary configured between the motor centerline plane and the trigger.

FIG. 7D is a right-side cross section of 7A view showing a tool center of gravity containment space 9900 having a CG front boundary 9930 configured between the motor centerline plane 2900 and housing front side 1111, and in an embodiment between the motor centerline plane 2900 the trigger 13T.

As shown in FIG. 7D, The CG containment volume 9899 is the total volume of the CG containment space 9900 configured as a back containment space and the extended CG containment space 9999 configured as a front containment space. In the embodiment of FIG. 7D, a tool center of gravity containment space 9900 contains the tool center of gravity 900. FIG. 7D also shows upper grip interior volume 1204 and upper finger grip interior volume 1209. In the embodiment of FIG. 7D, the tool center of gravity 900 is contained within the upper finger grip interior volume 1209.

In nonlimiting example as shown in FIG. 7D when a 2 Ah battery 12 and an expansion head 1330 having 1.5" jaws are attached, the tool center of gravity 900 is shown at a location within upper grip volume 204.

FIG. 7D also shows an extended CG containment space 9999 which extends to encompass the volume from the motor containment plane 2900 to the front side of the trigger 13T.

Figure 8:
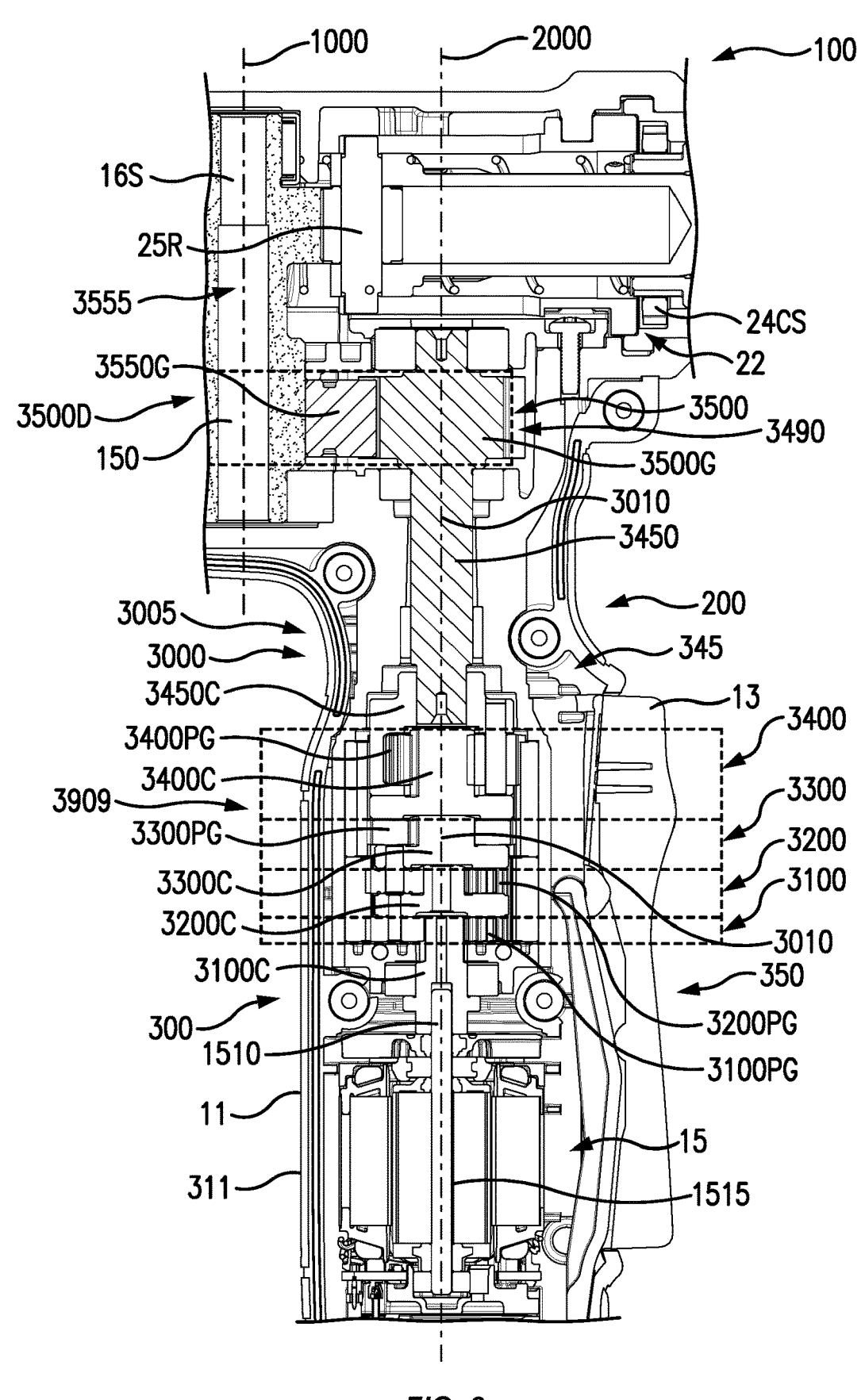
FIG. 8 is a detail cross sectional view from the right-side of a portion of the transmission taken at the motor centerline along the length centerline plane.

FIG. 8 is a detail cross section view from the right-side 80 of a portion of the transmission 3000 taken at the motor centerline 2000 and length centerline plane 2975 (FIG. 1A) and showing an embodiment of the expanding tool 10 having a five-stage transmission 3005.

FIG. 8 shows motor 15 having motor shaft 1510 driving transmission 3000. In non-limiting embodiment, FIG. 8 shows a transmission 3000 which in the embodiment of FIG. 8 is a five-stage transmission 3005.

In an embodiment, the transmission 3000 can be a five-stage transmission 3005 having a four (4) stage planetary gear transmission 3909 (FIG. 8) which drive a fifth (5$^{th}$) stage 3500 of the five-stage transmission 3005. In such embodiment, the four (4) stage planetary gear transmission 3909 can have: a first (1$^{st}$) stage 3100 having a first (1$^{st}$) stage pinion 3100C driven by the motor shaft 1515, which in turn drives a first (1$^{st}$) stage planetary gear 3100PG; a second (2$^{nd}$) stage 3200 having a second (2$^{nd}$) stage carrier 3200C driven by the (1$^{st}$) stage planetary gear 3100PG which in turn drives the (2$^{nd}$) stage planetary gear 3200PG; a third (3$^{rd}$) stage 3300 having a third (3$^{rd}$) stage carrier 3300C driven by second (2$^{nd}$) stage planetary gear 3200PG, which in turn drives a third (3$^{rd}$) stage planetary gear 3300PG; a fourth (4$^{th}$) stage 3400 having a fourth (4$^{th}$) stage carrier 3400C driven by the third (3$^{rd}$) stage planetary gear 3300PG which in turn drives the fourth (4$^{th}$) stage planetary gear 3400PG which drives a drive shaft carrier 3450C. The drive shaft carrier 3450C can connect with and drive a driveshaft 3450.

In an embodiment, as shown in FIG. 8, the fifth (5$^{th}$) stage transmission 3500 can be a cam spindle drive stage 3500D.

In the example embodiment of FIG. 8, a fifth (5$^{th}$) stage 3500 can have a fifth (5$^{th}$) stage drive gear 3500G driven by driveshaft 3450 which in turn drives a fifth (5$^{th}$) stage drive gear 3500G which drives cam spindle 150.

As shown in the embodiment of FIG. 8, motor 15 can drive gear 3500G to rotate along motor axis 1515 which is shown colinear with motor centerline 2000. In an embodiment, the motor 15 can drive the fifth (5$^{th}$) stage drive gear 3500G through a transmission, e.g. transmission 3000, having stages 1-5, in which the fourth (4$^{th}$) stage 3400 drives the fifth stage 3500, as shown in FIG. 8.

In other embodiments, the motor 15 can drive a drive gear directly which drives a spindle gear to drive an offset spindle and/or cam which is at a distance from the motor centerline 2000.

Thus, in embodiments, the motor can connect with and drive a gear which drives the cam 221, which can be the radial cam 21, either directly, or through other gears, e.g. a transmission can have from 1 . . . n stages, wherein n can be a small or large number, e.g. n=2, 3, 4, 5, 6, 7, 10, or greater.

As shown in the embodiment of FIG. 8, fifth (5$^{th}$) stage drive gear 3500G can be engaged with a cam spindle drive gear 3550G to selectively drive radial cam 21 to rotate. In another embodiment, the cam spindle drive gear 3550G can connect with one or more gears which can drive the cam 221, such as the radial cam 21, to rotate. In an embodiment, the transmission can use a number of gear ratios to generate rotational force upon the cam spindle 150 (FIG. 7A). In an embodiment, the five-stage transmission 3005 can generate a strong expansion force of the plurality of jaws 31, producing an outward force in the range of 3,000 N-20,000 N, e.g. 5000 N, 10,000 N and 15,000 N. The five-stage transmission 3005 can achieve a torque on cam spindle 150, which in an embodiment can be the 5$^{th}$ stage output spindle 3555, e.g. the cam spindle 150, in the range of 5 Nm to 300 Nm, e.g. 10 Nm, 50 Nm, 100 Nm, 150 Nm, 200 Nm and 250 Nm. In an embodiment, the five-stage transmission 3005 can achieve a gear reduction ratio, also herein as "gear ratio", in a range of 325 to 32,768, e.g. 350, 500, 546, 600, 1000 and greater.

In an embodiment, the 1$^{st}$ stage 3100 gear reduction ratio can be in a range of 1.5 to 8.0, e.g. 3.0, 4.9, 7.0 or 7.5. In an embodiment, the 2$^{nd}$ stage 3200 gear reduction ratio can be in a range of 1.5 to 8.0, e.g. 3.0, 4.9, 7.0 or 7.5. In an embodiment, the 3$^{rd}$ stage 3300 gear reduction ratio can be in a range of 1.5 to 8.0, e.g. 2.0, 3.6, 5.5 or 6.0. In an embodiment, the 4$^{th}$ stage 3400 gear reduction ratio can be in a range of 1.5 to 8.0, e.g. 2.0, 3.6, 5.5 or 6.0. In an embodiment, the 5$^{th}$ stage 3500 gear reduction ratio can be in a range of 1.5 to 8.0, e.g. 1.71 2.0, 4.0, 5.5 or 6.0.

In embodiments, the total gear reduction ratio of the transmission 3000, e.g. the five-stage transmission 3005, can be in a range of 7.6 to 32768, e.g. 36, 81, 61, 546, 529, 639, 1078, 1482, 5929, 9702, 12150 or 16537.

In an embodiment a gearbox assembly 801 (FIG. 11) can have a weight in a range of 2.5 lbs to 8 lbs, e.g.: 3 lbs, 4 lbs, 4.9 lbs, 5 lbs, 6 lbs, or 7 lbs.

In an embodiment, the motor 15 can have a length in a range of 40 mm to 80 mm, e.g.: 45 mm, 50 mm, 52 mm, 60 mm, 65 mm, or 75 mm. In an embodiment, the motor 15 can have a weight in a range of 0.25 lbs to 2.5 lbs, e.g.: 0.5 lbs, 0.6 lbs, 0.7 lbs, 0.8 lbs, 1.0 lbs, 1.5 lbs, or 2.0 lbs.

In an embodiment the motor can be configured such that the motor axis 1515 is not colinear with and/or not parallel to the transmission centerline 3010.

In an embodiment, the five-stage transmission 3005 can achieve high performance characteristics to expand pipes and/or tubes having nominal pipe diameters in a range from ⅜ in to 6.0 in, or ⅜ in in to 3.0 in, or 0.5 in to 2 in, with nominal pipe sizes e.g.: 0.5 in, 0.75 in, 1.0 in, 1.25 in, 1.5 in, 2.0 in, 2.5 in, 3.0 in, 4.0 in, 4.5 in, 5.0 in.

FIG. 9A is a detail cross section view from the right side 80 of the head assembly 1000. FIG. 9A shows driveshaft 3450 configured to drive the fifth (5$^{th}$) stage drive gear 3500G, which drives a cam spindle drive gear 3550G, which drives cam spindle 150, which drives cam 221, which in a non-limiting embodiment can be a radial cam 21.

In the embodiment of FIG. 9A, cam 221 is shown offset toward the back side 70 of the expanding tool 10 a distance from motor centerline 2000. In the FIG. 9A embodiment, cam 221 is also offset toward the back side 70 a distance from fifth (5$^{th}$) stage drive gear centerline 3570, which is shown colinear with motor centerline 2000.

FIG. 9A shows cam spindle drive gear centerline 9550 colinear with cam spindle centerline 1000 at a distance from motor centerline 2000. In an embodiment, the motor axis 1515 (FIG. 8) can be colinear with motor centerline 2000 and can be located between the cam rotating axis 9525 and the jaw assembly 30. In an embodiment, the cam rotating axis 9525 can be colinear with the cam spindle drive gear centerline 9550. As shown in FIG. 9A the motor rotating axis 1515 (FIG. 8) and/or the motor centerline 2000 can be parallel to the cam rotating axis 9525 and/or the cam spindle centerline 1000.

As shown in FIG. 9A, the cam spindle 150 can have a cam spindle base 151 that passes through a fifth (5) stage spindle gear opening 3577 having a fifth (5) stage spindle gear centerline 3579. In the embodiment of FIG. 9A, the cam spindle centerline 1000 can be colinear with the fifth (5) stage spindle gear centerline 3579.

FIG. 9A shows cam spindle opening 921, which in an embodiment can be an opening in a radial cam 21 and can have a radial cam opening centerline 9921 which can be colinear with the cam spindle centerline 1000. In embodiments, a cam spindle opening 921 and a cam spindle opening centerline 9931. In embodiments, the cam spindle opening centerline 9931 can be same as and/or colinear with the radial cam opening centerline 9921.

In non-limiting example, as shown in FIG. 9A, the cam 21 and cam spindle 150 can be formed as a unitary piece.

Any piece and/or part of the expanding tool 10 can optionally be formed and/or manufactured by 3D printing.

FIG. 9A also shows a number of dimensions and geometric relationships. A tool length 1500 is shown extending from a head back end 75 to a jaws front end 1250, and can have a length in a range of 150 mm to 400 mm. A head back end offset 1200 is shown to extend a length from the head back end 75 to the motor centerline 2000, and can have a length in a range of 50 mm to 200 mm.

A cam spindle centerline distance 2100 is shown to extend a distance from the motor centerline 2000 to the cam opening centerline 1901, and can have a length in a range of 5 mm to 200 mm. Thus, in non-limiting example the cam spindle centerline distance 2100 can be in a range of 10 mm to 200 mm, e.g. 15 mm, 20 mm, 25 mm, 30 mm, 40 mm, 50 mm, 75 mm, 100 mm, 150 mm, or 175 mm.

In an embodiment, weight can be distributed across the distance from the head back end 75 to the jaws front end 1250. In the embodiment shown in FIG. 9A, the rear weight associated with the radial cam 21 is configured at distance from the motor centerline 2000. As shown in FIG. 9A, to the cam rotating axis 9525 is shown at a cam spindle centerline distance 2100 away from the motor centerline 2000. FIG. 9A also shows the cam spindle drive gear centerline 9550 a cam spindle centerline distance 2100 away from the motor centerline 2000.

Thus, in non-limiting example the cam spindle drive gear centerline 9550 can be at a distance which is the same, or different, from the cam spindle centerline distance 2100 the cam spindle drive gear centerline 9550 can be at a distance away from the motor centerline in a range of 5 mm to 200 mm, e.g. 10 mm 15 mm, 20 mm, 25 mm, 30 mm, 40 mm, 50 mm, 75 mm, 100 mm, 150 mm, or 175 mm.

In the embodiment of FIG. 9A, the configuration of the cam rotating axis 9525, colinear with the cam spindle drive gear centerline 9550, configured a cam spindle centerline distance 2100 away from the motor centerline 2000 achieves locating the tool center of gravity CG 900, within the handle interior volume 345 of at least one of the upper grip 200 and lower grip 400 of the handle housing 311.

In an embodiment, an ergonomic balance of weight of at least a portion of the expanding tool 10 can be configured across the hand 5000 of an operator holding the expanding tool 10 by the upper grip 200 or lower grip 400 can be achieved by distributing the weight across tool length 1500 by configuring the cam rotating axis 9525 colinear with the cam spindle drive gear centerline 9550 at a cam spindle centerline distance 2100 away from the motor centerline 2000 and configuring the jaws front end 1250 at a motor centerline to jaws front end distance 2200 which can achieve locating the tool center of gravity CG 900, within the handle interior volume 345 of at least one of the upper grip 200 and lower grip 400 of the handle housing 311.

A head back end cam spindle centerline distance 1100 can extend from the head back end 75 to the cam opening centerline 9901, and can have a length in a range of 20 to 200 mm, or 30 mm to 150 mm.

A cam axis centerline to jaws back end distance 1110 can extend from the cam axis centerline 229 to the jaws back end 1240, and can have a length in a range of 50 mm to 300 mm, or 60 to 200 mm e.g.: 50 mm, 75 mm, 80 mm, 90 mm, 100 mm, 150 mm, or 200 mm.

A cam opening centerline to jaws front end distance 1300 can extend from a cam opening centerline 1901, which is colinear with the cam spindle centerline 1000 and colinear with the cam spindle drive gear centerline to the jaws front end 1250, and can have a length in a range of 100 mm to 300 mm, or 120 mm to 300 mm.

A motor centerline to jaws back end distance 1210 can extend from the motor centerline 2000 to the jaws back end 1240, and can have a length in a range of 30 mm to 200 mm, or 40 mm to 180 mm. A motor centerline 2000 to jaws front end distance 2200 can extend from the motor centerline 2000 to the jaws front end 1250, and can have a length in a range of 50 mm to 300 mm, or 80 mm to 200 mm. A motor centerline 2000 to a collar shoulder distance 1225 can extend from the motor centerline 2000 to the front side 1122 of the collar shoulder 1121, and can have a length in a range of 50 mm to 300 mm, or 80 mm to 220 mm, or 35 mm to 175 mm. A collar shoulder to jaws back end distance 1220 can extend from a front side 1122 of the collar shoulder 1121 to the jaws back end 9234, and can have a length in a range of 5 mm to 40 mm. In an embodiment, a wedge interface contact line 9240 can be colinear with the jaws back end 9234.

In an embodiment, a threaded expansion head 29 can be threadedly engaged to a portion of the collar 26, or collar shoulder 1121. In an embodiment, a threaded expansion head 29 can have a cap 32F and can be threadedly engaged to a portion of the collar 26, or collar shoulder 1121.

Figure 9B:
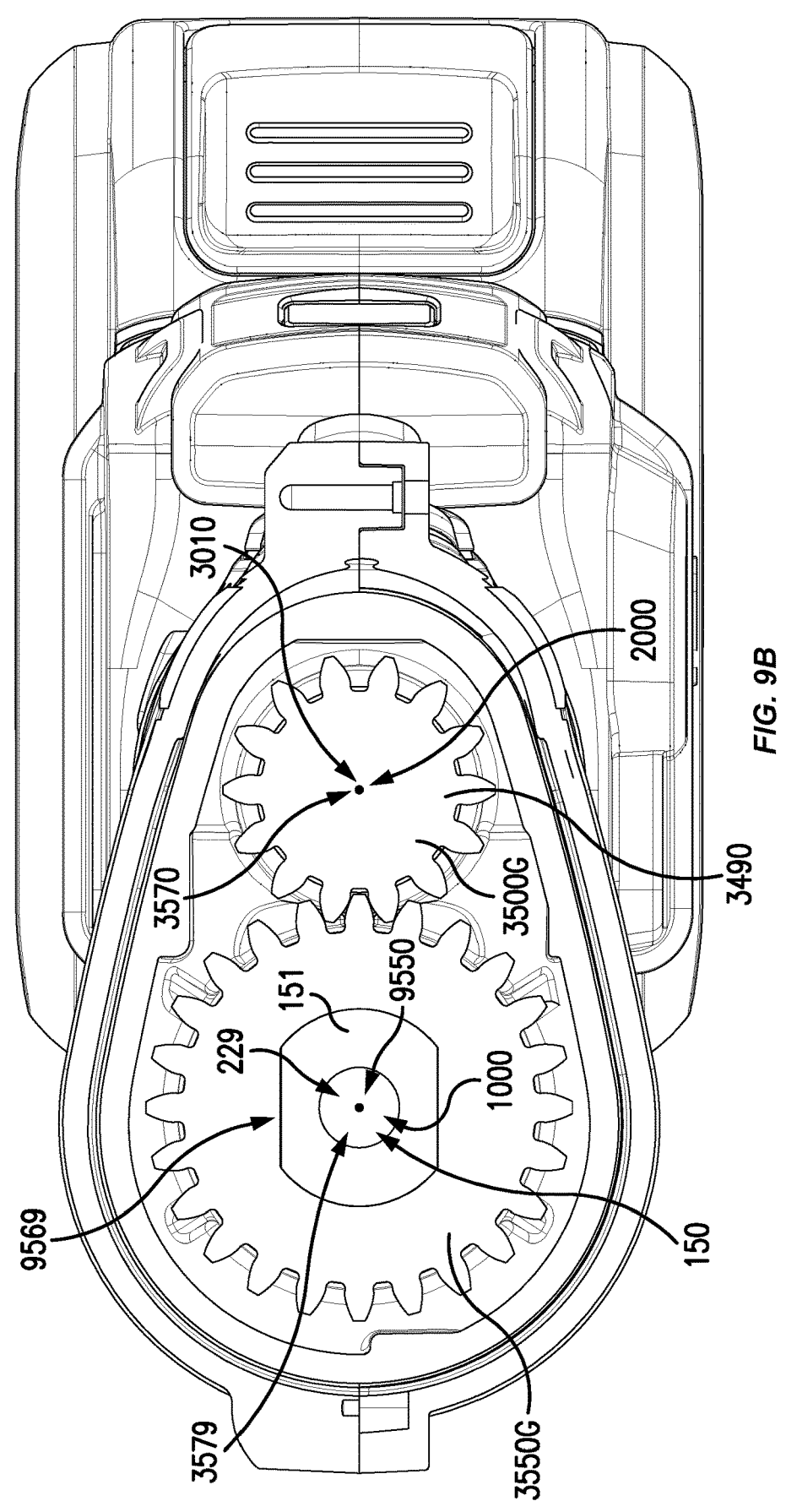
FIG. 9B is a top view gear case cross section taken across the 5$^{th}$ stage transmission of FIG. 9A.

FIG. 9B is a top view gear case cross section taken across the 5$^{th}$ stage 2500 of transmission 3000 from the embodiment of FIG. 9A.

In the embodiment of FIG. 9B, the cam spindle drive gear 3550G is engaged with the cam spindle 150 which has a cam spindle key 151 configured to engage a double D opening, e.g. a double D spindle gear lock opening 9569. In FIG. 9B, the cam spindle drive gear 3550G shows the double D spindle gear lock opening 9569 into which the cam spindle key 151 is engaged.

FIG. 9B shows the fifth (5$^{th}$) stage drive gear 3500G engaged with the cam spindle drive gear 3550G such that when the motor selectively drives the transmission the fifth (5$^{th}$) stage drive gear 3500G drives the cam spindle drive gear 3550G which drives the cam spindle 150 driving radial cam 21 which in turn drives the wedge 24 and drives the jaws 31 from a closed position to an open position.

FIG. 9B shows an embodiment in which the cam spindle centerline 1000, the cam spindle drive gear centerline 9550, the fifth ($5^{th}$) stage spindle gear opening centerline 3579, and cam axis centerline 229 are all colinear and configured at a distance from the motor centerline 2000 and the fifth ($5^{th}$) stage drive gear centerline 3570. In the embodiment of FIG. 9B, the motor centerline 2000 and the fifth ($5^{th}$) stage drive gear centerline 3570 are shown to be colinear. In an embodiment, the fifth ($5^{th}$) stage drive gear centerline 3570 can be colinear with the transmission centerline 3010.

Figure 9C:
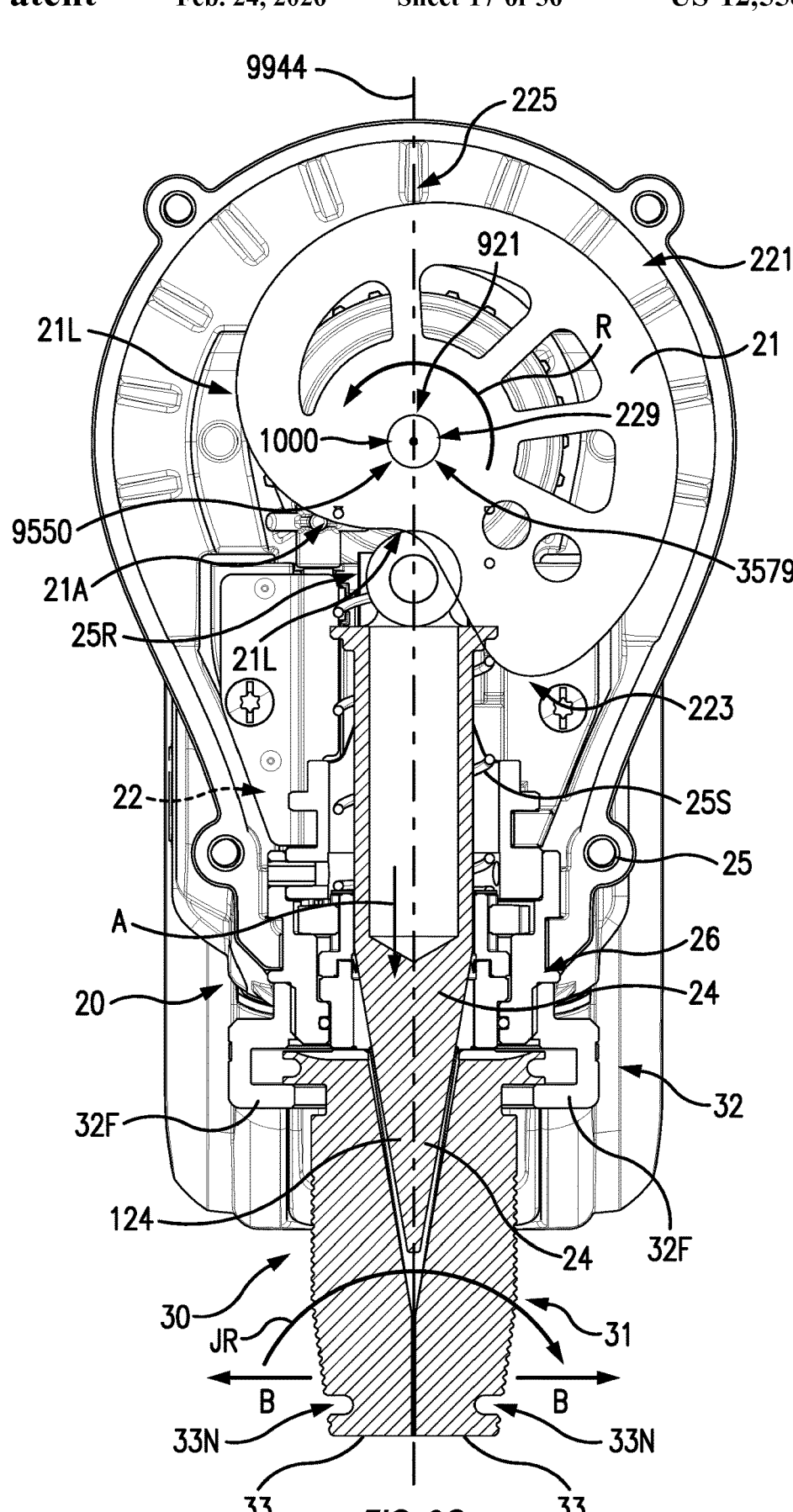
FIG. 9C is a top side view of a cross section of the expanding tool taken through the wedge centerline of FIG. 9A.

FIG. 9C is a top side view of a cross section of the expanding tool taken through the wedge centerline 9924 as shown in FIGS. 1A and 9A. FIG. 9C also shows a top view of a radial cam 21 used in the jaws rotating/expanding mechanism 20.

FIG. 9C shows the radial cam 21 having a cam front end 223 and a cam back end 225. The radial cam 21 can have a cam opening 921 and a cam axis centerline 229 which can be colinear with the cam spindle centerline 1000.

Figure 9D:
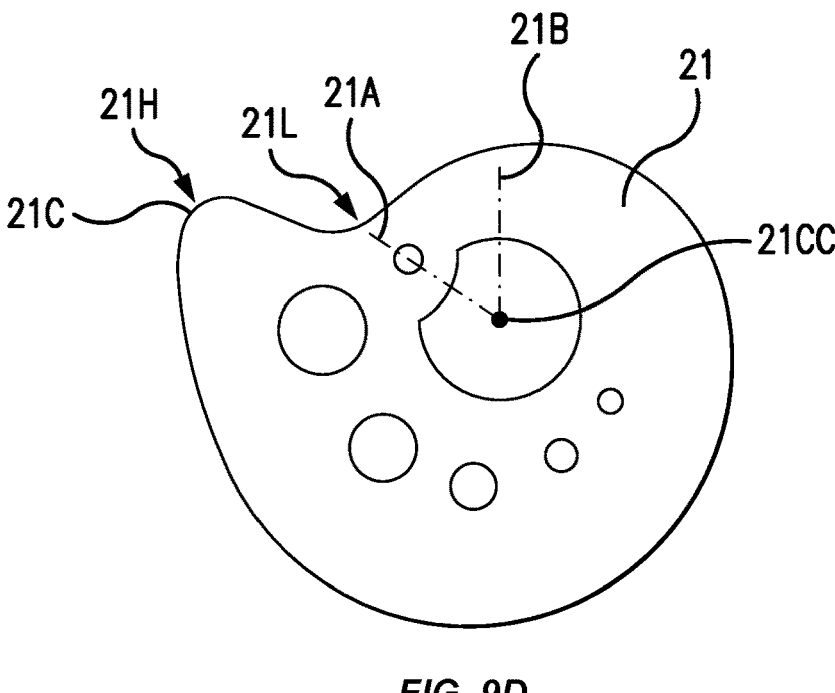
FIG. 9D is a detail view of the radial cam.
Figure 9E:
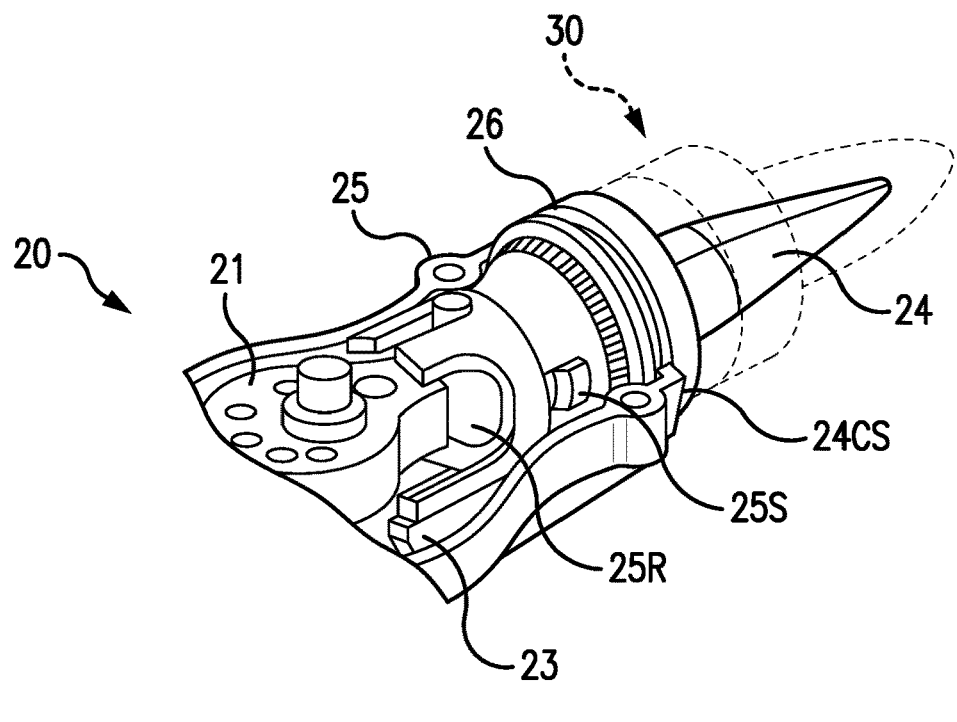
FIG. 9E is a first ($1^{st}$) detail view of the jaws rotating/ expanding mechanism.
Figure 9F:
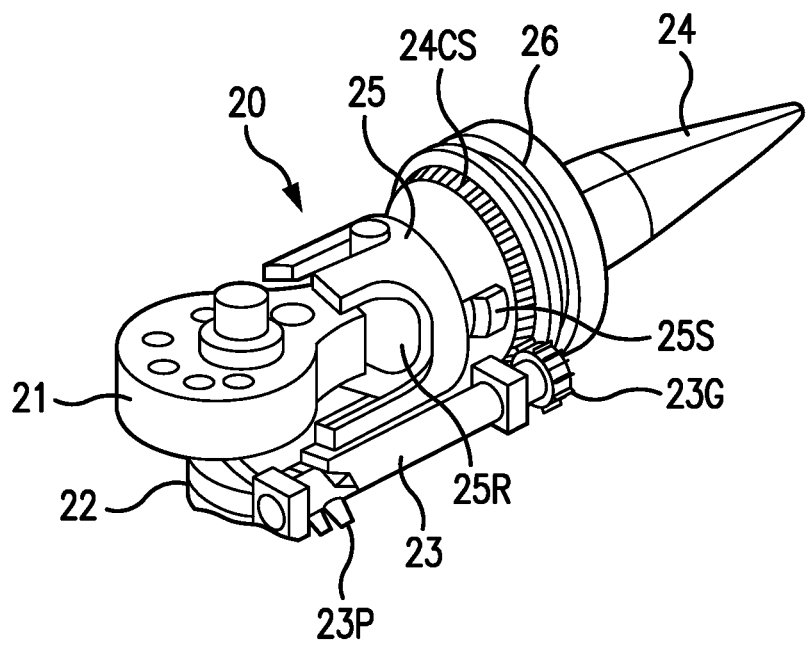
FIG. 9F is a second ($2^{nd}$) detail view showing a shaft which drives a gear ring.
Figure 9G:
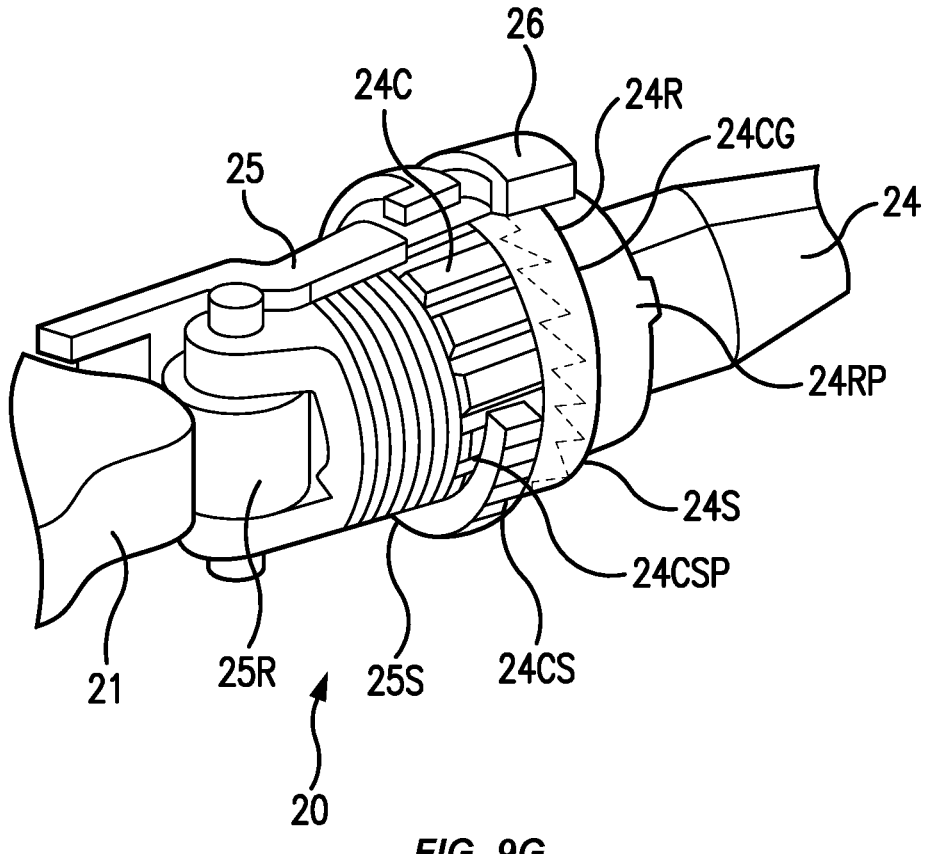
FIG. 9G is a third ($3^{rd}$) detail view showing a clutch ring.
Figure 9H:
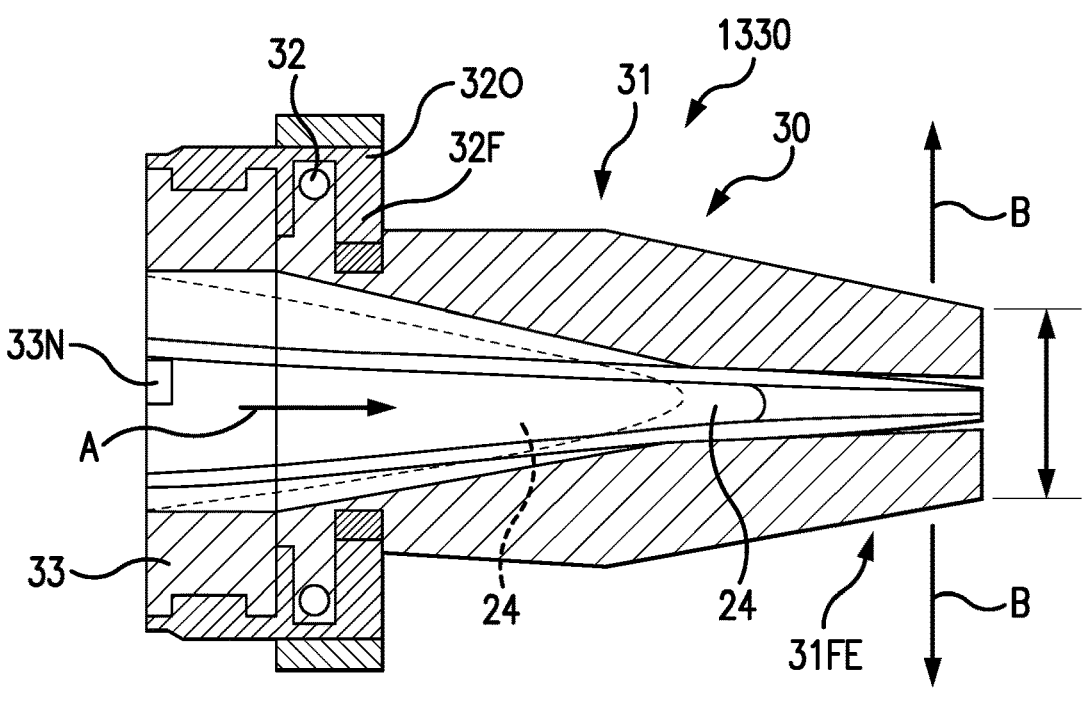
FIG. 9H is a detail view of an expansion head having the plurality of jaws in a closed configuration.
Figure 9I:
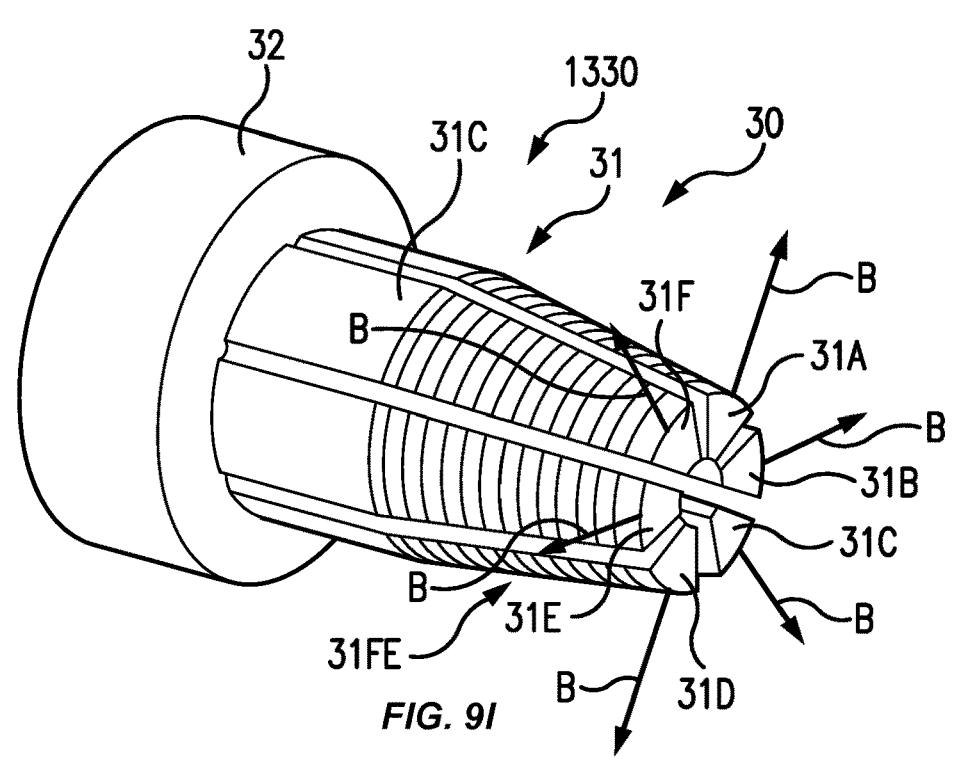
FIG. 9I is a detail view of an expansion head having the plurality of jaws in a half-open (50% open) configuration.
Figure 9J:
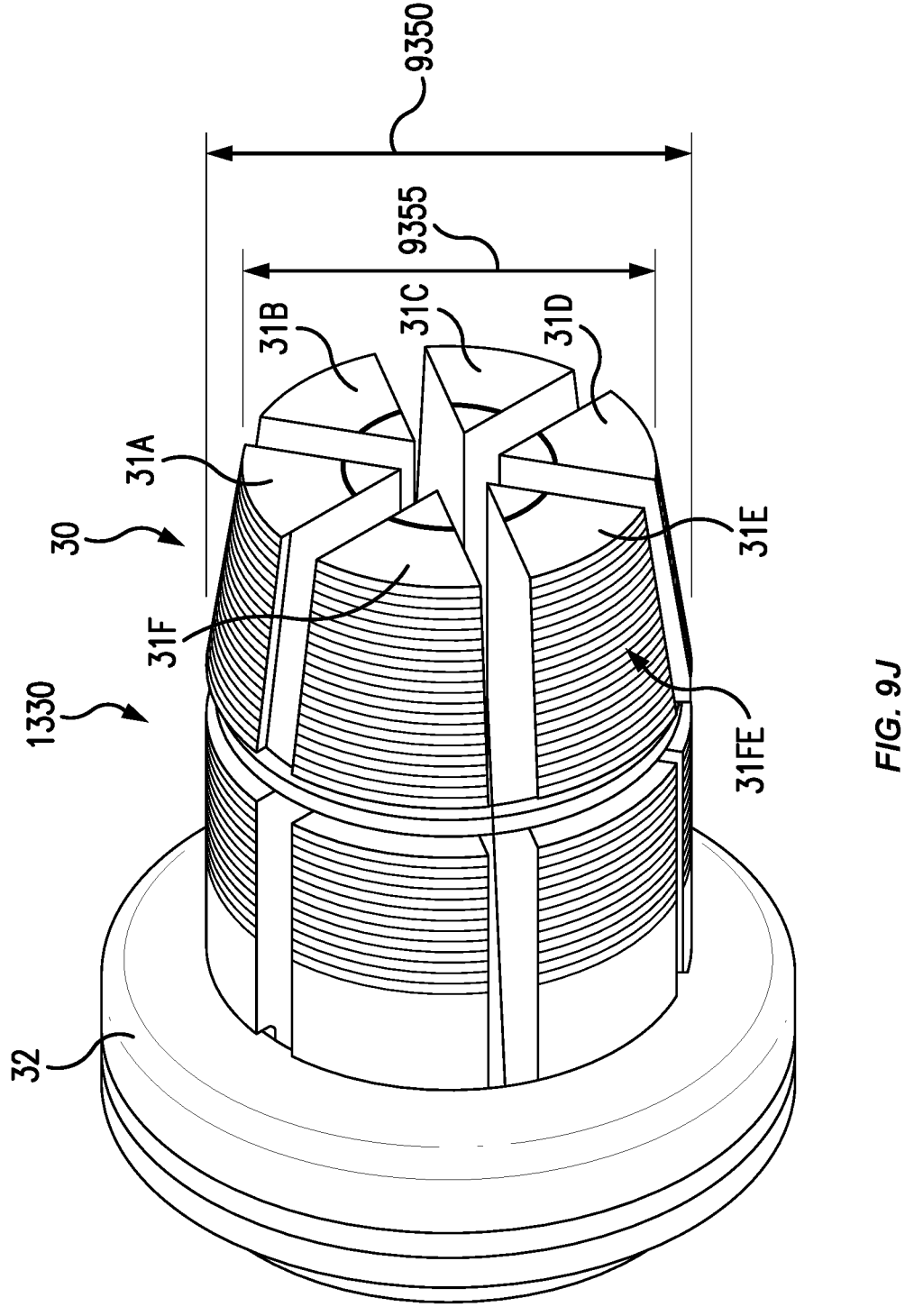
FIG. 9J is a detail view of an expansion head having the plurality of jaws in a fully-open (100% open) position.

FIG. 9C shows the cam front end 223 configured to contact and selectively move wedge 24 into contact with jaws 31 to drive the movement of jaws 31 from a closed position (FIG. 9H) to an open position (FIG. 9J).

In an embodiment, the wedge 24 can have a cone shape, e.g. a cone 124 (FIG. 9A). As shown in FIG. 9C, radial cam 21 drives wedge 24, which can be the cone 124 to move along wedge movement axis 9944, which can be colinear with the wedge centerline 9924 and the wedge 24 drives the jaw assembly 30 jaws to open the plurality of jaws 31 in radial direction.

In an embodiment, as shown in FIG. 9C the cam 221 rotates counterclockwise, in the direction of Arrow R, driving wedge 24 along wedge movement axis 9944 toward the plurality of jaws 31 as shown by Arrow A, to move the plurality of jaws 31 from a closed position to an open position as shown by Arrow B.

FIG. 9C shows an embodiment in which the jaws 31 rotate clockwise, in the direction of Arrow JR, when the cam rotates counterclockwise, in the direction of Arrow R.

In an embodiment, the wedge 24 can be returned from the open position to the closed position by the action of spring 25S when the cam rotates from its highest position 21H, e.g. highest position point 21C, to lowest position 21L, e.g. lowest position point 21A (FIGS. 9C and 9D), the plurality of jaws 31 the plurality of jaws 31 can be returned from the open position to the closed position by the action of spring 320 (FIG. 9A).

In an embodiment, the jaws rotating/expanding mechanism 20 can have a radial cam 21. In an embodiment, an index cam 22 can optionally be used (FIG. 9F).

In embodiments, the cam 221, e.g. radial cam 21, and/or the index cam 22 can configured to be driven by, or moved in conjunction or coordination with, the movement of cam spindle 150, so that radial cam 21 and/or index cam 22 rotate when cam spindle 150 rotates. In an embodiment, shaft 23 (FIG. 9F) can rotate about an axis substantially perpendicular to the axis of cam spindle 150.

FIG. 9D is a detail view of the radial cam 21. In an embodiment, the roller 25R can move along the surface of radial cam 21. While the distance between the center 21CC (FIG. 9D) and point 21A can be the same as the distance between the center 21CC and point 21B, the distance between the center 21CC and a point in the cam surface can keep increasing until roller 25R contacts point 21C. Such increasing distance can cause roller 25R (and thus wedge 24) to move towards jaws 31, causing them to radially expand along direction B (as shown in FIG. 6B 9H). As radial cam 21 continues to rotate past point 21C towards point 21A, spring 25S pushes roller 25R (e.g. FIGS. 9A and

9C) into contact with radial cam 21 and pulls wedge 24 therealong towards radial cam 21. This allows O-ring 320 to pull jaws 31 towards the position shown in FIGS. 6A 9I-6B 9H.

Referring to FIGS. 9E-9J, the jaw assembly 30 preferably engages rotation ring 24R and/or collar 26, in a manner similar to that described in U.S. Pat. Nos. 9,975,289, 8,517, 715 and 8,763,439 which are fully incorporated herein by reference.

FIG. 9E is a first ($1^{st}$) detail view of the jaws rotating/expanding mechanism 20.

As shown in FIG. 9F, the jaws rotating/expanding mechanism 20 can also include a wedge 24, which preferably moves in a reciprocating motion. Wedge 24 can be connected to a sleeve 25. The sleeve 25 can slidingly support a roller assembly 25R, which contacts radial cam 21. A spring 25S can abut an end of wedge 24 and roller assembly 25R, thus biasing roller assembly 25 towards radial cam 21.

FIG. 9F is a second ($2^{nd}$) detail view showing a shaft 23 which drives a gear ring 24CS. As shown in FIG. 9F above, clutch ring 24C (FIG. 9G) can have axial grooves 24CG (FIG. 9G). Such grooves 24CG can be engaged by protrusion(s) 24CSP (FIG. 9G) of a gear ring 24CS (FIG. 9F). The axial position of gear ring 24CS can be fixed in order to maintain contact with gear 23G (FIG. 9F). By having protrusion(s) 24CSP engage grooves 24CG, gear ring 24CS will preferably rotate together clutch ring 24C, while allowing clutch ring 24C to separately move along its axis.

In an embodiment, a clutch ring 24C and a rotation ring 24R can be mounted on and around wedge 24. In an embodiment, wedge 24, clutch ring 24C and rotation ring 24R can be substantially coaxial. Clutch ring 24C and rotation ring 24R can have sawtooth-shaped teeth 24S (FIG. 9G) that engage each other, so that clutch ring 24C and rotation ring 24R can rotate together about wedge 24. Clutch ring 24C and rotation ring 24R can also slide along wedge 24. In an embodiment, the rotation of shaft 23 (FIG. 9F) can cause gear 23G and gear ring 24CS (FIG. 9F) to rotate. The rotation of gear ring 24CS can cause clutch ring 24C (FIG. 9G) and rotating ring 24R to rotate. The rotation of rotating ring 24R can cause in turn the rotation of jaws 31. In embodiments, the rotation of cam 221, e.g. radial cam 21, can be conducted at the same time and/or in conjunction with the rotation of roller 25R (FIG. 9F).

In embodiments, the rotation of cam 221, e.g. the radial cam 21, can be conducted at the same time and/or in conjunction with the rotation of shaft 23 and optionally a second protrusion 23P which can be optionally be driven by the index cam 22.

FIG. 9G is a third ($3^{rd}$) detail view showing a clutch ring 24C. In an embodiment, if rotation ring 24R were to jam or stall and no longer rotate, if protrusions 24CSP force clutch ring 24C to rotate, the sawtooth-shaped teeth 24S of clutch ring 24C will ride along the sawtooth-shaped teeth 24S of rotation ring 24R, separating clutch ring 24C from rotation ring 24R. After a tooth 24S of clutch ring 24C has cleared the corresponding tooth 24S of rotation ring 24R, spring 25S pushes clutch 24C towards rotation ring 24R, allowing clutch ring 24C to continue to rotate and ride along the sawtooth-shaped teeth 24S without damaging the different components of jaws rotating/expanding mechanism 20. In an embodiment, a collar 26 can captures clutch ring 24C, rotation ring 24R and wedge 24.

FIG. 9H is a detail view of an expansion head 1330 having the plurality of jaws 31 in a closed configuration. As shown in FIG. 9H, Jaw assembly 30 can have a plurality of jaws 31, e.g. six (6) jaws (FIG. 9I), which can be captured within a cap 32. As shown in FIG. 9A, in an embodiment, jaws 31 can be captured by a flange 32F of cap 32. In an embodiment, the jaws 31 can slide along flange 32F when wedge 24 moves along the direction of arrow A so that jaws 31 can move away from the axis of wedge 24 in an outward radial direction as shown by arrows B. A resilient O-ring 320, or a jaw spring 32J (not shown), can be disposed around all jaws 31 so that, when wedge 24 moves in a direction opposite to the direction of arrow A, jaws 31 will move towards the axis of wedge 24 in a direction radially opposite to direction of arrows B.

FIG. 9I is a detail view of an expansion head 1330 having the plurality of jaws 31 in a half-open (50% open, 50% expanded) configuration. The example of FIG. 9I shows the plurality of jaws 31 of expansion head 1330 expanding radially in the direction of arrows B.

FIG. 9J is a detail view of an expansion head having the plurality of jaws in a fully-open (100% open, 100% expanded) position. FIG. 9J shows an open jaws end outer diameter 9355 and an open jaws outer diameter 9350.

As shown in FIG. 2 and FIGS. 9H-9J, each jaw 31 can have a frustoconical end 31E that extends from a cylindrical portion 31C1 (FIG. 2). In an embodiment, ribs 31R (FIG. 1) can be formed on the frustoconical ends 31FE. However other constructions can omit the ribs 31R, or use other textures, contours and jaw shapes. In an embodiment, two or more jaws 31, or a number of jaws 31, can be used to define a complete 360-degree jaw section that fits within a PEX tube, or pipe, to be expanded. In an embodiment, cap 32 can be engaged to housing 11H and/or collar 26. In an embodiment, cap 32 can be engaged to collar 26 by a threaded connection. Each jaw 31 can have a second end 33. Each end 33 can have at least one notch 33N (FIG. 10A) that engages a corresponding protrusion 24RP (FIG. 9G) on rotating ring 24R (FIG. 9G).

FIG. 10A is a left-side view of the expanding tool 10. FIG. 10A shows example heights of the tool height 8000. FIG. 10A also shows nonlimiting examples of locations of the gearbox assembly center of gravity 800, the motor center of gravity 850 and the tool center of gravity 900.

In an embodiment, the gearbox assembly center of gravity 800 can have a gearbox assembly center of gravity height 8010 in a range of from 180 mm to 520 mm, or 200 mm to 420 mm from the bottom side 60.

In an embodiment, the motor center of gravity 850 can have a motor center of gravity 8020 in a range of from 50 mm to 450 mm, 100 mm to 300 mm from the bottom side 60.

In an embodiment, the tool center of gravity 900 can have a tool center of gravity height 8030 in a range of from 100 mm to 400 mm, or 150 mm to 370 mm from the bottom side 60.

Figure 10B:
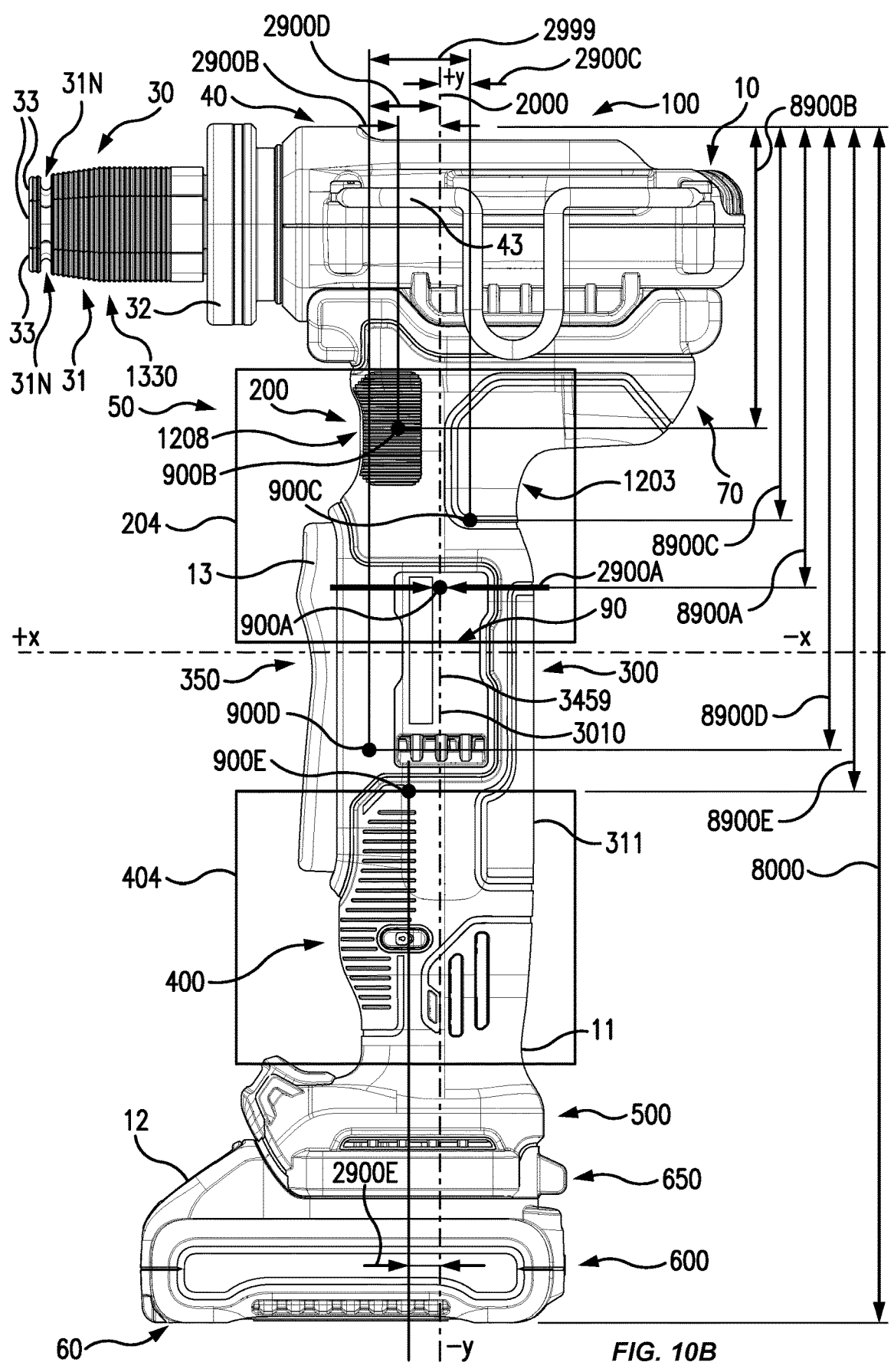
FIG. 10B is left-side view of the expanding tool showing a variety of tool center of gravity locations in relation to the upper grip volume and the lower grip volume.

In nonlimiting example, FIG. 10A, shows tool height 8000 and the vertical positions along the Y axis at a distance from the tool bottom side 60 of the gearbox assembly center of gravity 800, the motor center of gravity 850 and the tool center of gravity 900, having a 5 Ah power tool battery pack 12 attached and no expansion head 1330 e.g.:

FIG. 10A shows an example of the gearbox assembly center of gravity 800 at a Y distance 8010 of 316 mm from the bottom side 60 of the expanding tool having the 5 Ah power tool battery pack 12 attached and no expansion head 1330;

FIG. 10A shows an example of the motor center of gravity 850 at a Y distance 8020 of 238 mm from the bottom side 60 of the expanding tool having the 5 Ah power tool battery pack 12 attached and no expansion head 1330; and FIG. 10A shows an example of the tool center of gravity 900 at a Y distance 8030 of 140 mm from the bottom side 60 of the expanding tool having the 5 Ah power tool battery pack 12 attached and no expansion head 1330;

As shown in FIGS. 10A and 10B, as the weight of the power tool battery pack 12 approach being equal to the weight of the expansion head 1330 (having attached a selection of the plurality of jaws 31) and the weight of the gearbox assembly 801 and its contents, the center of gravity 900 of the expansion tool 10 machine will shift upward away from bottom side 60. For example, other factors being equal, as the weight of the plurality of jaws 31 increases the center of gravity 900 of the expansion tool 10 machine will shift upward away from bottom side 60.. FIG. 10E shows geometric details of the cross section of the grip of FIG. 11A.

FIG. 10B shows examples of center of gravity distances from the top side 40 of the expanding tool 10, from the left side view. In an embodiment, the motor centerline 2000 and transmission centerline 3010 can be colinear. In the example of FIG. 10B, the motor centerline 2000 and transmission centerline 3010 are shown as colinear. Thus, dimensions measured from the motor centerline 2000 will be the same as dimensions measured from the transmission centerline 3010 in the example shown in FIG. 10B, as well as FIG. 15B FIG. 10B shows nonlimiting examples of positions of the tool center of gravity 900 as it can be located using various combinations of battery 12 Ah values and diameter of jaws attached, e.g.:

FIG. 10B shows the tool center of gravity 900A is shown at a distance 2900A of 0 mm away from the motor centerline 2000 (and/or transmission centerline 3010) and at a distance 8900A of 123 mm from the top side 40 when a 5 Ah power tool battery pack 12 and an expansion head 1330 having 1" plurality of jaws 31 are attached. In an embodiment, the motor centerline 2000 passes through the tool center of gravity 900, e.g. the tool center of gravity 900A. In an embodiment, the transmission centerline 3010 centerline passes through the tool center of gravity 900, e.g. the tool center of gravity 900A.

FIG. 10B shows the tool center of gravity 900B is shown at a distance 2900B of 16 mm away from the motor centerline 2000 (and/or transmission centerline 3010) in the +X direction and at a distance 8900B of 97 mm from the top side 40 when a 2 Ah power tool battery pack 12 and an expansion head 1330 having 1.5" plurality of jaws 31 are attached.

FIG. 10B shows the tool center of gravity 900C is shown at a distance 2900C of 7 mm away from the motor centerline 2000 (and/or transmission centerline 3010) in the −X direction and at a distance 8900C of 118 mm from the top side 40 when a 2 Ah power tool battery pack 12 and an expansion head 1330 having 1" plurality of jaws 31 are attached.

FIG. 10B shows the tool center of gravity 900D is shown at a distance 2900D of 24 mm away from the motor centerline 2000 (and/or transmission centerline 3010) in the +X direction and at a distance 8900D of 188 mm from the top side 40 when a 15 Ah power tool battery pack 12 and an expansion head 1330 having 1.5" plurality of jaws 31 are attached.

FIG. 10B shows the tool center of gravity 900E is shown at a distance 2900E of 12 mm away from the motor centerline 2000 (and/or transmission centerline 3010) in the +X direction and at a distance 8900E of 194 mm from the top side 40 when a 15 Ah power tool battery pack 12 and an expansion head 1330 having 1" plurality of jaws 31 are attached.

FIG. 10B also shows a horizontal configuration distance 2999, which is also shown in FIG. 15B.

In the embodiment shown in FIG. 10B, the tool center of gravity 900 are located within the upper grip volume 204 for each respective battery attached and each respective expansion head 1330 attached.

Figure 10C:
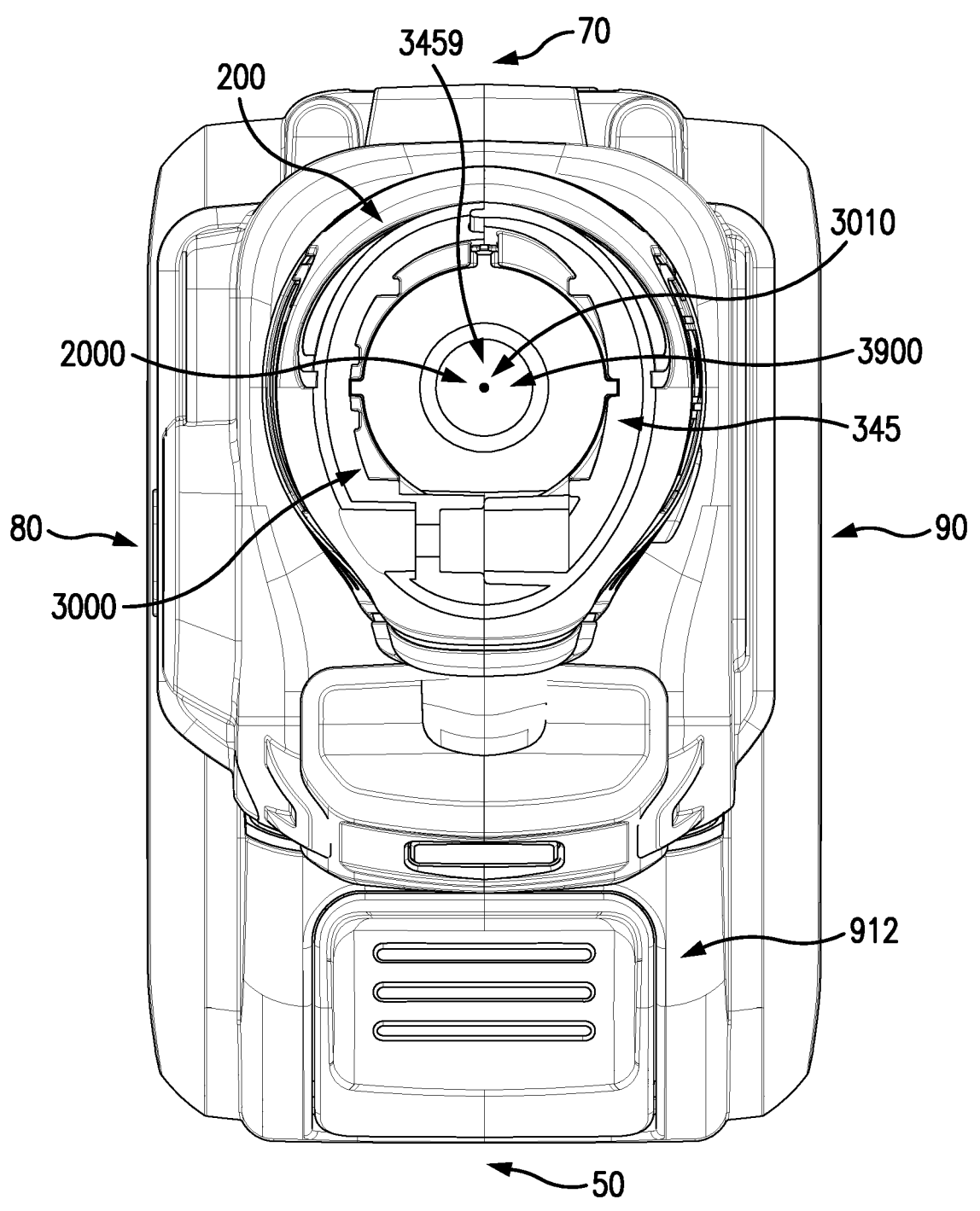
FIG. 10C is a detail cross section of the handle taken from the left-side through a portion of the upper grip of FIG. 10A.

FIG. 10C is a top side cross section view of a section of the upper grip 200.

Figure 10D:
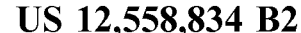
FIG. 10D showing a variety of circumferences and contour curves.
Figure 10E:
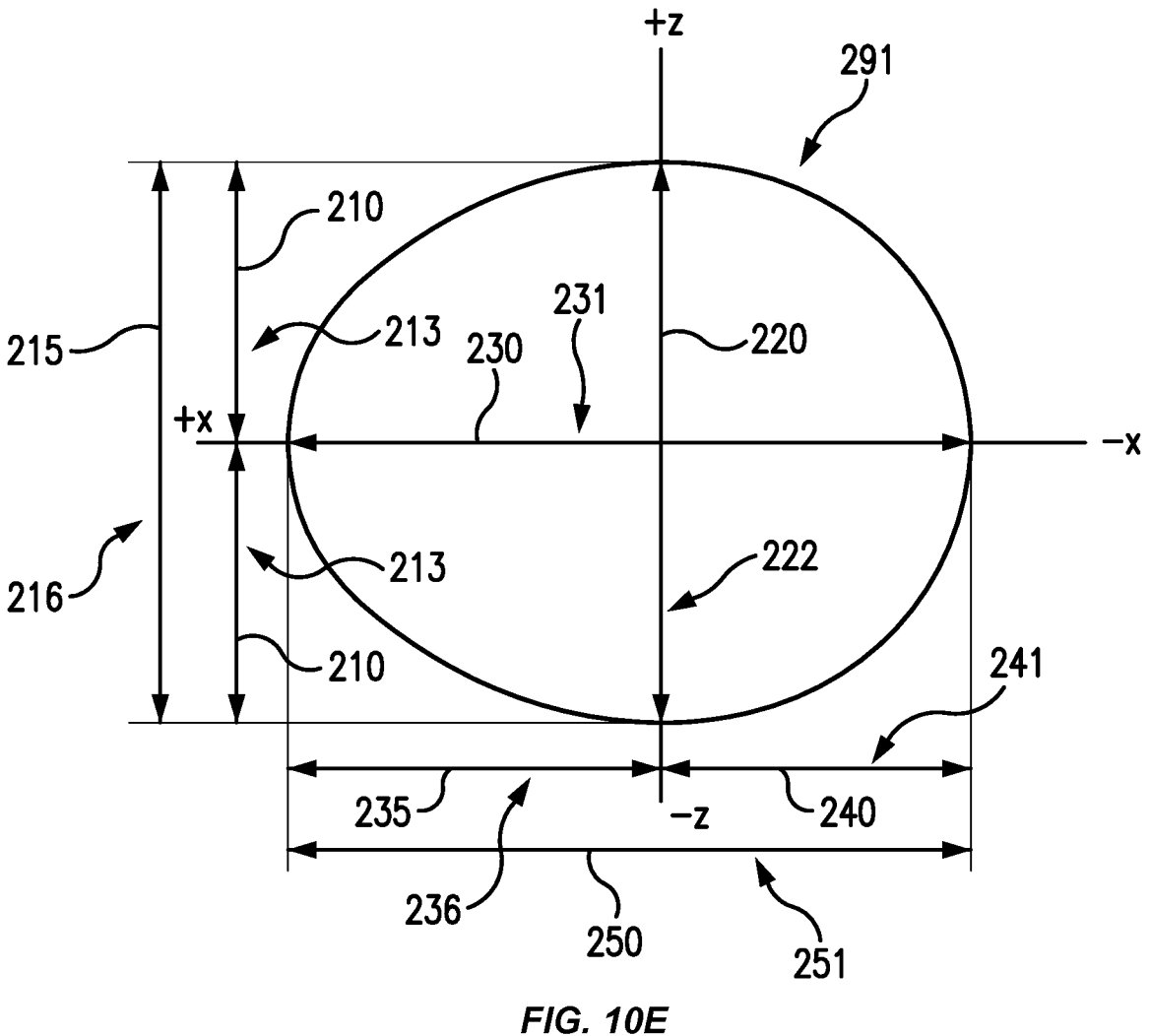
FIG. 10E shoes geometric relationships of a cross section of the handle taken from the left-side through a portion of the upper grip.

FIG. 10D showing a variety of diameter and contour curves. FIG. 10D shows a curve C1, a curve C2 and a curve C3, each of which are example contour curves associated with the ergonomics of the upper grip 200 of the handle 300. FIG. 10D also shows a curve C4 which is an example contour curve associated with the ergonomics of the lower grip 400 and the handle 300.

FIG. 10D shows a circumference A which is an example girth circumference associated with the ergonomics of the upper grip 200 of the handle 300. FIG. 10D shows a circumference B and a circumference C, each of which are example girth circumferences associated with the ergonomics of the lower grip 400 and the handle 300. In an embodiment, circumference A can be in a range of 115 mm to 210 mm, e.g. 125 mm, 145 mm, 160 mm, or 180 mm. In an embodiment, circumference B can be in a range of 130 mm to 210 mm, e.g. 130 mm, 145 mm, 160 mm, or 180 mm. In an embodiment, circumference C can be in a range of 115 mm to 210 mm, e.g. 125 mm, 145 mm, 160 mm, or 180 mm.

FIG. 10E shoes geometric relationships of a cross section of the handle 300 taken from the left side 90 through a portion of the upper grip 200. In an embodiment, as shown in FIGS. 10D and 10E, a grip, e.g. upper grip 200, or lower grip 400 can have an oval grip designed for ergonomic comfort of a user.

As shown in FIG. 10E, the grip can have a grip cross sectional shape 291 which can be oval and can have a grip minor axis 222, e.g. an upper grip minor axis 220, and a grip major axis 231, e.g. an upper grip major axis 230. The grip can have a grip width maximum diameter 216. The grip can have a grip width maximum radius 213, a grip front maximum length 236, a grip back maximum length 241 and a grip length maximum length 251.

In an embodiment, a grip width maximum radius 213 can be in a range of from 15 mm to 40 mm, or 20 mm to 30 mm. In an embodiment, a width maximum diameter 216 can be in a range of from 15 mm to 50 mm, or 15 mm to 40 mm, or 20 mm to 30 mm.

In an embodiment, a grip minor axis 222 in a range of 15 mm to 40 mm, or 20 mm to 30 mm, e.g. 15 mm, 20 mm, 25 mm, 30 mm. In an embodiment, a grip major axis 231 in a range of from 15 mm to 60 mm, e.g. 15 mm, 25 mm, 30 mm, 45 mm.

In an embodiment, a grip front maximum length 236 can be in a range of from 15 mm to 60 mm, e.g. 15 mm, 25 mm, 30 mm, 45 mm. In an embodiment, a grip back maximum length 241 can be in a range of from 15 mm to 60 mm, e.g. 15 mm, 25 mm, 30 mm, 45 mm. In an embodiment, a grip length maximum length 251 can be in a range of from 20 mm to 85 mm, e.g. 25 mm, 30 mm, 35 mm, 40 mm, 50 mm, 51.35 mm, 55 mm, 65 mm, or 75 mm.

In an embodiment, an upper grip width maximum radius 210 can be in a range of from 15 mm to 40 mm, e.g. 20 mm, 25 mm, 30 mm or 35 mm. In an embodiment, an upper grip width maximum diameter 215 can be in a range of from 20 mm to 75 mm, e.g. 25 mm, 30 mm, 35 mm, 40 mm, 42.08, 45 mm, 50 mm, or 60 mm.

In an embodiment, an upper grip minor axis 220 in a range of 15 mm to 40 mm, e.g. 15 mm, 20 mm, 25 mm, 30 mm.

In an embodiment, an upper grip major axis 230 in a range of 15 mm to 60 mm, e.g. 15 mm, 20 mm, 25 mm, 30 mm, 45 mm.

In an embodiment, an upper grip front maximum length 235 can be in a range of from 15 mm to 60 mm. In an embodiment, an upper grip back maximum length 240 can be in a range of from 15 mm to 30, or 20 mm to 30 mm. In an embodiment, an upper grip length maximum length 250 can be in a range of from 20 mm to 85 mm, e.g. 25 mm, 30 mm, 40 mm, 50 mm, 60 mm, 70 mm, 75 mm or 80 mm.

In embodiments, the dimensions of the lower grip 400 can be analogous to and have the same dimensional ranges and values as the upper grip 200.

FIG. 11 expanding tool 10 center of gravity locations for the bare tool without an expansion head 1330 and without a battery. FIG. 11 shows a bare tool gearbox assembly center of gravity BT800. In an embodiment, the bare tool gearbox assembly center of gravity BT800 can be the same as the gearbox assembly center of gravity 800 (FIG. 10A). FIG. 11 shows a bare tool center of gravity BT900 with no battery 12 and with no expansion head 1330.

FIG. 11 shows a bare tool motor center of gravity BT850. In an embodiment, the bare tool motor center of gravity BT850 can be the same as the motor center of gravity 850.

While, the bare tool's weight distribution changes when it's attached with different batteries, the CG is bounded within a defined space, e.g. CG containment space 9900 (FIG. 7C).

Tool Weight

In an embodiment, the weight of the expanding tool 10 without the power tool battery pack 12 can be in a range of 3.0 lbs to 12 lbs, e.g.: 4 lbs, 5 lbs, 6 lbs, 7 lbs, 8 lbs, 9 lbs, 10 lbs, or 11 lbs.

In an embodiment, the bare tool with no power tool battery pack 12 version of the expanding tool 10 can have a bare tool weight with no power tool battery pack 12 in a range of 2500 g to 3500 g, or 3000 g to 5000 g.

In an embodiment, a cordless version of the expanding tool 10 can have a "bare tool" weight, i.e. without a power tool battery pack 12 attached (no battery pack) in a range of 2500 g to 3500 g, or 3000 g to 5000 g.

In an embodiment, an AC version of the expanding tool 10 can have a "bare tool" weight with no power tool battery pack 12 in a range of 2500 g to 3500 g, or 3000 g to 5000 g. In an embodiment, a power cord 9121 (not shown) version of the expanding tool 10 can have a bare tool weight with no power tool battery pack 12 in a range of 2500 g to 3500 g, or 3000 g to 5000 g.

In an embodiment, the expanding tool 10 can have a tool weight including an attached power tool battery pack 12 of 3000 g to 5000 g, or 2500 g to 4000 g, or 3500 g to 4000 g.

In non-limiting example, power tool battery pack 12 weights can range from 250 g to 2000 g. For example, a 4 Ah a 10 Ah battery pack 12 can weigh 638 g (4 Ah/638 g) and a 10 Ah battery pack 12 can weigh 1048 g (10 Ah/1048 g).

Tool Runtime

The runtime, or duration, of operation varies based upon a number of factors for nonlimiting example jaw size, battery Ah value, ambient temperature during operation, and other factors.

In an embodiment, the expanding tool 10 can be operated using a 2 Ah battery 12 using a current of 2 A for a duration in a range of 0.25 hrs to 3 hrs, e.g. 0.5 hrs, 0.75 hrs, 1.0 hrs, or 2.0 hrs. In an embodiment, the expanding tool 10 can be operated using a 4 Ah battery 12 using a current of 20 A to 30A for a duration in a range of 0.1 hrs to 5 hrs, e.g. 0.2 hrs, 0.25 hrs, 0.5 hrs, 0.75 hrs, 1.0 hrs, or 2.0 hrs, 2.5 hrs, 3.0 hrs. In an embodiment, the expanding tool 10 can be operated using a 5 Ah battery 12 using a current of 20 A to 30A for a duration in a range of 0.1 hrs to 5 hrs, e.g. 0.2 hrs, 0.25 hrs, 0.5 hrs, 0.75 hrs, 1.0 hrs, or 2.0 hrs, 2.5 hrs, 3.0 hrs. In an embodiment, the expanding tool 10 can be operated using a 10 Ah battery 12 using a current of 5 A for a duration in a range of 0.1 hrs to 3 hrs, e.g. 0.2 hrs, 0.25 hrs, 0.5 hrs, 0.75 hrs, 1.0 hrs, or 2.0 hrs. In an embodiment, the expanding tool 10 can be operated using a 15 Ah battery 12 using a current of 10 A for a duration in a range of 0.1 hrs to 4 hrs, e.g. 0.2 hrs, 0.25 hrs, 0.5 hrs, 0.75 hrs, 1.0 hrs, 2.0 hrs, or 2.5 hrs. In an embodiment, the expanding tool 10 can be operated using a 20 Ah battery 12 using a current of 15 A for a duration in a range of 0.1 hrs to 4 hrs, e.g. 0.2 hrs, 0.25 hrs, 0.5 hrs, 0.75 hrs, 1.0 hrs, 2.0 hrs, or 2.5 hrs.

Figure 12A:
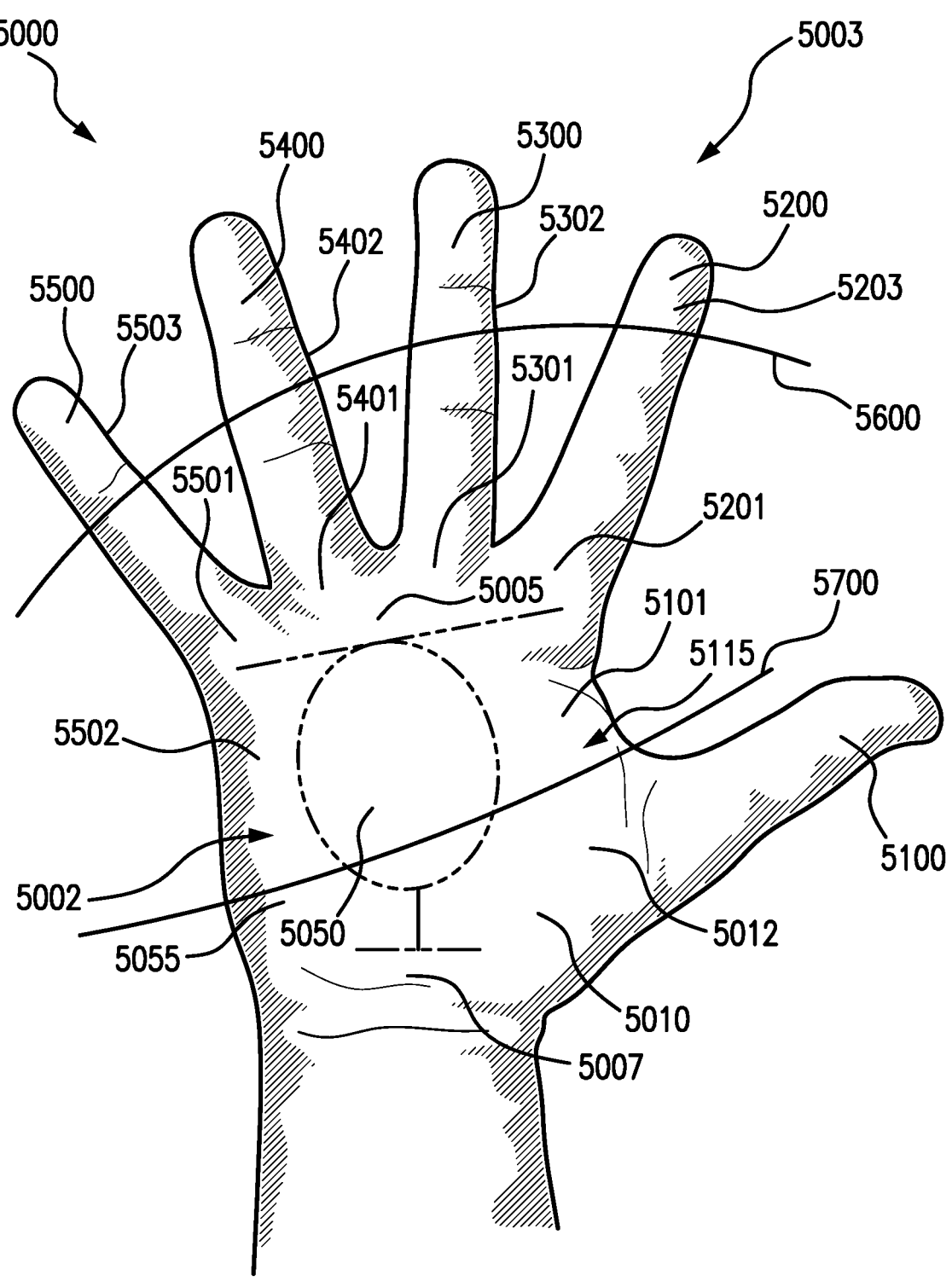
FIG. 12A shows a palm side view of a typical human right hand and its various regions.

FIG. 12A shows a palm side of a typical human right hand and its various regions.

A hand 5000 can be described using both medical terminology and palmistry (palm reading) terminology so as to understand regions of the hand being specified for reference herein. FIG. 12A shows hand 5000 having a palm 5002 which has an upper palm 5005, a middle palm (plain of mars) 5050, and a lower palm 5007. The hand 5000 has five fingers 5003, i.e.: the thumb 5100 adjacent to a thenar 5010; a Jupiter finger (pointer finger) 5200 adjacent to a mount Jupiter 5201; a Saturn finger (middle finger) 5300 adjacent to a mount Saturn 5301; an Apollo finger (ring finger) 5400 adjacent to a mount Apollo 5401; a Mercury finger (pinky finger) 5500 adjacent to a mount Mercury 5501 which is adjacent to an upper mars 5502. The palm also has a thenar 5010 adjacent to a thumb 5100 and a mount of Venus 5012. FIG. 12A shows the purlicue 5115 located between the thumb 5100 and the Jupiter finger 5200. A lower mars 5101 is also shown adjacent to the Jupiter finger 5200. The hypothenar 5055 is shown adjacent to the upper mars 5502 and middle palm 5050.

FIG. 12A shows an example of a finger grip curve 5600 which can for example cross the Jupiter finger 5200 proximate to the distal phalange 5203, the Saturn finger 5300 across the middle phalange 5302, the Apollo finger 5400 across the middle phalange 5402 and the Mercury finger 5500 proximate to the distal phalange 5503.

The position in which the finger grip curve 5600 lies on a given operators hand can be a function of the size and shape of the operator's hand and how the operators hand matches finger position to a finger grip.

FIG. 12A also shows a palm grip curve 5700 which for example can cross the hypothenar 5055 proximate to the lower palm 5007, a lower portion of the middle palm 5050, an upper portion of the thenar 5010 and the purlicue 5115 between the mount of Venus 5012 and the lower mars 5101.

Figure 12B:
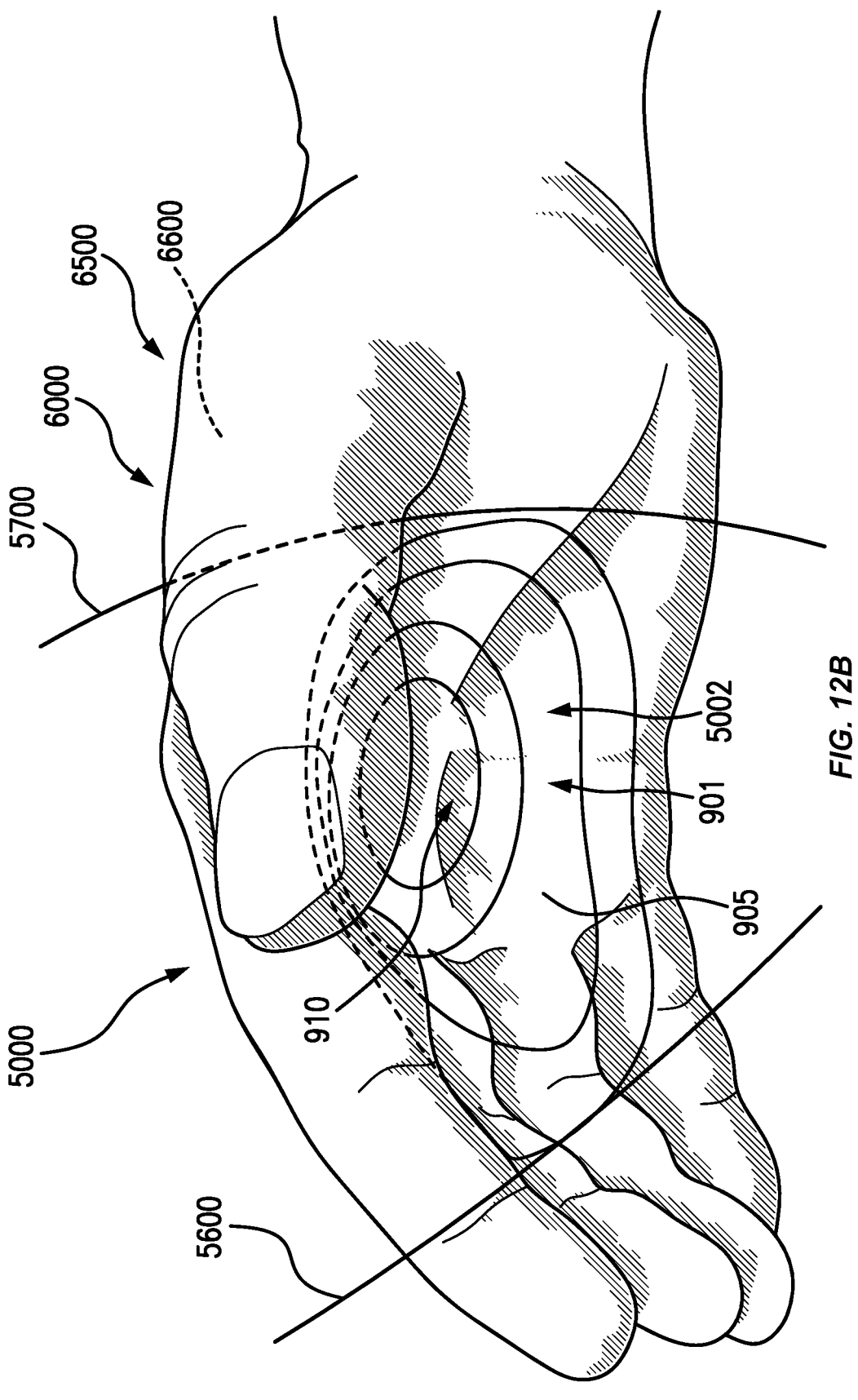
FIG. 12B shows a perspective view of a typical human right hand and its various regions.

FIG. 12B shows a palm side of a typical human right hand and a gripping cavity 901. FIG. 12B shows the gripping cavity 901 of an example palm 5002 configuration. FIG. 7 provides contour lines to show the shape of an example of the gripping cavity 901 of hand 5000. The gripping configuration of hand 5000 in FIG. 12B shows the finger grip curve 5600 and the palm grip curve 5700 configure to respectively grip either the upper grip 200, or the lower grip 400.

As shown by the contour lines of FIG. 12B, the gripping cavity 901 can have a gripping cavity shape 905 which bounds a gripping cavity volume 910.

FIG. 12B also shows the back of hand 6000, as well as the dorsal interossei muscles 6500 and/or first (1$^{st}$) dorsal interosseous muscle 6600.

Figure 13A:
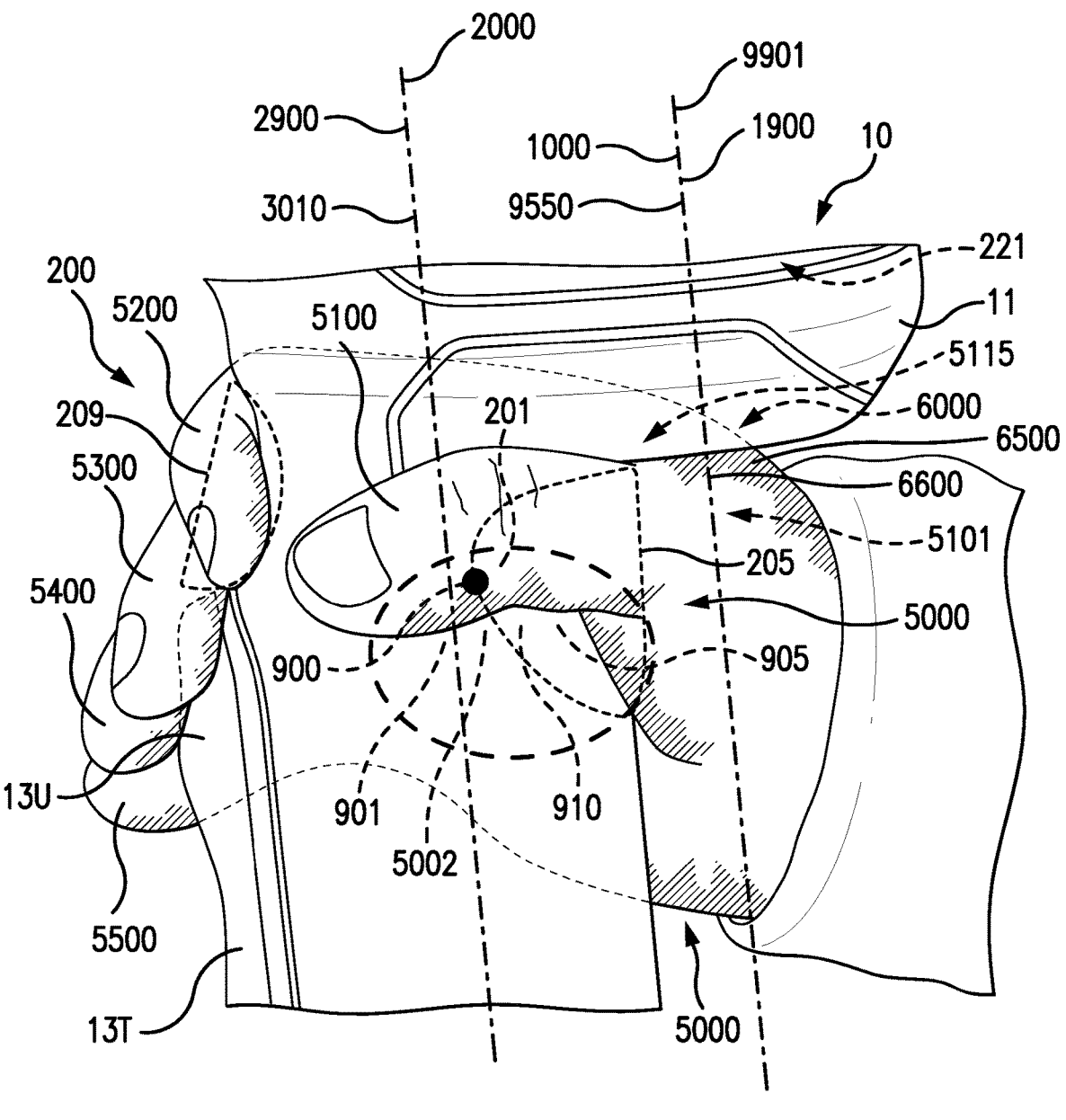
FIG. 13A shows a left-side view of a user's right hand gripping the expanding tool upper grip and upper trigger having a tool center of gravity between the cam spindle centerline and the motor centerline.

FIG. 13A shows a left side 90 view of a user's right hand gripping the expanding tool 10 upper grip 200 and upper trigger 13U of trigger 13T. FIG. 13A shows expanding tool 10 having a tool center of gravity 900 between the cam spindle centerline 1000 and the motor centerline 2000. FIG. 13A shows a user hand 5000 gripping the upper grip 200 of the expanding tool 10 of FIG. 1. The upper palm grip 201 ergonomically fits into the gripping cavity 901 of a user's palm 5002. The tool center of gravity 900 is shown within the grip of the hand 5000 of the operator.

FIG. 13A shows an example of the user's hand 5000 ergonomically fitting into the upper palm grip volume 205 and the upper finger grip volume 209. FIG. 13A shows how the palm 5002 of the user fits into and reversibly engages with the upper palm grip volume 205. FIG. 13A also shows how the fingers 5003 of the user fits into and reversibly engages with the upper finger grip volume 209.

In the embodiment of FIG. 13A, the tool center of gravity 900 is placed within the handle interior volume 315 and surrounded at least in part by the user's griping palm 5002. FIG. 13A shows the purlicue 5115 of the user's hand 5000 gripping the upper grip and adjacent to the head assembly 100. FIG. 13A shows the tool center of gravity 900 at least in part surrounded by and/or adjacent to gripping cavity volume 910 and/or gripping cavity shape 905 of palm 5002.

FIG. 13A shows an example of a configuration in which the cam spindle centerline 1000, the cam opening centerline 9901 and the cam spindle drive gear centerline 9550 are colinear and all pass through the back of hand 6000 of the user. In the embodiment of FIG. 13A, the cam spindle centerline 1000, the cam opening centerline and the cam spindle drive gear centerline 9550 are colinear and pass through the lower mars 5101 portion of the user's hand 5000. In the embodiment of FIG. 13A, the cam spindle centerline 1000, the cam opening centerline 9901 and the cam spindle drive gear centerline 9950 are colinear and pass through the dorsal interossei muscles 6500 of the user's hand 5000. As shown in FIG. 13A each of the cam spindle centerline 1000, the cam opening centerline 9901 and the cam spindle drive gear centerline 9950 are colinear and pass through the back of hand 6000, as well as pass through or are located proximate to the dorsal interossei muscles 6500 and/or first (1$^{st}$) dorsal interosseous muscle 6600.

FIG. 13A shows the configuration of the cam spindle centerline 1000, the cam opening centerline 9901 and the cam spindle drive gear centerline 9550 to all pass through the upper mars 5502 portion of the user's hand 5000 configures the cam 221, e.g. radial cam 21, the cam spindle 150 and the cam spindle drive gear 3550G above the user's hand 5000, and above the back of hand 6000 of user.

As shown in FIG. 13A the motor centerline 2000 and transmission centerline 3010 and drive shaft centerline 3459 are configured within and/or are at least in part surrounded by and/or pass through the gripping cavity 901 and/or gripping cavity volume 910 and/or the gripping cavity shape 905. As shown in FIG. 13A the motor centerline 2000 and transmission centerline are configured within and/or are at least in part surrounded by one or more of the fingers 5003, i.e.: mercury finger (pinky finger) 5500, Appollo finger (ring finger) 5400, Saturn finger (middle finger) 5300, Jupiter finger (pointer finger) 5200 and/or thumb 5100, when the hand 5000 of the operator grips the upper grip 200. As shown in FIG. 13A the motor centerline 2000 and transmission centerline are configured within and/or are at least in part surrounded by the palm 5002, when the hand 5000 of the operator grips the upper grip 200.

Figure 13B:
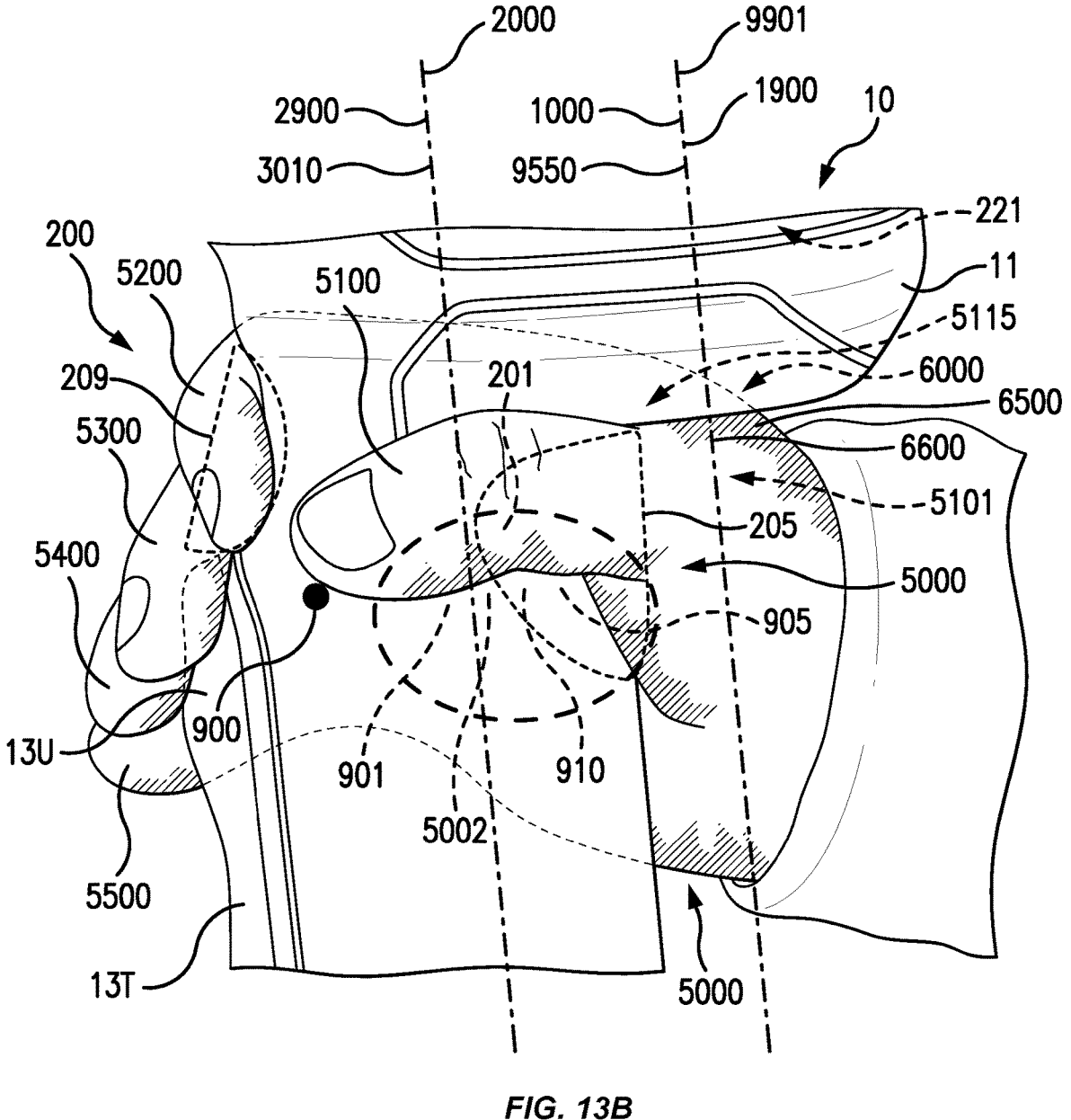
FIG. 13B shows a left-side view of a user's right hand gripping the expanding tool's upper grip and upper trigger having a tool center of gravity between the cam spindle centerline and the trigger.
Figure 13C:
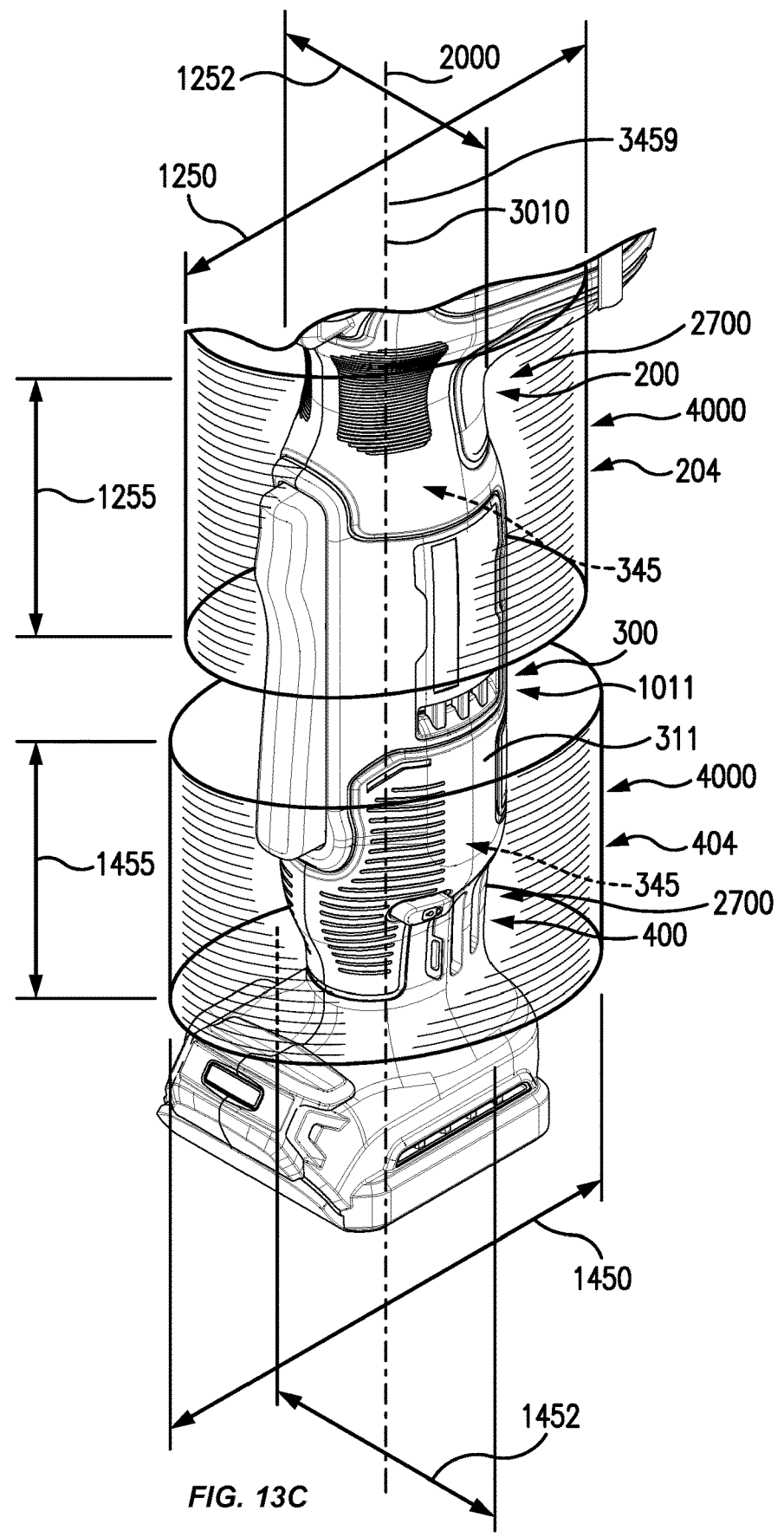
FIG. 13C shows a detail perspective view of the upper grip volume and the lower grip volume.

FIG. 13B shows a left-side view of a user's right hand gripping the expanding tool 10 upper grip 200 and upper trigger 13U having a tool center of gravity 900 between the cam spindle centerline 1000 and/or cam spindle centerline plane 1900 and the trigger 13T. FIG. 13B also shows the expanding tool 10 upper grip 200 and upper trigger 13U having a tool center of gravity 900 between the motor centerline 2000 and/or motor centerline plane 2900 and the trigger 13T.

FIG. 13C shows a detail perspective view of the upper grip volume 204 and the lower grip volume 404.

In embodiments, the inner structure weight distribution and tool's center of gravity. As shown in FIG. 13C, the tool center of gravity 900 is configured in the upper grip 200 and at least in part surrounded by a user's hand 5000 when a user grasps the tool.

Configuration Of The Motor Centerline

As shown in FIG. 13C, in an embodiment, the motor centerline 2000 can be configured within a grip volume 4000. In an embodiment, the motor centerline 2000 can be configured within an upper grip volume 204. In an embodiment, the motor centerline 2000 can be configured within an upper grip 200. In an embodiment, the motor centerline 2000 can be configured within a lower grip volume 404. In an embodiment, the motor centerline 2000 can be configured within a lower grip 400. In an embodiment, the motor centerline 2000 can be configured within a handle 300. In an embodiment, the motor centerline 2000 can be configured within a handle housing 311. In an embodiment, the motor centerline 2000 can be configured within a handle interior volume 345.

As shown in FIG. 10D, in an embodiment, the motor centerline 2000 can be configured within circumference C2 and/or within circumference B and/or within circumference C. As shown in FIG. 10E, in an embodiment, the motor centerline 2000 can be configured within and/or to pass through a grip cross sectional shape 291.

In an embodiment, the motor centerline 2000 can be configured proximate to the trigger assembly 350.

As shown in FIG. 13A, in an embodiment, the motor centerline 2000 can be configured to be within the grip of an operator's hand 5000 when the operator is gripping the expanding tool 10. In an embodiment, as shown in FIG. 13A, the motor centerline 2000 can be configured to be within the grasp of a gripping cavity volume 910 and/or gripping cavity shape 905 of an operator's hand 5000 when the operator is gripping the expanding tool 10

Configuration Of The Transmission Centerline

In an embodiment, the transmission centerline 3010 can be configured within a grip volume 4000. In an embodiment, as shown in FIGS. 7A and 13C the transmission centerline 3010 can be configured within an upper grip volume 204. In an embodiment, the transmission centerline 3010 can be configured within an upper grip 200. Also as shown in FIGS. 7A and 13C, the transmission centerline 3010 can be configured within a lower grip volume 404. In an embodiment, the transmission centerline 3010 can be configured within a lower grip 400.

As shown in FIGS. 7A, 8 and 13C In an embodiment, the transmission centerline 3010 can be configured within a handle 300 and/or within a handle housing 311 and/or within a handle interior volume 345. As shown in FIG. 10D, the transmission centerline 3010 can be configured within circumference C2 and/or within circumference B and/or within circumference C. As shown in FIG. 10E, In an embodiment, the transmission centerline 3010 can be configured within and/or to pass through a grip cross sectional shape 291.

As shown in FIG. 13A and FIG. 14, the transmission centerline 3010 can be configured to be within the grip of an operator's hand 5000 when the operator is gripping the expanding tool 10. In an embodiment, the transmission centerline 3010 can be configured to be within the grasp of a gripping cavity volume 910 and/or gripping cavity shape 905 of an operator's hand 5000 when the operator is gripping the expanding tool 10.

In an embodiment, the transmission centerline 3010 can be configured proximate to the trigger assembly 350. In an embodiment, the motor centerline 2000 and the transmission centerline 3010 can be coaxial and/or colinear.

Configuration Of The Driveshaft Centerline

As shown in FIG. 13C, in an embodiment, the driveshaft centerline 3459 can be configured within a grip volume 4000. As shown in FIGS. 7A, 13A and 13C, the driveshaft centerline 3459 can be configured within an upper grip volume 204 and/or within an upper grip 200. As shown in FIGS. 7A, 13C and 14, the driveshaft centerline 3459 can be configured within a lower grip volume 404 and/or within a lower grip 400.

As shown in FIGS. 7A, 8 and 13C, the driveshaft centerline 3459 can be configured within a handle 300 and/or within a handle housing 311. As shown in FIGS. 7A, 8 and 13C, the driveshaft centerline 3459 can be configured within a handle interior volume 345.

As shown in FIG. 10D, the driveshaft centerline 3459 can be configured within circumference C2 and/or within circumference B and/or within circumference C. As shown in FIG. 10E, the driveshaft centerline 3459 can be configured within and/or to pass through a grip cross sectional shape 291.

As shown in FIG. 13A and FIG. 14, the driveshaft centerline 3459 can be configured to be within the grip of an operator's hand 5000 when the operator is gripping the expanding tool 10. In an embodiment, the driveshaft centerline 3459 can be configured to be within the grasp of a gripping cavity volume 910 and/or gripping cavity shape 905 of an operator's hand 5000 when the operator is gripping the expanding tool 10.

In an embodiment, the driveshaft centerline 3459 can be configured proximate to the trigger assembly 350.

In an embodiment, the motor centerline 2000 and the driveshaft centerline 3459 can be coaxial and/or colinear. In an embodiment, the transmission centerline 3010 and the driveshaft centerline 3459 can be coaxial and/or colinear. In an embodiment, the motor centerline 2000 and the transmission centerline 3010 and the driveshaft centerline 3459 can be coaxial and/or colinear.

FIG. 14 shows a left-side view of a user's right hand gripping the expanding tool's lower grip 400 and a lower portion of trigger 13T. FIG. 14 shows a user hand 5000 gripping the lower grip 400 of the expanding tool 10 of FIG. 1. The lower palm grip 1401 ergonomically fits into the gripping cavity 901 of a user's palm 5002. In the embodiment of FIG. 14, the tool center of gravity 900 is placed within the handle interior volume 315. FIG. 14 shows the user's hand 5000 gripping the lower grip 400 and adjacent to the battery pack 12.

In the embodiment of FIG. 14, when gripping the lower grip 400 the cam spindle centerline 1000, the cam opening centerline 9901 and the cam spindle drive gear centerline 9550 to all pass through the lower mars 5101 portion of the user's hand 5000 and the back of hand 6000 of the user.

FIG. 14 shows an example of a configuration in which the cam spindle centerline 1000, the cam opening centerline 9901 and the cam spindle drive gear centerline 9550 are colinear and all pass through the back of hand 6000 of the user. In the embodiment of FIG. 14, the cam spindle centerline 1000, the cam opening centerline and the cam spindle drive gear centerline 9550 are colinear and pass through the lower mars 5101 portion of the user's hand 5000. In the embodiment of FIG. 14, the cam spindle centerline 1000, the cam opening centerline 9901 and the cam spindle drive gear centerline 9950 are colinear and pass through the dorsal interossei muscles 6500 of the user's hand 5000. As shown in FIG. 14 each of the cam spindle centerline 1000, the cam opening centerline 9901 and the cam spindle drive gear centerline 9950 are colinear and pass through the back of hand 6000, as well as pass through or are located proximate to the dorsal interossei muscles 6500 and/or first ($1^{st}$) dorsal interosseous muscle 6600.

As shown in FIG. 14 the motor centerline 2000 and transmission centerline 3010 and drive shaft centerline 3459 are configured within and/or are at least in part surrounded by and/or pass through the gripping cavity 901 and/or gripping cavity volume 910 and/or the gripping cavity shape 905. As shown in FIG. 14 the motor centerline 2000 and transmission centerline are configured within and/or are at least in part surrounded by one or more of the fingers 5003, i.e.: mercury finger (pinky finger) 5500, Appollo finger (ring finger) 5400, Saturn finger (middle finger) 5300, Jupiter finger (pointer finger) 5200 and/or thumb 5100, when the hand 5000 of the operator grips the upper grip 200. As shown in FIG. 14 the motor centerline 2000 and transmission centerline are configured within and/or are at least in part surrounded by the palm 5002, when the hand 5000 of the operator grips the upper grip 200.

Figure 15A:
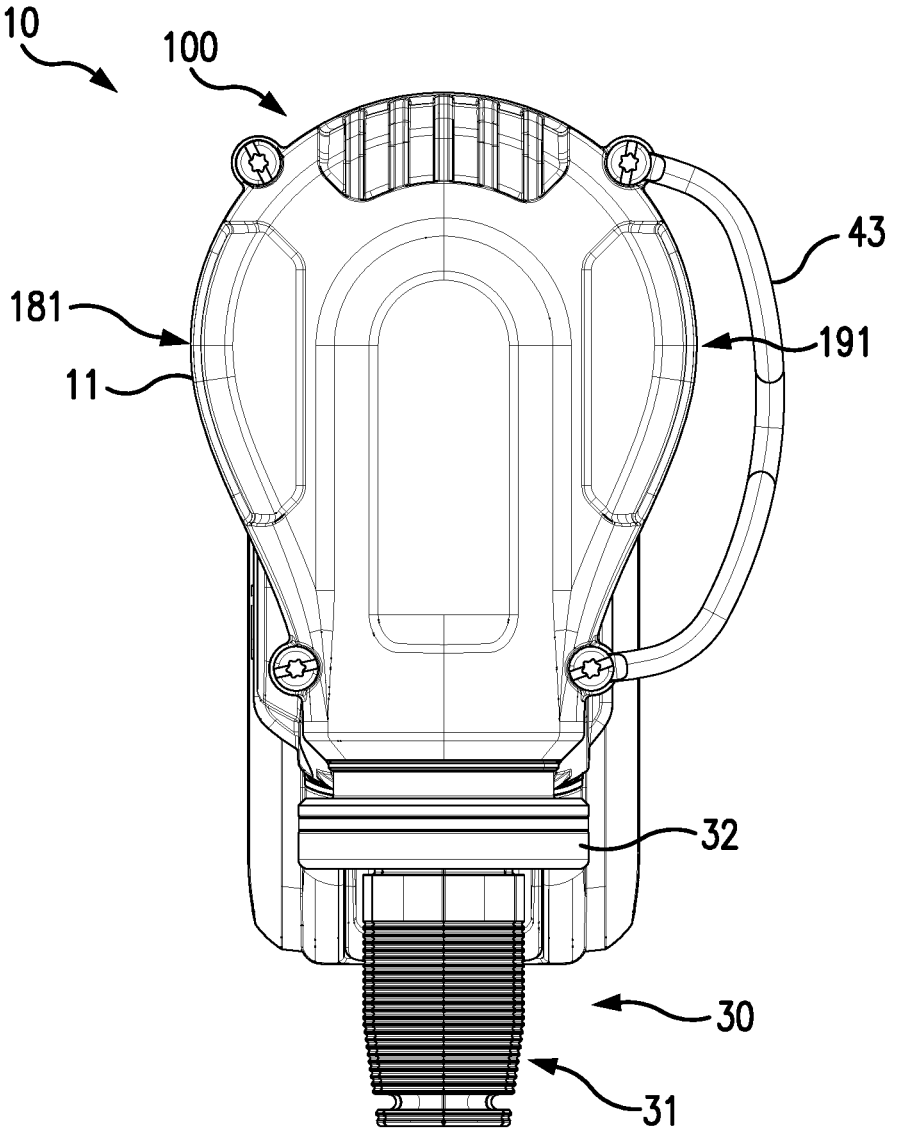
FIG. 15A is a top side view of the expanding tool.
Figure 15B:
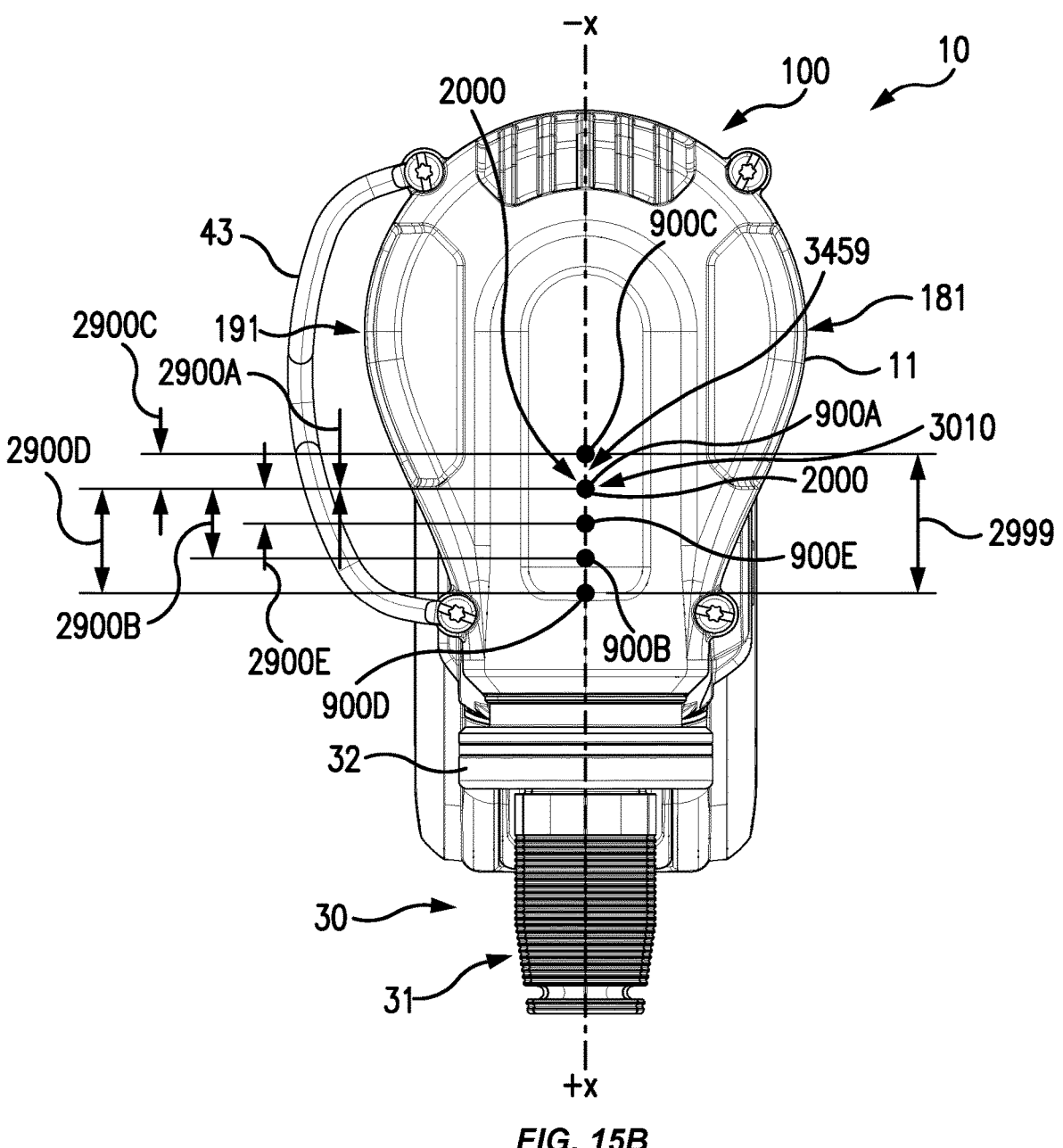
FIG. 15B is a top side view of the expanding tool showing a variety of tool center of gravity locations.

FIG. 15A is a top side 40 view of the expanding tool 10.

FIG. 15B is a top side 40 view of the expanding tool 10 showing a variety of tool center of gravity 900 locations. FIG. 15B shows a top view of the tool center of gravity 900 examples of FIG. 10B, e.g. 900A, 900B, 900C, 900D and 900E, along the X axis.

FIG. 15B shows the tool center of gravity 900A is shown at a distance 2900A of 0 mm away from the motor centerline 2000 (and/or transmission centerline 3010) when a 5 Ah power tool battery pack 12 and an expansion head 1330 having 1" plurality of jaws 31 are attached.

FIG. 15B shows the tool center of gravity 900B is shown at a distance 2900B away from the motor centerline 2000 (and/or transmission centerline 3010) in the +X direction when a 2 Ah power tool battery pack 12 and an expansion head 1330 having 1.5" plurality of jaws 31 are attached.

FIG. 15B shows the tool center of gravity 900C is shown at a distance 2900C away from the motor centerline 2000 (and/or transmission centerline 3010) in the –X direction when a 2 Ah power tool battery pack 12 and an expansion head 1330 having 1" plurality of jaws 31 are attached.

FIG. 15B shows the tool center of gravity 900D is shown at a distance 2900D 24 mm away from the motor centerline 2000 (and/or transmission centerline 3010) in the +X direction when a 15 Ah power tool battery pack 12 and an expansion head 1330 having 1.5" plurality of jaws 31 are attached.

FIG. 15B shows the tool center of gravity 900E is shown at a distance 2900E away from the motor centerline 2000 (and/or transmission centerline 3010) in the +X direction when a 15 Ah power tool battery pack 12 and an expansion head 1330 having 1" plurality of jaws 31 are attached.

In the example shown in FIG. 15B (and FIG. 10B), each of tool center of gravity 900D, 900B and 900E are a distance which is a +X value away from the motor centerline 2000 and/or transmission centerline 3010. In the example shown in FIG. 15B (and FIG. 10B), the motor centerline 2000 and/or transmission centerline 3010 passes through tool center of gravity 900A. In the example shown in FIG. 15B (and FIG. 10B), the tool center of gravity 900C is a –X value away from the motor centerline 2000 and/or transmission centerline 3010.

As shown in FIG. 15B, as used with various of battery 12 and of expansion head 1330, the tool center of gravity 900 can be configured at different locations along a horizontal configuration distance 2999.

FIG. 16 is a bottom side 60 view of the expanding tool 10 with a battery 12 attached.

This disclosure regards a hand tool and its many aspects, features and elements. Such an apparatus can be dynamic in its use and operation. This disclosure is intended to encompass the equivalents, means, systems and methods of the use of the expanding tool 10 and its many aspects consistent with the description and spirit of the apparatus, means, methods, functions and operations disclosed herein. Other embodiments and modifications will be recognized by one of ordinary skill in the art as being enabled by and within the scope of this disclosure.

The scope of this disclosure is to be broadly construed. The embodiments herein can be used together, separately, mixed or combined. It is intended that this disclosure disclose and/or encompass equivalents, means, systems and methods to achieve the devices, designs, operations, control systems, controls, activities, mechanical actions, dynamics and results disclosed herein. For each mechanical element or mechanism disclosed, it is intended that this disclosure also encompasses within the scope of its disclosure and teaches equivalents, means, systems and methods for practicing the many aspects, mechanisms and devices disclosed herein. The claims of this application are likewise to be broadly construed.

The description of the technology herein in its many and varied embodiments is merely exemplary in nature and, thus, variations that do not depart from the gist of the disclosure are intended to be within the scope of the claims and the disclosure herein. Such variations are not to be regarded as a departure from the spirit and scope of the disclosed technologies.

It will be understood that the above description and the drawings are examples of particular implementations of the invention, but that other implementations of the invention are included in the scope of the claims.

It will be appreciated that various modifications and changes can be made to the above-described embodiments of the hand tool as disclosed herein without departing from the spirit and the scope of the claims.

We claim:

1. A tool for expanding the end of a pipe, comprising:
   a cam which drives a plurality of jaws from a closed position to an open position;

a motor having a motor centerline configured within a grip volume;

a cam spindle configured to drive the cam and which has a cam spindle centerline, the cam spindle centerline at a cam spindle centerline distance from the motor centerline;

a transmission selectively driven by the motor which selectively drives the cam spindle; and a wedge driven by the cam and configured to drive the plurality of jaws, wherein the cam spindle centerline is configured within the grip volume.

2. The tool for expanding the end of a pipe according to claim 1, further comprising:

a tool center of gravity configured between at least a portion of the cam and at least a portion of the motor.

3. The tool for expanding the end of a pipe according to claim 1, further comprising:

a cam spindle centerline plane; and a motor centerline plane, wherein a tool center of gravity is configured between the cam spindle centerline plane and the motor centerline plane.

4. The tool for expanding the end of a pipe according to claim 1, further comprising:

a handle having a handle interior volume, wherein a tool center of gravity is configured within the handle interior volume.

5. The tool for expanding the end of a pipe according to claim 1, further comprising:

a grip, wherein the cam spindle centerline passes through a portion of an operator's hand when an operator grips the grip with the operator's hand.

6. The tool for expanding the end of a pipe according to claim 1, wherein the motor centerline passes through at least a portion of the wedge.

7. The tool for expanding the end of a pipe according to claim 1, further comprising:

a tool weight in a range of 3 lbs to 10 lbs when a battery is not attached.

8. The tool for expanding the end of a pipe according to claim 1, further comprising:

a transmission centerline aligned with the motor centerline;

a drive gear driven by the transmission; and a cam spindle drive gear having a cam spindle drive gear centerline, wherein the drive gear drives the cam spindle drive gear, wherein the cam spindle drive gear is located adjacent to the drive gear and the cam spindle drive gear centerline is at a distance from the motor centerline.

9. The tool for expanding the end of a pipe according to claim 1, further comprising:

an upper grip configured at least in part between a portion of a cam spindle and a portion of the motor.

10. The tool for expanding the end of a pipe according to claim 1, further comprising:

an upper grip configured at least in part between a portion of the cam spindle and a portion of the transmission.

11. The tool according to claim 1, further comprising:

a trigger; and a tool center of gravity, wherein the tool center of gravity is configured adjacent to the trigger.

12. The tool according to claim 1, further comprising:

a tool center of gravity configured adjacent to a portion of the transmission.

13. A tool for expanding the end of a pipe, comprising:

a motor having a motor centerline configured within a grip volume;

a cam spindle having a cam spindle centerline, said cam spindle centerline at distance from said motor centerline;

a transmission having a cam spindle drive stage having a cam spindle drive gear configured to selectively drive a rotation of said cam spindle; and a head assembly having a plurality of jaws selectively driven by the rotation of the cam spindle, wherein the cam spindle centerline is configured within the grip volume.

14. The tool according to claim 13, further comprising:

a gear adjacent to and making external contact with said cam spindle drive gear to drive a rotation of said cam spindle drive gear when driven by said motor.

15. The tool according to claim 13, further comprising:

a radial cam having a radial cam spindle opening centerline, wherein the radial cam spindle opening centerline is at a distance from the motor centerline.

* * * * *